United States Patent
Takahashi et al.

(10) Patent No.: US 9,141,677 B2
(45) Date of Patent: Sep. 22, 2015

(54) APPARATUS AND METHOD FOR ARRANGING QUERY

(71) Applicant: FUJITSU LIMITED, Kawasaki-shi, Kanagawa (JP)

(72) Inventors: Hidekazu Takahashi, Kawasaki (JP); Yoshinori Sakamoto, Kawasaki (JP); Nobutaka Imamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/644,978

(22) Filed: Oct. 4, 2012

(65) Prior Publication Data

US 2013/0138686 A1    May 30, 2013

(30) Foreign Application Priority Data

Nov. 30, 2011  (JP) .................................. 2011-263048

(51) Int. Cl.
*G06F 17/30* (2006.01)
*G06F 9/50* (2006.01)

(52) U.S. Cl.
CPC ........ *G06F 17/30545* (2013.01); *G06F 9/5066* (2013.01); *G06F 9/5083* (2013.01); *G06F 17/30516* (2013.01)

(58) Field of Classification Search
None
See application file for complete search history.

(56) References Cited

U.S. PATENT DOCUMENTS

| | | | |
|---|---|---|---|
| 2003/0158842 A1* | 8/2003 | Levy et al. | 707/3 |
| 2004/0230581 A1* | 11/2004 | Lee | 707/10 |
| 2005/0033936 A1 | 2/2005 | Nakano et al. | |
| 2008/0256146 A1 | 10/2008 | Nishizawa et al. | |
| 2009/0049187 A1 | 2/2009 | Gedik et al. | |
| 2009/0281987 A1* | 11/2009 | Krishnamoorthy et al. | 707/2 |
| 2009/0319687 A1 | 12/2009 | Goldstein et al. | |
| 2010/0082671 A1* | 4/2010 | Li et al. | 707/770 |
| 2010/0229178 A1* | 9/2010 | Ito | 718/104 |
| 2011/0029985 A1* | 2/2011 | Balandin et al. | 718/107 |
| 2011/0040744 A1* | 2/2011 | Haas et al. | 707/713 |
| 2011/0131199 A1* | 6/2011 | Simon et al. | 707/714 |
| 2011/0202550 A1* | 8/2011 | Chen et al. | 707/769 |
| 2013/0007232 A1* | 1/2013 | Wang et al. | 709/222 |

FOREIGN PATENT DOCUMENTS

| | | |
|---|---|---|
| JP | 2005-4676 | 1/2005 |
| JP | 2005-275526 | 10/2005 |

(Continued)

OTHER PUBLICATIONS

Mehul A. Shah et al., "Flux: An Adaptive Partitioning Operator for Continuous Query Systems", ICDE, 2003, pp. 25-36.

(Continued)

*Primary Examiner* — Jay Morrison
(74) *Attorney, Agent, or Firm* — Staas & Halsey LLP

(57) ABSTRACT

An arrangement device includes an acquisition unit, a specifying unit, and a determination unit. The acquisition unit acquires information representing the number of times of communication between queries executed in a plurality of devices in which the plurality of queries are arranged, the query being used for performing processes when data meets set conditions. The specifying unit specifies a set of queries based on the number of times of communication that is represented by the information acquired by the acquisition unit. The determination unit determines to arrange the set of queries specified by the specifying unit in a same device.

25 Claims, 36 Drawing Sheets

(56) References Cited

FOREIGN PATENT DOCUMENTS

JP   2006-338432   12/2006
JP   2010-86145    4/2010

OTHER PUBLICATIONS

Ying Xing, "Load Distribution for Distributed Stream Processing", EDBT 2004 Workshops, pp. 112-120.
Ying Xing et al., "Dynamic Load distribution in the Borealis Stream Processor", ICDE, 2005, 12 pages.
Japanese Office Action issued Feb. 24, 2015 in corresponding Japanese Patent Application No. 2011-263048.
Extended European Search Report issued Jan. 7, 2015 in corresponding European Patent Application No. 12189718.5.
Jason Sonnek et al. "Starling: Minimizing Communication overhead in Virtualized Computing Platforms Using Decentralized Affinity-Aware Migration", Technical Report, Department of Computer Science and Engineering, University of Minnesota, Minneapolis, MN, USA, Dec. 2, 2009.
Chinese Office Action dated Jun. 30, 2015 in corresponding Chinese Patent Application No. 201210424875.5.

* cited by examiner

FIG.7A

| FORMER QUERY \ LATTER QUERY | Q1 | Q2 | Q3 |
|---|---|---|---|
| Q1 | 0 | 0 | 0 |
| Q2 | 0 | 0 | 0 |
| Q3 | 0 | 0 | 0 |

| FORMER QUERY \ LATTER QUERY | Q1 | Q2 | Q3 |
|---|---|---|---|
| Q1 | 0 | 0 | 1 |
| Q2 | 0 | 0 | 0 |
| Q3 | 0 | 0 | 0 |

| FORMER QUERY \ LATTER QUERY | Q1 | Q2 | Q3 |
|---|---|---|---|
| Q1 | 0 | 1 | 0 |
| Q2 | 0 | 0 | 1 |
| Q3 | 0 | 0 | 0 |

FIG.7D

| FORMER QUERY \ LATTER QUERY | Q1 | Q2 | Q3 |
|---|---|---|---|
| Q1 | 0 | 1 | 10 |
| Q2 | 0 | 0 | 1 |
| Q3 | 0 | 0 | 0 |

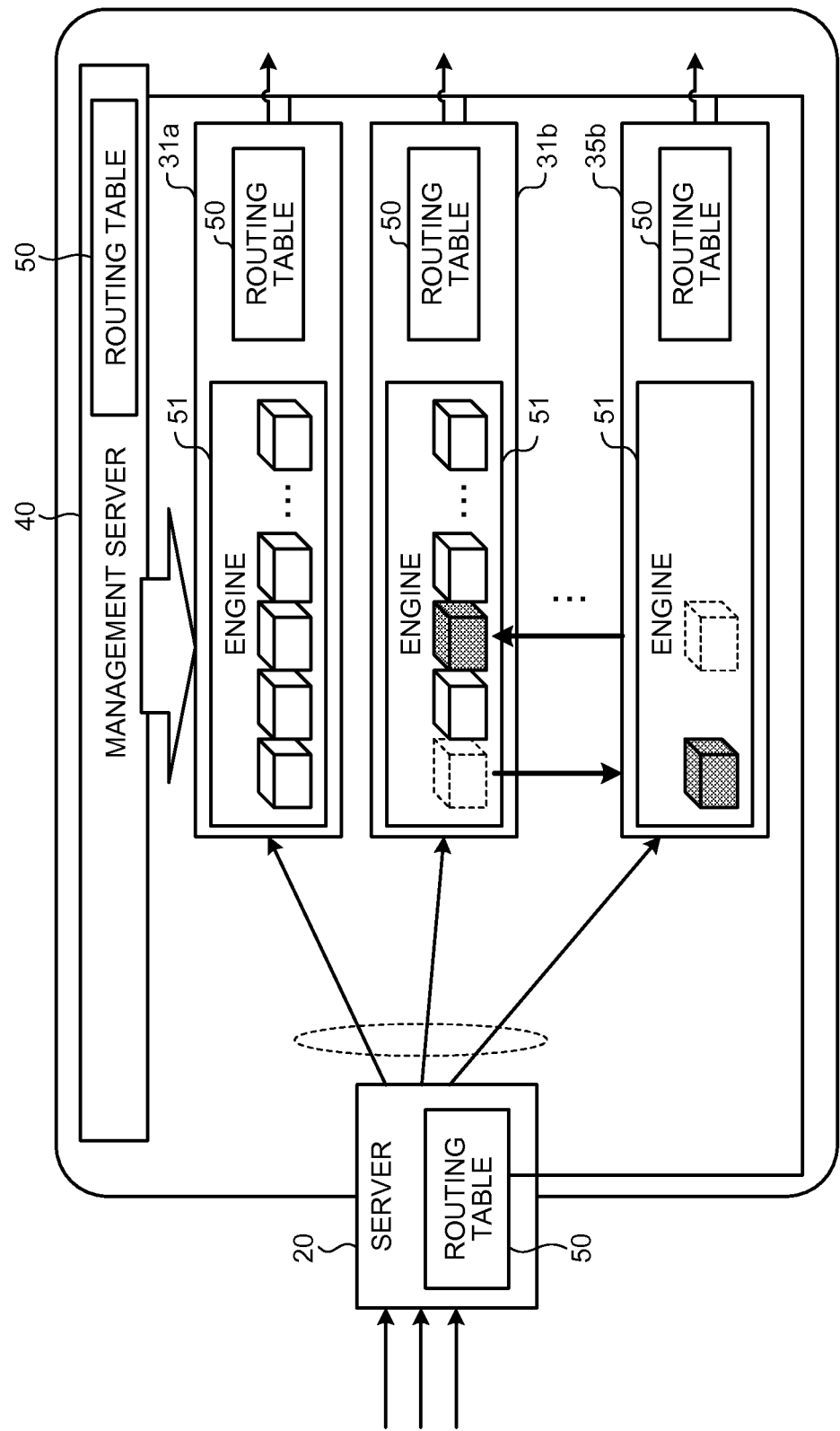

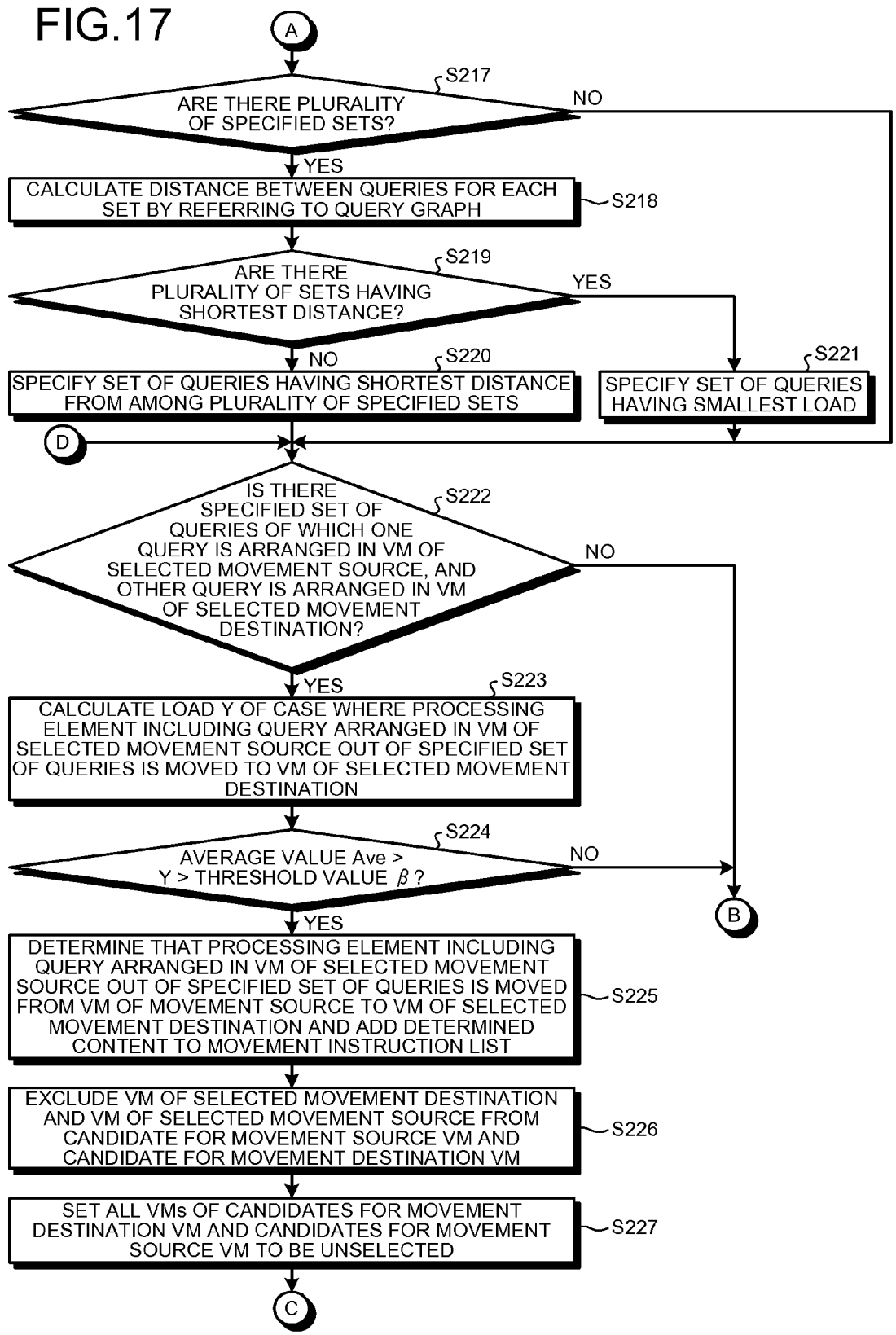

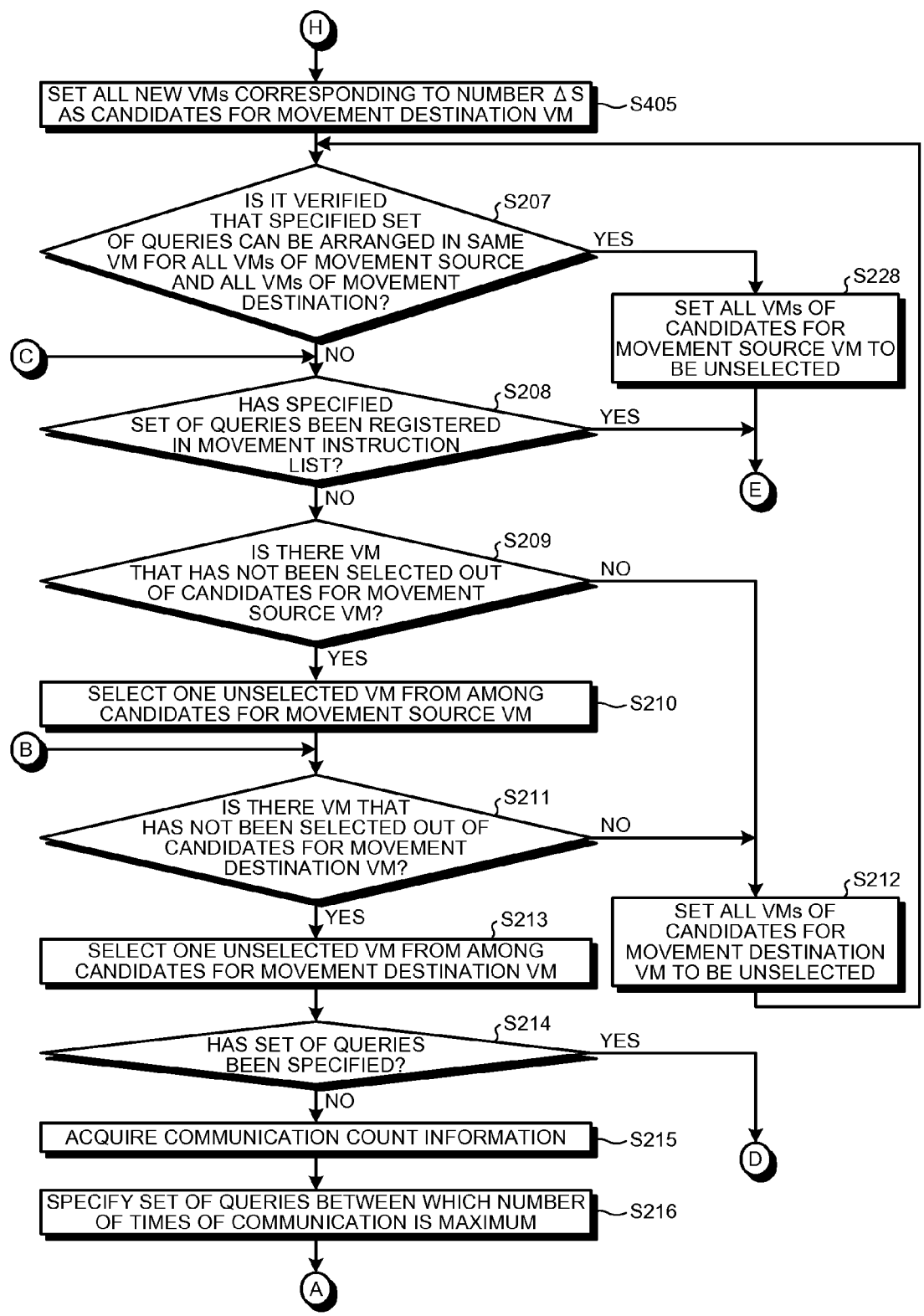

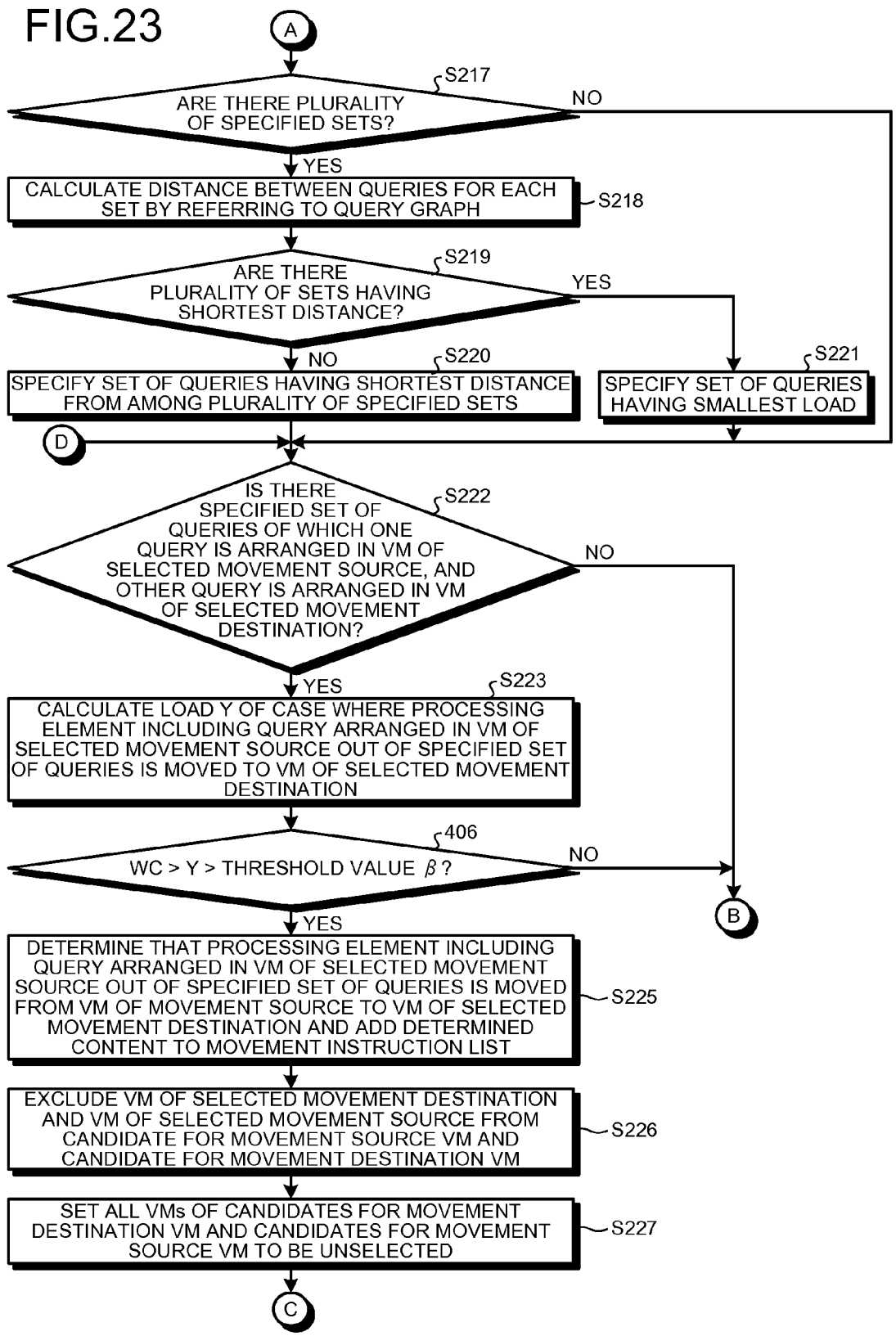

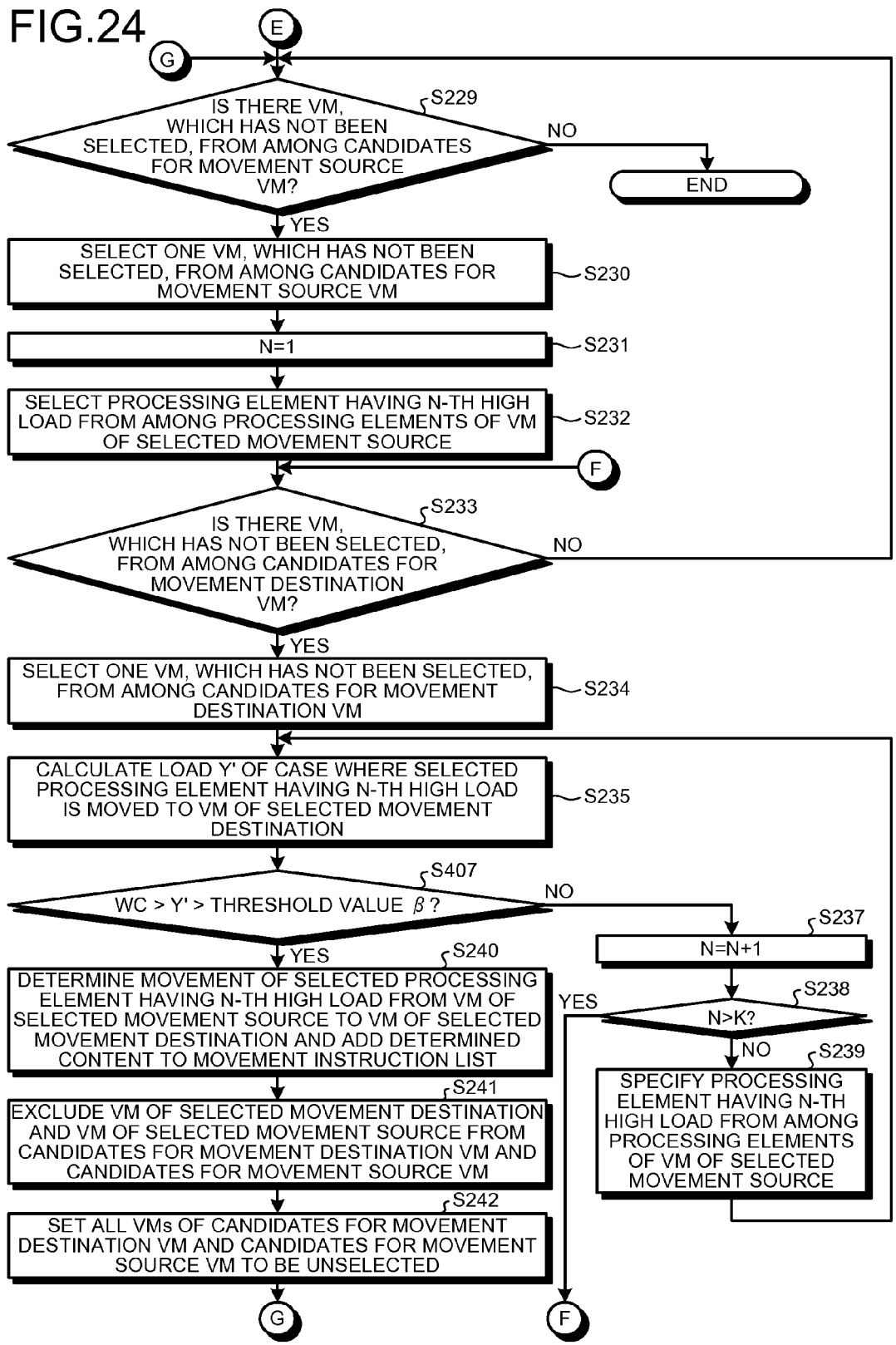

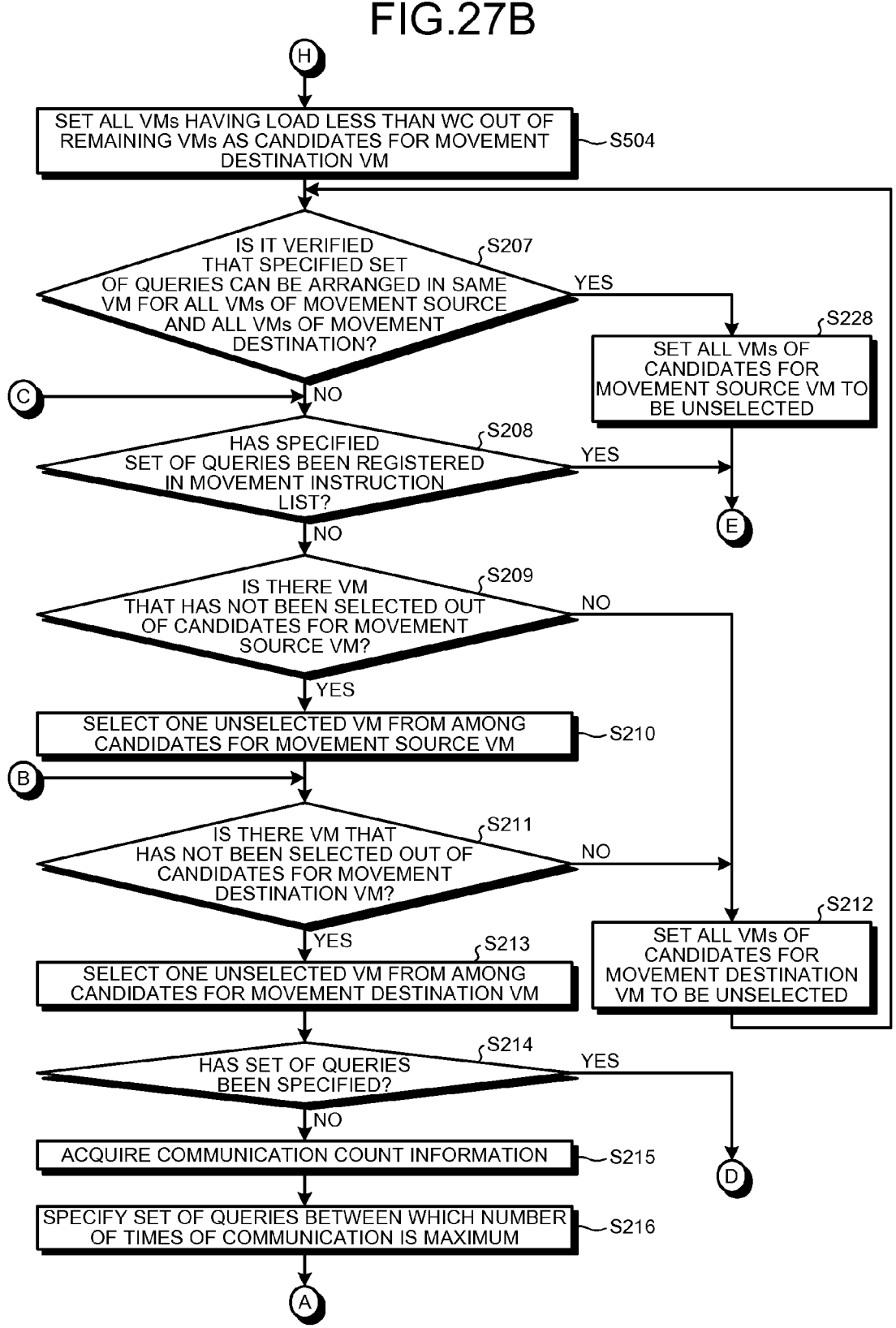

APPARATUS AND METHOD FOR ARRANGING QUERY

CROSS-REFERENCE TO RELATED APPLICATION

This application is based upon and claims the benefit of priority of the prior Japanese Patent Application No. 2011-263048, filed on Nov. 30, 2011, the entire contents of which are incorporated herein by reference.

FIELD

The embodiments discussed herein are related to a technique for arranging queries.

BACKGROUND

As a technique for processing many data entries that are collected every moment from various sources in a parallel manner, there is CEP (complex event processing). In the complex event processing, an event is detected from received data, and processing relating to the detected event is performed. There is a case where the complex event processing is called ESP (event stream processing). In description presented below, the ESP is assumed to be included in the technical scope of the CEP.

In a CEP system that performs the complex event processing, there is a case where a large amount of received data is temporarily processed. In such a case, the processing load of a device that processes the received data in the CEP system increases, and accordingly, the processing performance decreases.

Thus, for example, in the CEP system, by using a technique enabling flexible resource allocation such as a cloud technique, the processing is distributed to a plurality of servers or VMs (virtual machines) in accordance with a variation in the processing load. As such distribution of the processing, for example, a transaction requesting sentence called a query and data accompanied with the query that are arranged in a server or a virtual machine having a high processing load are moved to another server or another virtual machine as processing elements, whereby the distribution of processing is performed.

In addition, there is a technique in which queries of which the processing order is adjacent to each other, in other words, queries that are adjacent to each other in a query graph are distributed to the same device based on the query graph that includes information such as a processing order set in the query.

As for the related techniques, see: U.S. Patent Application Publication No. 2009/0049187; U.S. Patent Application Publication No. 2009/0319687; Mehul A. Shah, Joseph M. Hellerstein, Sirish Chandrasekaran and Michael J. Franklin, "*Flux: An Adaptive Partitioning Operator for Continuous Query Systems*," ICDE, 2003; Ying Xing, "*Load Distribution for Distributed Stream Processing*," EDBT, 2004 WORKSHOPS; and Ying Xing, Stan Zdonik, Jeong-Hyon Hwang, "*Dynamic Load Distribution in the Borealis Stream Processor*," ICDE, 2005, for example.

However, according to the above-described technique, there is a problem in that it is difficult to suppress an increase in communication between devices. Hereinafter, a specific example will be described. First, an example of the above-described technique for distributing processing will be described.

FIGS. 35A and 35B are diagrams for illustrating examples of the above-described technique for distributing the processing. FIG. 35A illustrates an example of a query graph that illustrates the connection relation of queries. The query graph of the example illustrated in FIG. 35A represents that query Q2 is executed using an execution result of query Q1. In addition, the query graph of the example illustrated in FIG. 35A represents that query Q3 is executed using an execution result of query Q2. Furthermore, in the examples illustrated in FIGS. 35A and 35B, queries Q1 and Q3 are arranged in a server 90, and query Q2 is arranged in a server 91. In the examples illustrated in FIGS. 35A and 35B, the server 90 transmits the execution result of query Q1 to the server 91 in which query Q2 is arranged. In addition, in the examples illustrated in FIGS. 35A and 35B, the server 91 transmits the execution result of query Q2 to the server 90 in which query Q3 is arranged. In this way, in the examples illustrated in FIGS. 35A and 35B, when queries Q1 to Q3 are executed, the transmission of an execution result between the servers 90 and 91 is performed twice.

Next, an example of a technique for arranging the above-described queries that are adjacent to each other in the same device will be described. FIGS. 36A and 36B are diagrams that illustrate an example of a technique for arranging the above-described queries adjacent to each other in the same device. FIG. 36A illustrates an example of a query graph that illustrates the connection relation between queries. The query graph of the example illustrated in FIG. 36A illustrates that queries Q2 and Q3 are executed using an execution result of query Q1. In addition, the query graph of the example illustrated in FIG. 36A illustrates that query Q3 is executed using an execution result of query Q2. Furthermore, in the examples illustrated in FIGS. 36A and 36B, queries Q1 and Q2 are arranged in a server 90, and query Q3 is arranged in a server 91 in accordance with the adjacency relation of queries that is represented by the query graph. Here, it is assumed that the number of times of transmitting a processing result from the device in which query Q1 is arranged to the device in which query Q3 is arranged is more than that of transmitting a processing result from the device in which query Q1 is arranged to the device in which query Q2 is arranged. In such a case, in the examples illustrated in FIGS. 36A and 36B, since queries Q1 and Q2 are arranged in the same server 90, the server 90 does not transmit an execution result between queries Q1 and Q2. However, in the examples illustrated in FIGS. 36A and 36B, the server 90 transmits the execution result of query Q1 to the server 91 in which query Q3 is arranged. As above, in the examples illustrated in FIGS. 36A and 36B, when queries Q1 to Q3 are executed, execution results are transmitted between the servers 90 and 91.

Therefore, according to the above-described technique, it is difficult to suppress an increase in communication between the devices.

SUMMARY

According to an aspect of an embodiment, an arrangement device includes: an acquisition unit that acquires information representing the number of times of communication between queries executed in a plurality of devices in which the plurality of queries are arranged, the query being used for performing processes when data meets set conditions; a specifying unit that specifies a set of queries based on the number of times of communication that is represented by the information acquired by the acquisition unit; and a determination unit that determines to arrange the set of queries specified by the specifying unit in a same device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A is a diagram that illustrates an example of the data structure of communication count information;

FIG. 7B is a diagram that illustrates an example of the data structure of communication count information;

FIG. 7C is a diagram that illustrates an example of the data structure of communication count information;

FIG. 7D is a diagram that illustrates an example of the data structure of communication count information;

FIG. 9 is a diagram that schematically illustrates the configuration of a CEP system according to the flow of data;

FIG. 17 is a flowchart that illustrates the sequence of a determination process;

FIGS. 22A and 22B are flowcharts that illustrate the sequence of a determination process according to the fourth embodiment;

FIG. 23 is a flowchart that illustrates the sequence of a determination process according to the fourth embodiment;

FIG. 24 is a flowchart that illustrates the sequence of a determination process according to the fourth embodiment;

FIGS. 27A and 27B are flowcharts that illustrate the sequence of a determination process according to the fifth embodiment;

DESCRIPTION OF EMBODIMENTS

Preferred embodiments of the present invention will be explained with reference to accompanying drawings. However, the embodiments are not for the purpose of limiting the disclosed techniques. In addition, the embodiments can be appropriately combined in a range not causing the processing contents to be contradictory to each other.

[a] First Embodiment

Figure 1:
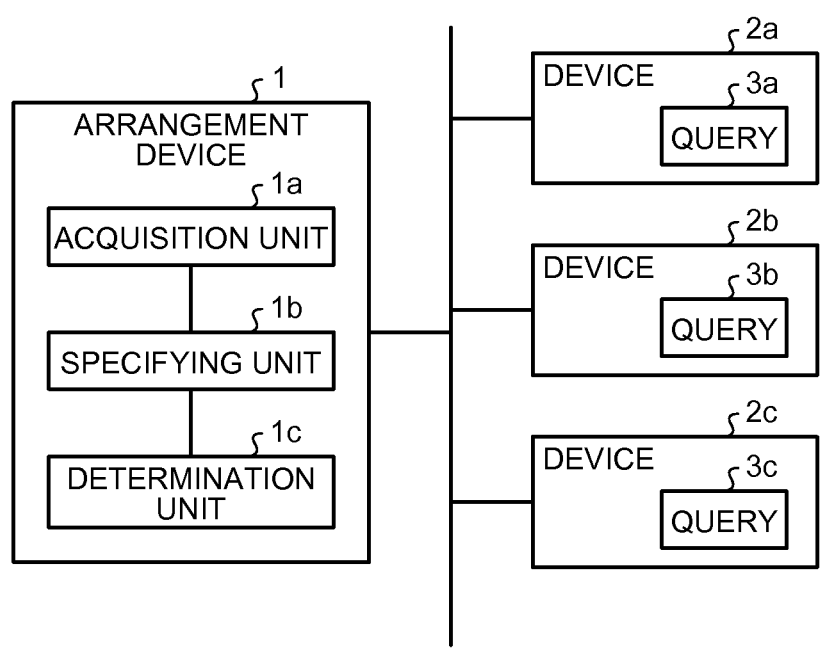
FIG. 1 is a diagram that illustrates an example of the configuration of a CEP system that includes an arrangement device according to a first embodiment.

An arrangement device according to a first embodiment will now be described. FIG. 1 is a diagram that illustrates an example of the configuration of a CEP system that includes the arrangement device according to the first embodiment. The CEP system illustrated in FIG. 1 includes an arrangement device 1 and a plurality of devices 2a to 2c. In the example illustrated in FIG. 1, the arrangement device 1 and the plurality of devices 2a to 2c are connected to each other. Accordingly, the arrangement device 1 and each one of the plurality of devices 2a to 2c can communicate with each other.

The arrangement device 1 is a physical server that manages the CEP system. For example, the arrangement device 1 is a management server that is disposed in a data center or each company. Each one of the devices 2a to 2c is a physical server or a virtual machine that operates in a physical server. In the devices 2a to 2c, a plurality of queries 3a to 3c that are used for performing processes in a case where data meets set conditions is arranged. Data collected from various sources is delivered (transmitted) to the devices 2a to 2c. The devices 2a to 2c receive data that is received from the outside of the CEP system or data that represents a processing result in another query within the CEP system. when the data meets the conditions set in the queries 3a to 3c, the devices 2a to 2c perform the processes set in the queries 3a to 3c.

Each one of the queries 3a to 3c arranged in the devices 2a to 2c is rearranged in any one of the devices 2a to 2c by the arrangement device 1. For example, when the processing load is distributed, the devices 2a to 2c move queries from the device having a high processing load to the device having a low processing load.

Here, a case will be described in which the processing result (execution result) of the query 3a is used when the query 3b is executed, and the processing result of the query 3a or 3c is used when the query 3c is executed. In such a case, the device 2a performs a process that is set in the query 3a when the data received from the outside meets the condition set in the query 3a. Then, the device 2a transmits the processing result acquired by performing the process set in the query 3a to the device 2b in which the query 3b is arranged or the device 2c in which the query 3c is arranged. In addition, the device 2b performs a process that is set in the query 3b when the data received from the device 2a meets the condition set in the query 3b. Then, the device 2b transmits the processing result acquired by performing the process set in the query 3b to the device 2c in which the query 3c is arranged. Here, assume that the device 2a transmits the processing result acquired by performing the process set in the query 3a to the device 2c more times than to the device 2b. Here, as described above, the device 2b performs a process that is set in the query 3b based on the data received from the device 2a and transmits the processing result to the device 2c. In such a case, the number of times of communication performed between the queries 3a and 3c is more than that between the queries 3b and 3c. At this time, a set of queries 3a and 3c between which the number of times of communication is relatively large is determined to be arranged in the same device by the control of the arrangement device 1 to be described below.

In addition, the device 2c adds up the numbers of times of communication performed between the queries 3a and 3b, the queries 3a and 3c, and the queries 3b and 3c respectively and transmits the add-up results to the arrangement device 1. In other words, the device 2c transmits information that represents the number of times of communication performed between queries to the arrangement device 1. The "number of times of communication performed between queries A and B" represents the number of times of communication (transmission of a processing result) performed between a device in which the query A is arranged and a device in which the query B is arranged.

As illustrated in FIG. 1, the arrangement device 1 includes an acquisition unit 1a, a specifying unit 1b, and a determination unit 1c.

The acquisition unit 1a acquires information that represents the numbers of times of communication performed between queries. For example, the acquisition unit 1a acquires such information by receiving information, which is transmitted from the device 2c, representing the numbers of times of communication performed between queries.

The specifying unit 1b specifies a set of queries based on the numbers of times of communication that are represented by the information acquired by the acquisition unit 1a. For example, the specifying unit 1b specifies a set of queries 3a and 3c corresponding to the communication between queries 3a and 3c, of which the number of times is the largest, out of the communication between queries 3a and 3b, the communication between queries 3a and 3c, and the communication between queries 3b and 3c.

The determination unit 1c determines to arrange the set of queries, which is specified by the specifying unit 1b, in the same device. For example, the determination unit 1c determines to arrange the set of queries 3a and 3c, which has been specified by the specifying unit 1b, in the same device 2a, 2b, or 2c.

As above, the arrangement device 1 according to the first embodiment determines that the queries 3a and 3c are to be arranged in the same device. When the queries 3a and 3c are arranged in the same device based on the determination, the communication for the processing result between two devices, which has been performed between the devices 2a and 2c before the queries 3a and 3c are arranged in the same device, is not performed. Therefore, according to the arrangement device 1 of the embodiment, an increase in the number of times of communication can be suppressed.

In the example illustrated in FIG. 1, in order to represent the functional configuration, the acquisition unit 1a, the specifying unit 1b, and the determination unit 1c are separately configured. However, they may be configured as one device such as an electronic circuit, e.g., a CPU (central processing unit), an MPU (micro processing unit), or the like. Alternatively, they may be configured as an integrated circuit such as an ASIC (application specific integrated circuit) or an FPGA (field programmable gate array).

[b] Second Embodiment

Figure 2:
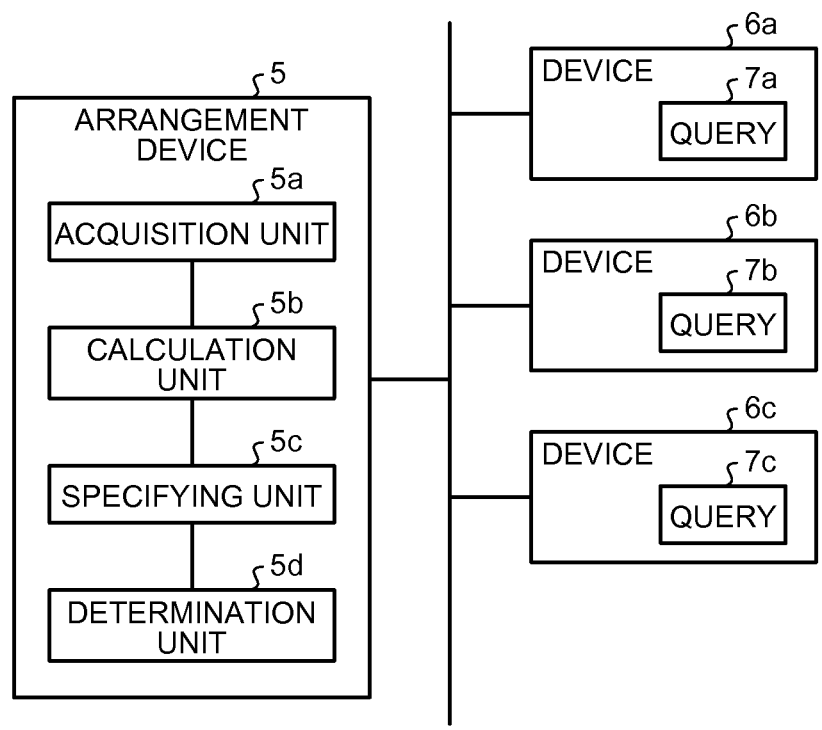
FIG. 2 is a diagram that illustrates an example of the configuration of a CEP system that includes an arrangement device according to a second embodiment.

Next, a second embodiment will be described. FIG. 2 is a diagram that illustrates an example of the configuration of a CEP system that includes an arrangement device according to the second embodiment. The CEP system of the example illustrated in FIG. 2 includes an arrangement device 5 and a plurality of devices 6a to 6c. In the example illustrated in FIG. 2, the arrangement device 5 and the plurality of devices 6a to 6c are interconnected. Accordingly, the arrangement device 5 and each one of the plurality of devices 6a to 6c can communicate with each other.

The arrangement device 5 is a physical server that manages the CEP system. For example, the arrangement device 5 is a management server that is disposed in a data center or each company. Each one of the devices 6a to 6c is a physical server or a virtual machine that operates in a physical server. In the devices 6a to 6c, a plurality of queries 7a to 7c that are used for performing processes in a case where data meets set conditions is arranged. Data collected from various sources is delivered (transmitted) to the devices 6a to 6c. The devices 6a to 6c receive data that is received from the outside of the CEP system or data that represents a processing result in another query within the CEP system. When the received data meets the conditions set in the queries 7a to 7c, the devices 6a to 6c perform the processes set in the queries 7a to 7c.

In addition, each one of the queries 7a to 7c arranged in the devices 6a to 6c is rearranged in any one of the devices 6a to 6c by the arrangement device 5. For example, when the processing load is distributed, the devices 6a to 6c move queries from the device having a high processing load to the device having a low processing load.

Here, a case will be described in which the processing result of the query 7a is used when the query 7b is executed, and the processing result of the query 7a or 7c is used when the query 7c is executed. In such a case, the device 6a performs a process that is set in the query 7a when the data received from the outside meets the condition set in the query 7a. Then, the device 6a transmits the processing result acquired by performing the process set in the query 7a to the device 6b in which the query 7b is arranged or the device 6c in which the query 7c is arranged. The device 6b performs a process that is set in the query 7b when the data received from the device 6a meets the condition set in the query 7b. Then, the device 6b transmits the processing result acquired by performing the process set in the query 7b to the device 6c in which the query 7c is arranged. Here, assume that the device 6a transmits the processing result acquired by performing the process set in the query 7a to the device 6c more number of times than to the device 6b. In addition, as described above, the device 6b performs a process that is set in the query 7b based on the data received from the device 6a and transmits the processing result to the device 6c. Accordingly, as a result, the number of times of communication performed between the queries 7a and 7c is more than that between the queries 7b and 7c. At this time, a set of queries 7a and 7c between which the number of times of communication is relatively large is determined to be arranged in the same device by the control of the arrangement device 5 to be described below.

In addition, in a case where the identifier of a query has not been received from any other device, when the process set in the query is executed, each one of the devices 6a to 6c transmits the following information to the other devices. In other words, each one of the devices 6a to 6c transmits a processing result and the identifier of a query that has been executed to the other devices. For example, in a case where the identifier of a query has not been received from any other device, the device 6a transmits the processing result of the process set in the query 7a and the identifier of the executed query 7a to the device 6b or the device 6c.

On the other hand, in a case where the identifier of a query has been received from any other device, each one of the devices 6a to 6c transmits the identifier of the received query and the identifier of the executed query in a format for which the execution order of queries can be recognized, together with the processing result. For example, the device 6b transmits the processing result of a process set in the query 7b to the device 6c. In addition to this, in a case where the identifier of the query 7a has been received from the device 6a, the device 6b performs the following process. The device 6b transmits information to the device 6c in which the identifier of the executed query 7b is aligned after the identifier of the received query 7a so as to allow the execution order of queries to be recognizable, in other words, information from which the execution of the query 7b after the execution of the query 7a can be recognized. In addition, the device 6c transmits the processing result of a process that is set in the query 7c to the arrangement device 5. In addition to this, in a case where the identifier of the received query is the identifier of the query 7a, the device 6c performs the following process so as to allow the execution order of queries to be recognizable. The device 6c transmits information in which the identifier of the executed query 7c is aligned after the identifier of the received query 7a, in other words, information from which the execution of the query 7c after the execution of the query 7a can be recognized to the device 6c. In addition, in a case where the identifiers of the received query is the identifier of the query 7a and the identifier of the query 7b, the device 6c performs the following process so as to allow the execution order of queries to be recognizable. The device 6c transmits information in which identifiers are aligned in the order of the identifier of the query 7a, the identifier of the query 7b, and the identifier of the executed query 7c, in other words, information from which the execution of queries in the order of queries 7b and 7c after the execution of the query 7a can be recognized to the arrangement device 5. In this way, the device 6c transmits the information that represents the execution order of queries to the arrangement device 5.

As illustrated in FIG. 2, the arrangement device 5 includes an acquisition unit 5a, a calculation unit 5b, a specifying unit 5c, and a determination unit 5d.

The acquisition unit 5a acquires information that represents the execution order of queries. For example, the acquisition unit 5a acquires such information by receiving the information, which is transmitted from the device 6c, representing the execution order of queries.

The calculation unit 5b calculates the number of times of communication between queries based on the information that is acquired by the acquisition unit 5a. For example, in a case where information representing that the query 7c is executed after the query 7a is included in the information that represents the execution sequence of queries, the calculation unit 5b increments the number of times of communication between the queries 7a and 7c by one. In addition, in a case where information representing that the query 7b is executed after the query 7a is included in the information that represents the execution sequence of queries, the calculation unit 5b increments the number of times of communication between the queries 7a and 7b by one. Furthermore, in a case where information representing that the query 7c is executed after the query 7b is included in the information that represents the execution sequence of queries, the calculation unit 5b increments the number of times of communication between the queries 7b and 7c by one.

The specifying unit 5c specifies a set of queries based on the numbers of times of communication that are calculated by the calculation unit 5b. For example, the specifying unit 5c specifies a set of queries 7a and 7c corresponding to the communication between queries 7a and 7c, of which the number of times is the most, out of the communication between queries 7a and 7b, the communication between queries 7a and 7c, and the communication between queries 7b and 7c.

The determination unit 5d determines that the set of queries, which is specified by the specifying unit 5c, is arranged in the same device. For example, the determination unit 5d determines that the set of queries 7a and 7c, which has been specified by the specifying unit 5c, is arranged in the same device 6a or 6c.

As above, the arrangement device 5 according to the embodiment determines that the queries 7a and 7c are to be arranged in the same device. Accordingly, in a case where the queries 7a and 7c are arranged in the same device based on the determination, the communication for the processing result between two devices, which has been performed between the devices 6a and 6c before the queries 7a and 7c are arranged in the same device, is not performed. Therefore, according to the arrangement device 5 of the embodiment, an increase in the number of times of communication can be suppressed.

In the example illustrated in FIG. 2, in order to represent the functional configuration, the acquisition unit 5a, the calculation unit 5b, the specifying unit 5c, and the determination unit 5d are separately configured. However, they may be configured as one device such as an electronic circuit, e.g., a CPU (central processing unit), an MPU (micro processing unit), or the like. Alternatively, they may be configured as an integrated circuit such as an ASIC (application specific integrated circuit) or an FPGA (field programmable gate array).

[c] Third Embodiment

Figure 3:
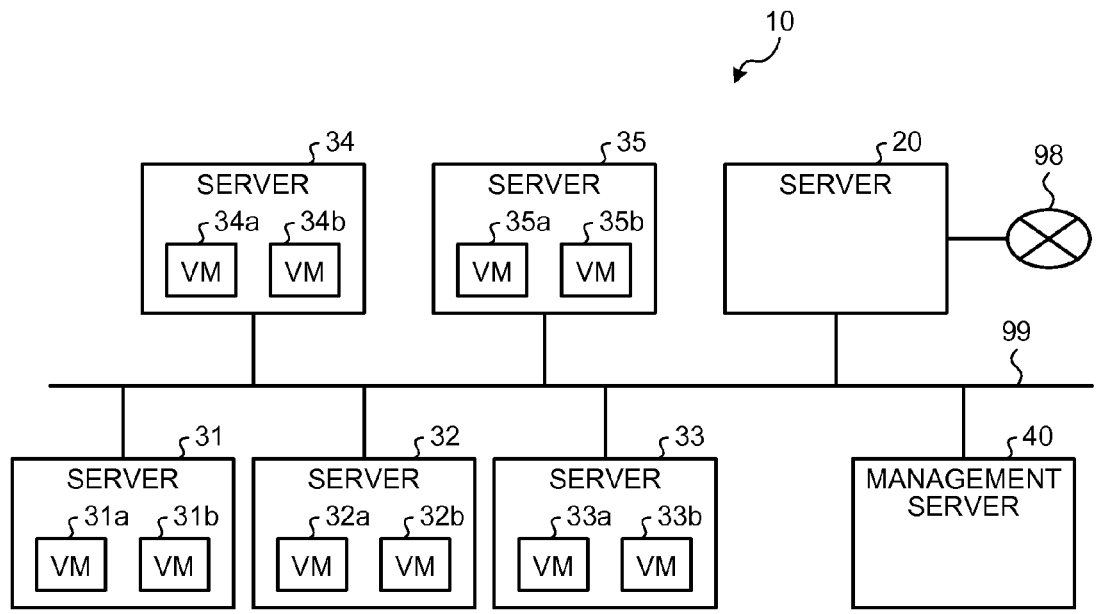
FIG. 3 is a diagram that illustrates an example of the configuration of a CEP system according to a third embodiment.

A third embodiment will now be described. In the third embodiment, a CEP system will be described in which VMs operate in a plurality of servers, and queries are arranged in the VMs. FIG. 3 is a diagram that illustrates an example of the configuration of a CEP system according to the third embodiment. A CEP system 10 includes servers 20, 31, 32, 33, 34, and 35, and a management server 40. Such servers are interconnected through a network 99. In other words, in the CEP system 10 of the example illustrated in FIG. 3, the servers can communicate with each other. As the type of the network 99, in both wired and wireless, an arbitrary communication network such as a LAN (local area network) or a VPN (virtual private network) may be used. In the example illustrated in FIG. 3, although a case is illustrated as an example in which the number of the servers 31 to 35 is five, the number of the management server 40 is one, and the number of the server 20 is one, such numbers are arbitrary.

In the server 31, VMs 31a and 31b operate. Similarly, in the servers 32 to 35, VMs 32a and 32b, VMs 33a and 33b, VMs 34a and 34b, and VMs 35a and 35b operate. In description of the embodiment, in a case where the VMs 32a, 32b, 33a, and 33b and VMs 34a, 34b, 35a, and 35b are described without any distinction therebetween, the above-described VMs collectively will be simply referred to as a VM. In addition, in the example illustrated in FIG. 3, although a case is illustrated as an example in which the number of VMs operating in each one of the servers 31 to 35 is two, the number of VMs operating in each one of the servers 31 to 35 may be an arbitrary value. In the VM, as will be described later, queries are arranged by the control of the management server 40. In addition, the VM receives data that is received from the outside of the CEP system 10 and is pre-processed data to be described later or data that represents a processing result in another query within the CEP system 10. Then, when the received data meets the condition set in the query that is arranged in the VM, the VM performs a process that is set in the query.

In addition, the VM, as will be described later, is notified of the address of a VM of the transmission destination as the processing result, for example, an IP (Internet protocol) address by the management server 40. In addition, as will be described later, a query graph is transmitted to the VM from the management server 40.

Furthermore, in a case where the identifier of a query has not been received from another VM, when the process set in the query is performed, the VM transmits the following information to another VM. The VM transmits data that includes the processing result and the identifier of the executed query to a VM that corresponds to the address. Here, in description presented below, such data may be represented as "event data".

In addition, in a case where the identifier of a query has been received from another VM, the VM includes the received identifier of the query and the identifier of the executed query in the event data in a form, for which the execution order of queries can be recognized, together with the processing result and transmits the event data. For example, by using the notified address, the VM transmits the event data to a VM corresponding to the address. At this time, when the identifier of a query has been received from another VM, the VM performs the following process. In order to allow the execution sequence of queries to be recognizable, the VM includes the information in which the identifier of the executed query is aligned after the identifier of the received query, in other words, the information from which the execution order of queries can be recognized in the event data and transmits the event data to a VM that corresponds to the address.

Figure 4:
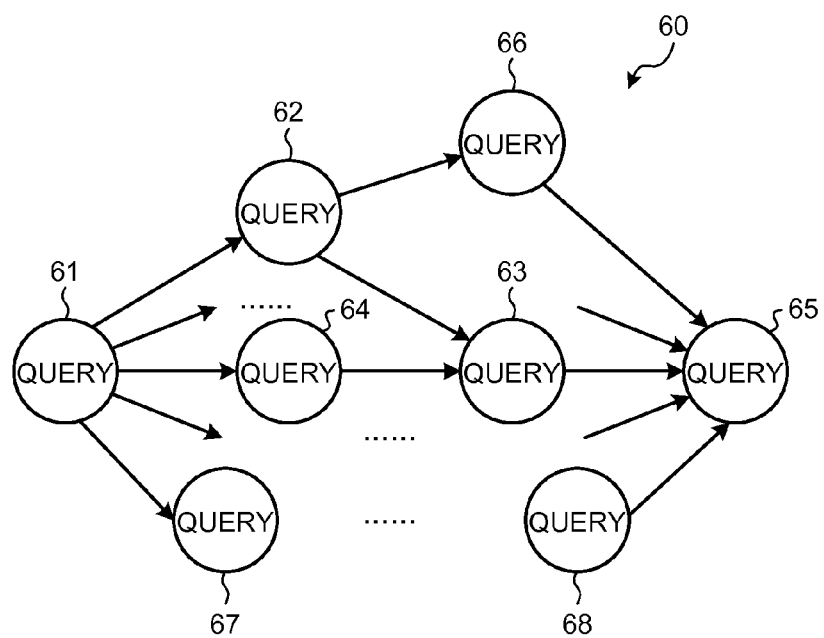
FIG. 4 is a diagram that illustrates an example of the process of a VM according to the third embodiment.
Figure 5:
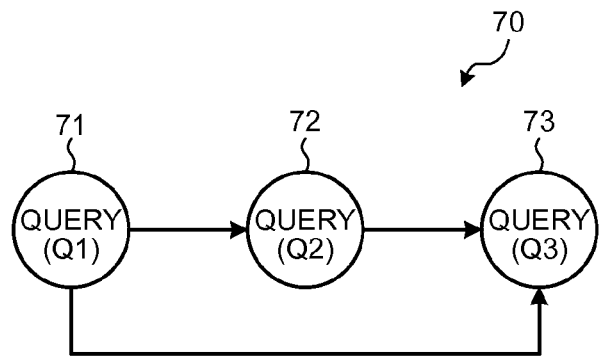
FIG. 5 is a diagram that illustrates an example of the process of a VM according to the third embodiment.
Figure 6:
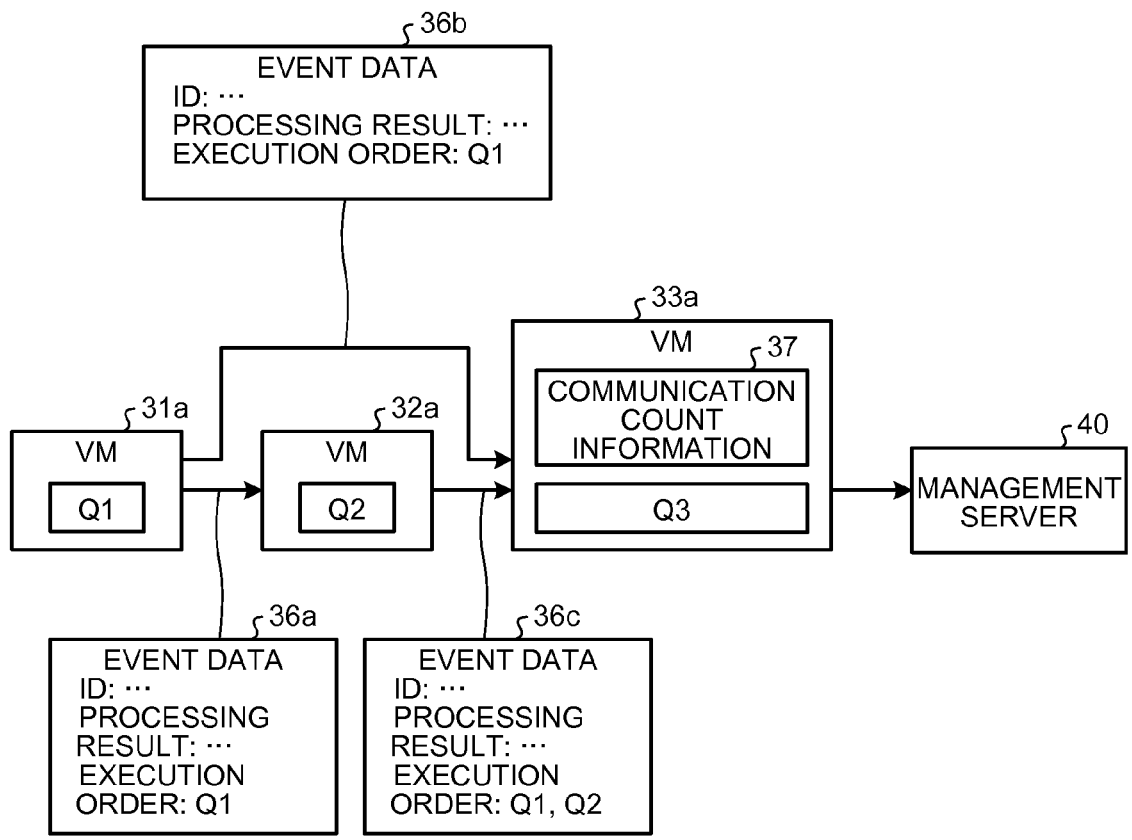
FIG. 6 is a diagram that illustrates an example of the process of a VM according to the third embodiment.

The process of the VM according to the third embodiment will now be described with reference to specific examples. FIGS. 4 to 6 are diagrams that illustrate examples of the process of the VM according to the third embodiment. FIG. 4 illustrates an example of a query graph 60 that is transmitted to the VM. In the example illustrated in FIG. 4, the query graph 60 illustrates the execution order of processes set in queries. The query graph 60 of the example illustrated in FIG. 4 illustrates that a process set in a query 62 is performed by using the execution result of a process set in a query 61. In addition, in the example illustrated in FIG. 4, processes set in queries 63 to 68 are similarly performed. Furthermore, the query graph 60 of the example illustrated in FIG. 4 illustrates that a query that is executed first is the query 61. In addition, the query graph 60 of the example illustrated in FIG. 4 illustrates that a query in which a process performed last is set is the query 65. Accordingly, the VM to which the query graph 60 illustrated in the example of FIG. 6 is transmitted can determine whether or not a query arranged therein is a query in which the process performed last is set based on the query arranged therein and the content of the query graph 60. For example, in a case where the query graph 60 is received, by determining whether or not the query arranged therein is the query 65 by referring to the query graph 60, the VM can determine whether or not the query arranged therein is a query in which the process performed last is set.

FIG. 5 illustrates an example of a part of another query graph 70. In the example illustrated in FIG. 5, the query graph 70 illustrates that processes set in queries 72 and 73 are performed by using the processing result of a process set in the query 71. In addition, the query graph 70 of the example illustrated in FIG. 5 illustrates that the process set in the query 73 is performed by using the processing result of the process set in the query 72. Here, an example of the operations of VMs 31a, 32a, and 33a in a case where the query graph 70 is transmitted to the VM by a management server 40, and queries 71, 72, and 73 are arranged in VMs 31a, 32a, and 33a will be described. In description presented below, the queries 71 to 73 may be denoted by "Q1", "Q2" and "Q3".

In the example illustrated in FIG. 6, the VMs 31a, 32a, and 33a, first, determine whether the queries Q1, Q2, and Q3 arranged therein are respectively the query Q3 in which the process performed last, which is represented by the query graph 70, is set. Accordingly, the VMs 31a and 32a determine that the queries Q1 and Q2 arranged therein are respectively not the query in which the process performed last is set. On the other hand, the VM 33a determines that the query Q3 arranged therein is the query in which the process performed last is set. The VM 33a that has made such a determination, as will be described later, adds up the number of times of communication between each queries based on the execution order of the queries Q1, Q2, and Q3 included in the event data and transmits communication count information including the add up results to the management server 40.

In the example illustrated in FIG. 6, the VM 31a registers an identifier that is used for identifying event data in item "ID (identification)" of event data 36a that is transmitted to the VM 32a. In addition, the VM 31a registers a processing result of the process set in the query Q1 in item "processing result" of the event data 36a. Furthermore, the VM 31a registers an identifier "Q1" of the query Q1 in which the executed process is set in item "execution order" of the event data 36a. In addition, the VM 31a registers information corresponding to each item in the other various items of the event data 36a. In this way, the VM 31a generates the event data 36a. Then, the VM 31a transmits the generated event data 36a to the VM 32a by using the address of the VM 32a of the transmission destination for a processing result, of which the VM 31a has been notified from the management server 40.

In addition, the VM 31a registers an identifier that is used for identifying event data in item "ID" of event data 36b that is transmitted to the VM 33a. In addition, the VM 31a registers a processing result of the process set in the query Q1 in item "processing result" of the event data 36b. Furthermore, the VM 31a registers an identifier "Q1" of the query Q1 in which the executed process is set in item "execution order" of the event data 36b. In addition, in the other various items of the event data 36b, the VM 31a registers information corresponding to each item. In this way, the VM 31a generates the event data 36b. Then, the VM 31a transmits the generated event data 36b to the VM 33a by using the address of the VM 33a of the transmission destination for a processing result, of which the VM 31a has been notified from the management server 40.

Then, when the event data 36a is received, the VM 32a determines whether or not data of the processing result that is registered in item "processing result" of the event data 36a meets a condition set in the query Q2. Subsequently, in a case where the data meets the condition, the VM 32a performs the process set in the query Q2. Then, the VM 32a registers an identifier that is used for identifying event data in item "ID" of the event data 36c transmitted to the VM 33a. In addition, the VM 32a registers the processing result of the process set in the query Q2 in item "processing result" of the event data 36c. Furthermore, the VM 32a acquires the identifier "Q1" registered in item "execution order" of the event data 36a and performs the following process so as to align the identifier "Q2" of the query Q2, in which the executed process is set, after the acquired identifier "Q1". The VM 32a registers identifiers "Q1" and "Q2" such that the identifier "Q2" is aligned after the identifier "Q1" in item "execution order" of the event data 36c. In addition, in the other various items of the event data 36c, the VM 32a registers information corresponding to each item thereof. In this way, the VM 32a generates the event data 36c. Then, the VM 32a transmits the generated event data 36c to the VM 33a by using the address of the VM 33a of the transmission destination for a processing result, of which the VM 32a has been notified from the management server 40.

Then, when the event data 36b is received, the VM 33a determines whether or not data of the processing result that is registered in item "processing result" of the event data 36b meets a condition set in the query Q3. Subsequently, in a case where the data meets the condition, the VM 33a performs the process set in the query Q3. Then, the VM 33a acquires the identifier "Q1" registered in item "execution order" of the event data 36b and generates information "Q1, Q3" in which the identifier "Q3" of the query Q3 in which the executed process is set is aligned after the acquired identifier "Q1". Then, the VM 33a determines that the process set in the query Q3 represented by the identifier "Q3" is performed after the process set in the query Q1 represented by the identifier "Q1" is performed by referring to the generated information "Q1, Q3". Subsequently, the VM 33a increments a value that is registered in the items corresponding to the item "Q1" of the transmission source of communication count information 37 and the item "Q3" of the transmission destination by one based on the determination result.

FIGS. 7A to 7D are diagrams that illustrate examples of the data structure of the communication count information. In the communication count information 37, the number of times between queries is registered. In the example illustrated in FIG. 7A, the communication count information 37 has items 37a in which the number of times of communication corresponding to a query (former query), in which a process performed first is set, and a query (latter query), in which a process performed later is set, is registered for two queries, in which the execution order of the processes set in the queries is adjacent to each other. The example illustrated in FIG. 7A illustrates a so-called initial state that is a state before the values of items 37a are incremented by the VM 33a, and the values of all the items 37a are "0".

In a case where the registered content of the items 37a of the communication count information 37 is as illustrated in the example illustrated in FIG. 7A, as described above, in a case where the VM 33a determines that the process set in the query Q3 is performed after the process set in the query Q1 is performed, the VM 33a performs the following process. As illustrated in the example illustrated in FIG. 7B, the VM 33a increments a value registered in an item 37a that corresponds to "Q1" as the item of the "former query" and "Q3" as the item of the "latter query" by one.

In addition, when the event data 36c is received, the VM 33a determines whether or not processing result data registered in item "processing result" of the event data 36c meets a condition set in the query Q3. Subsequently, in a case where the data meets the condition, the VM 33a performs the process that is set in the query Q3. Then, the VM 33a acquires an identifier "Q1, Q2" that is registered in item "execution order" of the event data 36c and generates information "Q1, Q2, Q3" in which an identifier "Q3" of the query Q3 in which the executed process is set is aligned after the acquired identifier "Q1, Q2". Then, the VM 33a determines that the process set in the query Q2 represented by the identifier "Q2" is performed after the process set in the query Q1 represented by the identifier "Q1" is performed, by referring to the generated information "Q1, Q2, Q3". In addition, the VM 33a determines that the process set in the query Q3 represented by the identifier "Q3" is performed after the process set in the query Q2 represented by the identifier "Q2" is performed, by referring to the generated information "Q1, Q2, Q3". Subsequently, the VM 33a increments a value that is registered in an item corresponding to "Q1" as an item of the transmission source of the communication count information 37 and "Q2" as an item of the transmission destination by one, based on the determination result. In addition, the VM 33a increments a value that is registered in an item corresponding to "Q2" as an item of the transmission source of the communication count information 37 and "Q3" as an item of the transmission destination by one, based on the determination result.

In a case where the registered content of the items 37a of the communication count information 37 is as illustrated in the example illustrated in FIG. 7A, as described above, when the VM 33a determines that the process set in the query Q2 is performed after the process set in the query Q1 is performed, the VM 33a performs the following process. As illustrated in the example illustrated in FIG. 7C, the VM 33a increments a value registered in an item 37a that corresponds to "Q1" as the item of the "former query" and "Q2" as the item of the "latter query" by one. In addition, in such a case, as described above, when the VM 33a determines that the process set in the query Q3 is performed after the process set in the query Q2 is performed, the VM 33a performs the following process. As illustrated in the example illustrated in FIG. 7C, the VM 33a increments a value registered in an item 37a that corresponds to "Q2" as the item of the "former query" and "Q3" as the item of the "latter query" by one.

In addition, from the case illustrated in the example illustrated in FIG. 7A, in a case where the number of times of determining that the process set in the query Q3 is performed after the process set in the query Q1 is performed is "10", the VM 33a performs the following process. The VM 33a increments a value registered in an item 37a corresponding to "Q1" as the item of the "former query" and "Q3" as the item of the "latter query" by one is performed ten times. As a result, as illustrated in the example illustrated in FIG. 7D, the value registered in the item 37a corresponding to "Q1" as the item of the "former query" and "Q3" as the item of the "latter query" becomes "10". In addition, in a case where the number of times of determining that the process set in the query Q2 is performed after the process set in the query Q1 is performed is "1", the VM 33a performs the following process. The VM 33a increments a value registered in an item 37a corresponding to "Q1" as the item of the "former query" and "Q2" as the item of the "latter query" by one is performed once. As a result, as illustrated in the example illustrated in FIG. 7D, the value registered in the item 37a corresponding to "Q1" as the item of the "former query" and "Q2" as the item of the "latter query" becomes "1". Furthermore, in a case where the number of times of determining that the process set in the query Q3 is performed after the process set in the query Q2 is performed is "1", the VM 33a performs the following process. The VM 33a increments a value registered in an item 37a corresponding to "Q2" as the item of the "former query" and "Q3" as the item of the "latter query" by one is performed once. As a result, as illustrated in the example illustrated in FIG. 7D, the value registered in the item 37a corresponding to "Q2" as the item of the "former query" and "Q3" as the item of the "latter query" becomes "1".

In this way, the VM 33a that has determined that the query Q3 arranged therein is a query in which a process performed last is set adds up the number of times of communication between queries in the execution order of queries Q1, Q2, and the like that is included in the event data. Then, the VM 33a generates communication count information 37 that includes a result of the adding up. Subsequently, the VM 33a transmits the generated communication count information 37 to the management server 40 at a predetermined time interval, for example, for every one minute.

In addition, the VM transmits load information that represents a load to the management server 40 for every predetermined time, for example, for every one minute. Here, the load information, for example, is information that represents the loads of processing elements that include a query, data accompanied by the query, and the like.

Figure 8:
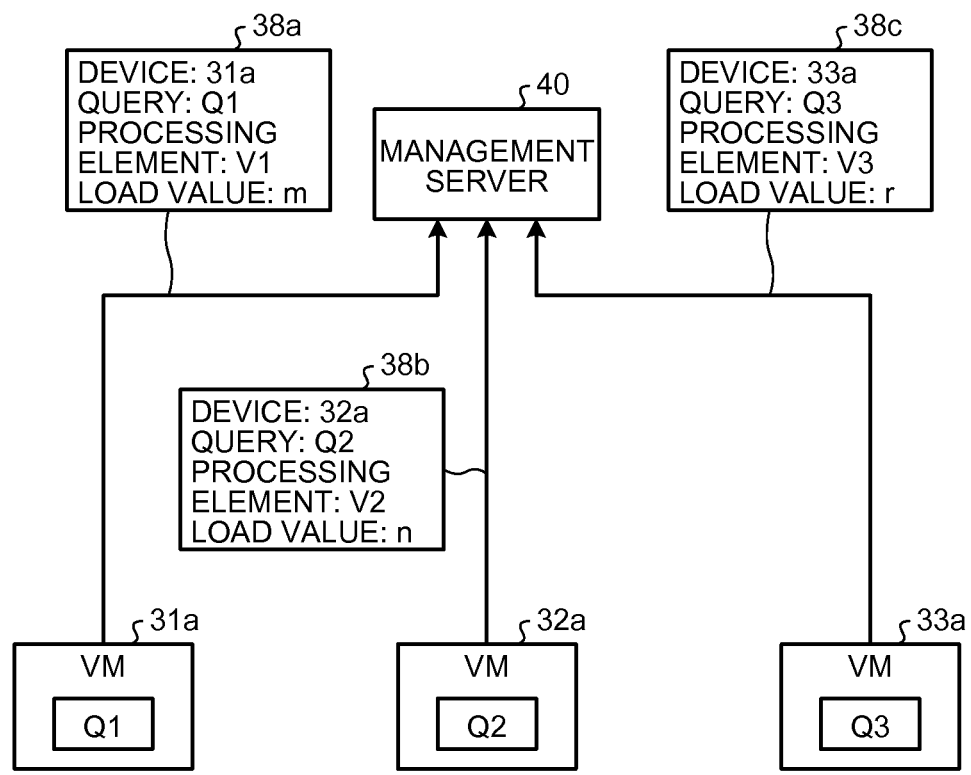
FIG. 8 is a diagram that illustrates an example of the process of a VM according to the third embodiment.

The process of the VM according to the third embodiment will be described with reference to a specific example. FIG. 8 is a diagram that illustrates an example of the process of the VM according to the third embodiment. In the example illustrated in FIG. 8, the VM 31a registers an identifier "31a" of the VM 31a in item "device" of load information 38a that is transmitted to the management server 40. In addition, in the example illustrated in FIG. 8, the VM 31a registers an identifier "Q1" of the query Q1 that is arranged in the VM 31a in item "query" of the load information 38a. Furthermore, in the example illustrated in FIG. 8, the VM 31a registers an identifier "V1" of the processing element that includes a query Q1 and data accompanied by the query Q1 in item "processing element" of the load information 38a. In addition, in the example illustrated in FIG. 8, the VM 31a registers the load of a processing element, for example, the number m of events processed during a unit time (for example, during one second) in item "load value" of the load information 38a.

In the example illustrated in FIG. 8, the VM 32a registers an identifier "32a" of the VM 32a in item "device" of load information 38b that is transmitted to the management server 40. In addition, in the example illustrated in FIG. 8, the VM 32a registers an identifier "Q2" of the query Q2 that is arranged in the VM 32a in item "query" of the load information 38b. Furthermore, in the example illustrated in FIG. 8, the VM 32a registers an identifier "V2" of the processing element that includes a query Q2 and data accompanied by the query Q2 in item "processing element" of the load information 38b. In addition, in the example illustrated in FIG. 8, the VM 32a registers the load of a processing element, for example, the number n of events processed during a unit time (for example, during one second) in item "load value" of the load information 38b.

Furthermore, in the example illustrated in FIG. 8, the VM 33a registers an identifier "33a" of the VM 33a in item "device" of load information 38c that is transmitted to the management server 40. In addition, in the example illustrated in FIG. 8, the VM 33a registers an identifier "Q3" of the query Q3 that is arranged in the VM 33a in item "query" of the load information 38c. Furthermore, in the example illustrated in FIG. 8, the VM 33a registers an identifier "V3" of the processing element that includes a query Q3 and data accompanied by the query Q3 in item "processing element" of the load information 38c. In addition, in the example illustrated in FIG. 8, the VM 33a registers the load of a processing element, for example, the number r of events processed during a unit time (for example, during one second) in item "load value" of the load information 38c.

In this way, the VMs 31a to 33a generate the load information 38a to 38c.

In addition, in the example illustrated in FIG. 8, the VMs 31a to 33a transmit the load information 38a to 38c to the management server 40 for every predetermined time.

The management server 40 is a sever that manages the server 20, the servers 31 to 35, and the VMs 31a to 35a and 31b to 35b. The management server 40 controls the arrangement of queries.

FIG. 9 is a diagram that schematically illustrates the configuration of the CEP system according to the flow of data. A server 20, VMs 31a to 35a and 31b to 35b, and a management server 40 store routing tables 50 in which the arrangement destination of each query is registered for each data entry that is a processing target of the query.

The server 20 receives many data entries from various sources through an external network 98. The server 20 performs preprocessing in which the received data is arranged in a predetermined data organization. Then, the server 20 specifies the arrangement destination of a query that has the received data as a processing target based on the routing table 50. Subsequently, the server 20 transmits the pre-processed data to a VM located at a specific arrangement destination. In the examples illustrated in FIGS. 3 and 9, although cases have been illustrated as examples in which the number of the server 20 is one, it may be configured such that a plurality of servers 20 are disposed, and data received by the plurality of servers 20 is transmitted to VMs.

Each VM operates an engine 51. The engine 51 is software that realizes the complex event processing. The engine 51 detects an event by matching the received data with a conditional expression of a query and controls the performance of the process of the detected event. In addition, in the CEP system 10, a series of processes is performed by a plurality of queries. For example, data as a processing result acquired in accordance with an upper-level query is transmitted to a lower-level query. Then, in the lower-level query, the transmitted data is used when a process set in the lower-level query is performed. In a case where a series of processes is performed in accordance with a plurality of queries, the engine 51 transmits data as a processing result of the queries to the VM in which a lower-level query is arranged. In addition, the engine 51 controls the process of moving the query to or from another engine 51 operating in another VM in accordance with an instruction for moving the query that is transmitted from the management server 40.

Here, the movement of the query will be described. There are cases where a query includes accompanying data. For example, in a case where a process of calculating an average of data as a processing target over a predetermined period is performed, the query maintains data that has been received during a period longer than the predetermined period so as to calculate the average. In addition, there are cases where the query uses predetermined data such as a table or the like for the process. In a case where a query is moved, the engine 51 moves the query and data accompanied by the query as processing elements.

Figure 10A:
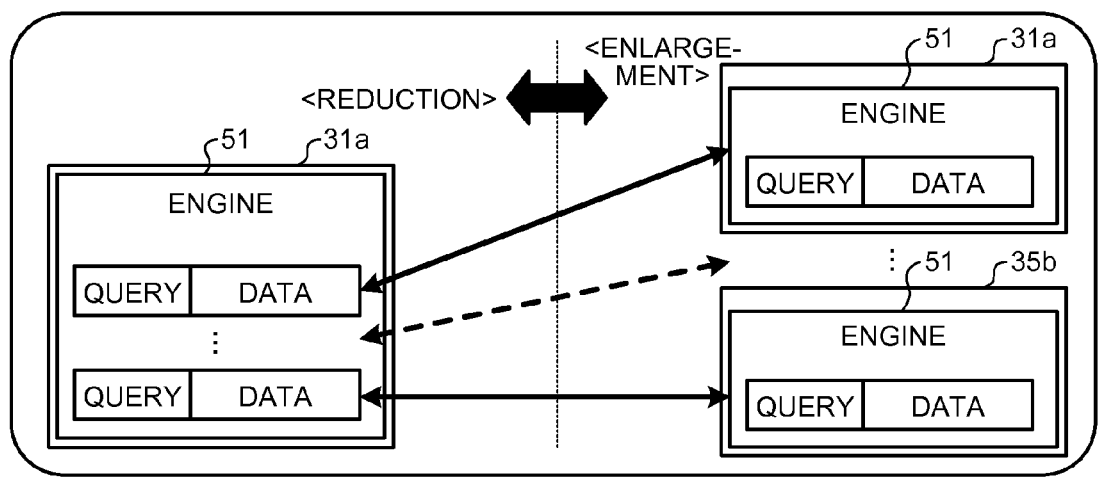
FIG. 10A is a diagram that illustrates an example of the movement of a query.

In addition, in the movement of a query, the following cases may be considered. FIG. 10A is a diagram that illustrates an example of the movement of a query. As illustrated in FIG. 10A, in a case where data as a processing target is different for each query, the query is moved, and data as the processing target is processed at the movement destination. For example, in a case where the processing is distributed, the queries are respectively moved to the VMs that are different from one another, and data is processed by the VMs. On the other hand, in a case where the processing load is low or the like, the queries are moved to less VMs, for example one VM, and data is processed by one VM.

Figure 10B:
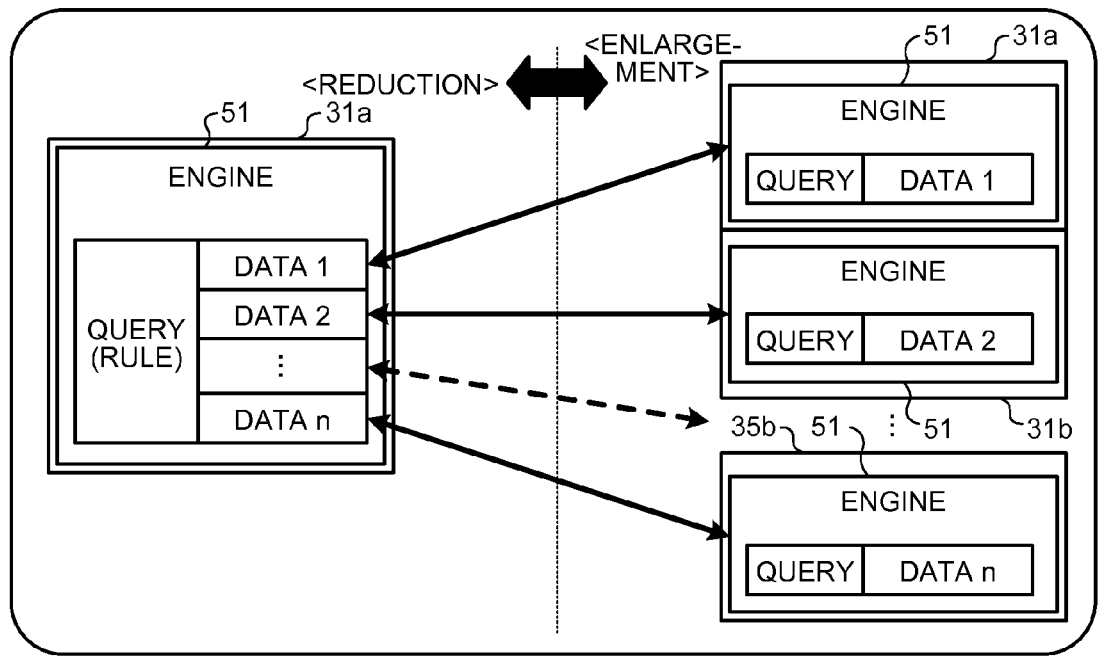
FIG. 10B is a diagram that illustrates another example of the movement of a query.

On the other hand, there are cases where there is a plurality of data entries that are processing targets of a query. For example, there is a case where a ticker symbol and a stock price are delivered to the VM as data, and a process of calculating a moving average of the stock prices of each ticker symbol over a predetermined period is performed by the query. FIG. 10B is a diagram that illustrates another example of the movement of a query. In the example illustrated in FIG. 10B, as illustrated on the left side in FIG. 10B, the query has data 1 to data n as processing targets. In such a case, for each one of data 1 to data n as the processing targets, the query is moved. For example, in a case where the processing is distributed, the queries are replicated and are moved to different VMs, and data 1 to data n as the processing target are processed by the VMs that are different from each other. On the other hand, in a case where the processing load is low or the like, the queries are arranged in one VM, and data 1 to data n as processing targets are processed by one VM.

Figure 11:
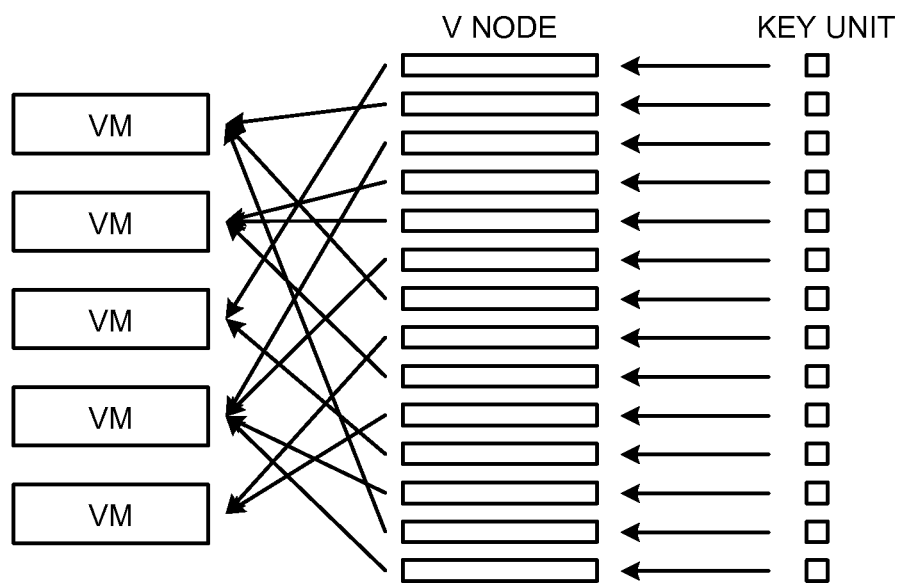
FIG. 11 is a diagram that illustrates an example of grouping queries.

Here, in the embodiment, a plurality of queries is divided into a plurality of groups, and the queries of each group are moved. In addition, the routing table 50 manages the storage destination of each group. FIG. 11 is a diagram that illustrates an example of grouping the queries. For example, in the embodiment, a key used for identifying data is included as integer data of a predetermined number of bits in each data as a processing target, and keys different from one another are set to the processing conditions of the queries. In such a case, by using a key that is set for each processing condition, a hash value is calculated by a predetermined function for calculating a value based on the key, for example, a hash function, and queries having the same hash value are grouped into the same group. For example, by using a key that is set in the processing condition, queries of which the hash value calculated by the hash function is the same are statically grouped as the same group. The example illustrated in FIG. 11 illustrates a case where each group acquired by dividing the queries into groups is a "V-Node". In the embodiment, the queries are arranged in the VMs for each V-Node. In addition, in the embodiment, a plurality of queries can be divided into mutually-different groups.

In the routing table 50, an arrangement destination is registered for each V-Node. For example, the routing table 50 includes an item in which the identifier of a V-Node is registered and an item in which the IP address of a VM located at the arrangement destination is registered.

The server 20 and the engine 51 of each VM determine an arrangement destination of a query based on a key. For example, the server 20 calculates a hash value by using a hash function using a key that is included in the received data. Then, the server 20 searches the routing table 50 for a record in which the calculated hash value is registered in the item in which the identifier of a V-Node is registered. Subsequently, in a case where a record is acquired as a search result, the server 20 acquires an IP address that is registered in the item, in which the IP address of the VM located at the arrangement destination is registered, of the acquired record. Then, the server 20 communicates with the VM using the acquired IP address.

As described above, each VM transmits the load information to the management server 40. Then, as will be described below, the management server 40 transmits an instruction (movement instruction) used for moving queries based on the load information that is transmitted from each VM. In addition, in the embodiment, the queries are moved in units of V-Nodes. The management server 40 transmits a movement instruction that includes the IP address of the VM of the movement destination and the identifier of the V-Node as a movement target to the VM of the movement source. The engine 51 of the VM that has received the movement instruction serializes processing elements such as queries belonging to the V-Node as the movement target and data accompanied by the queries, and transmits the serialized processing elements to the VM of the movement destination.

The engine 51 of the VM of the movement destination restores the transmitted data through deserialization and starts driving restored queries. In addition, the engine 51 updates the storage destination of queries that belong to the moved V-Node in the routing table 50 with the IP address of the VM in which the engine 51 operates. Then, the engine 51 notifies the other VMs, the server 20, and the management server 40 of a routing table updating instruction that includes the identifier of the V-Node as the movement target and the IP address of the VM of the movement destination. Since the management server 40 has information relating to the movement such as the IP addresses of the VMs of the movement source and the movement destination, and the identifier of the moved processing element, the management server 40 also can transmit a routing table updating instruction.

In a case where each VM, the server 20, and the management server 40 are notified of the routing table updating instruction, the following process is performed. Each VM, the server 20, and the management server 40 update the storage destinations of queries belonging to the V-Node as the notified movement target in the routing table 50 with the IP address of the VM of the movement destination that is included in the notified routing table updating instruction.

Figure 12:
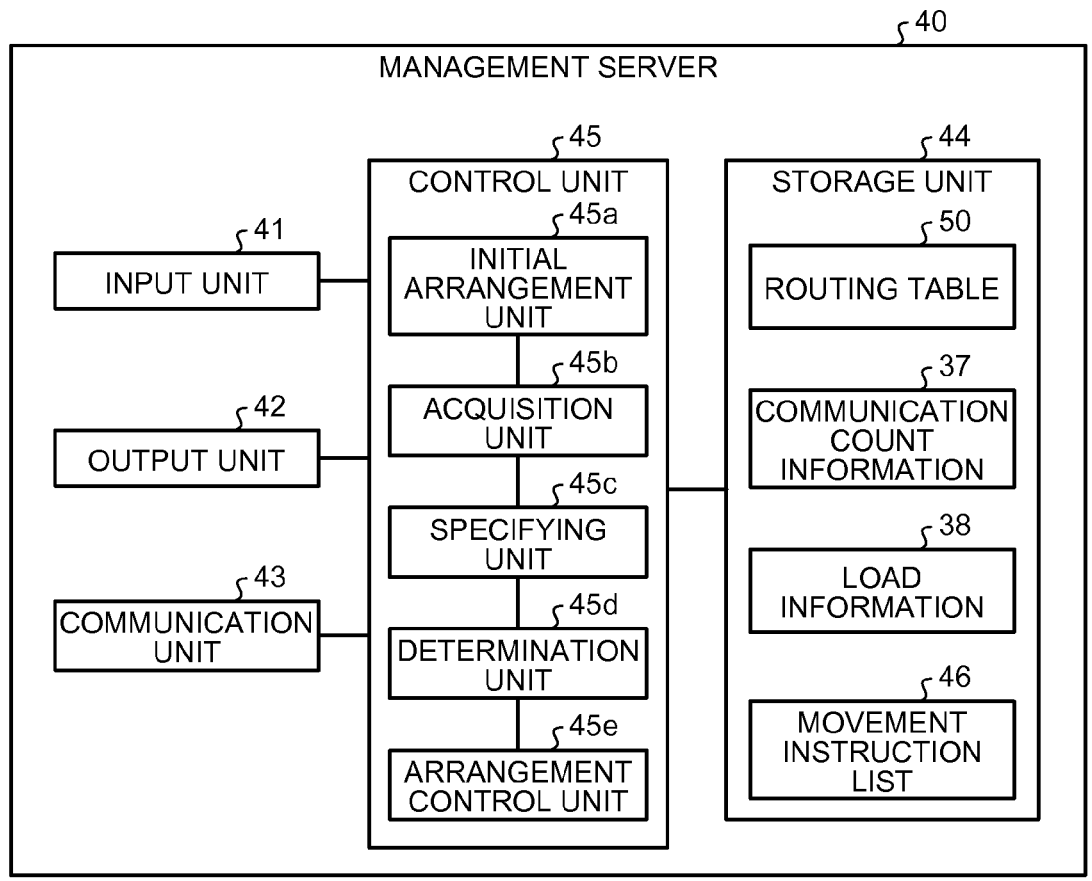
FIG. 12 is a diagram that illustrates an example of the configuration of a management server.

FIG. 12 is a diagram that illustrates an example of the configuration of the management server. As illustrated in FIG. 12, the management server 40 includes an input unit 41, an output unit 42, a communication unit 43, a storage unit 44, and a control unit 45.

The input unit 41 inputs various kinds of information to the control unit 45. For example, the input unit 41 receives various instructions from a user and inputs the received instructions to the control unit 45. As an example of the device of the input unit 41, there is a device that accepts a user's operation such as a mouse, a keyboard or the like.

The output unit 42 outputs various kinds of information. For example, the output unit 42 displays the operation state of the VM and the like. As an example of the device of the output unit 42, there is a liquid crystal display or the like.

The communication unit 43 is an interface that is used for communication between devices. For example, the communication unit 43 is connected to a network 99. Accordingly, the management server 40, the server 20, and each VM can communicate with one another. For example, in a case where the communication count information 37 is received from the VM through the network 99, the communication unit 43 transmits the received communication count information 37 to the control unit 45. In addition, in a case where load information 38 is received from the VM through the network 99, the communication unit 43 transmits the received load information 38 to the control unit 45.

The storage unit 44 stores various kinds of information. For example, the storage unit 44 stores the routing table 50, the communication count information 37, and the load information 38 described above and a movement instruction list 46.

The communication count information 37 is information that is transmitted from the VM, is acquired from the VM by an acquisition unit 45b to be described below, and is stored in the storage unit 44. The load information 38 is information that is transmitted from the VM, is acquired from the VM by the acquisition unit 45b to be described below, and is stored in the storage unit 44.

Figure 13:
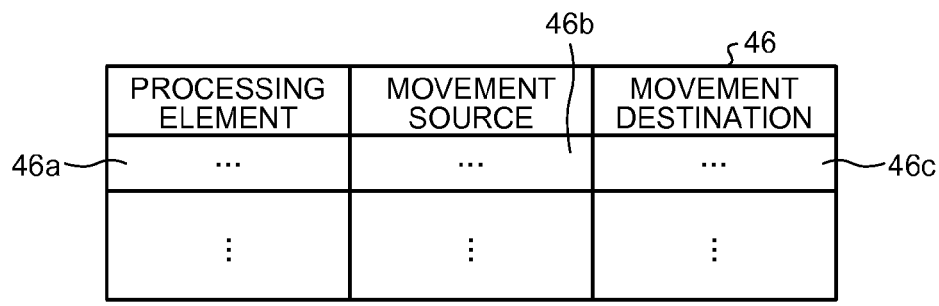
FIG. 13 is a diagram that illustrates an example of the data structure of a movement instruction list.

In the movement instruction list 46, the identifier of a processing element as a movement target, the IP address of the VM of the movement source, and the IP address of the VM of the movement destination are registered by a determination unit 45d to be described below. FIG. 13 is a diagram that illustrates an example of the data structure of the movement instruction list. In the example illustrated in FIG. 13, the movement instruction list 46 includes an item 46a of the "processing element" in which the identifier of the processing element as the movement target is registered, an item 46b of the "movement source" in which the IP address of the VM as the movement source is registered, and an item 46c of the "movement destination" in which the IP address of the VM of the movement destination is registered.

The storage unit 44, for example, is a semiconductor memory device such as flash memory or a storage device such as a hard disk or an optical disc. In addition, the storage unit 44 is not limited to a storage device of the above-described type but may be RAM (random access memory) or ROM (read only memory).

The control unit 45 has internal memory that is used for storing programs defining various processing sequences and control data, and performs various processes by using the programs and the control data. As illustrated in FIG. 12, the control unit 45 includes an initial arrangement unit 45a, the acquisition unit 45b, a specifying unit 45c, the determination unit 45d, and an arrangement control unit 45e.

The initial arrangement unit 45a arranges queries in a plurality of VMs using a known technique based on a query graph. In addition, the initial arrangement unit 45a transmits the query graph to each VM. Furthermore, the initial arrangement unit 45a notifies each VM of a query in which a process to be performed by the VM is set. In addition, the initial arrangement unit 45a transmits the IP address of the VM of the transmission destination as a processing result of the process to each VM.

The acquisition unit 45b acquires various kinds of information. For example, the acquisition unit 45b acquires the communication count information 37 that represents the number of times of communication between queries for a plurality of queries of which the processes are performed in a plurality of VMs.

A specific example will now be described. The acquisition unit 45b acquires the communication count information 37 by receiving the communication count information 37 that is transmitted from the VM through the communication unit 43. In a case where the communication count information 37 is acquired, the acquisition unit 45b stores the acquired communication count information 37 in the storage unit 44. In addition, the acquisition unit 45b acquires the load information 38 by receiving the load information 38 that is transmitted from the VM through the communication unit 43. In a case where the load information 38 is acquired, the acquisition unit 45b stores the acquired load information 38 in the storage unit 44. In addition, the acquisition unit 45b acquires the communication count information 37 and the load information 38 that are stored in the storage unit 44.

The specifying unit 45c specifies various kinds of information. For example, the specifying unit 45c specifies a set of queries based on the number of times of communication that is represented by the communication count information that is acquired by the acquisition unit 45b.

A specific example will now be described. First, the specifying unit 45c calculates a sum of loads of processing elements for each VM by using the load information 38 acquired by the acquisition unit 45b so as to calculate the load of each VM. Subsequently, the specifying unit 45c calculates an average value Ave of the loads of all the VMs by using the calculated loads of each VM. Thereafter, the specifying unit 45c determines whether or not there is a VM of which the load is a threshold value α or more.

Figure 14:
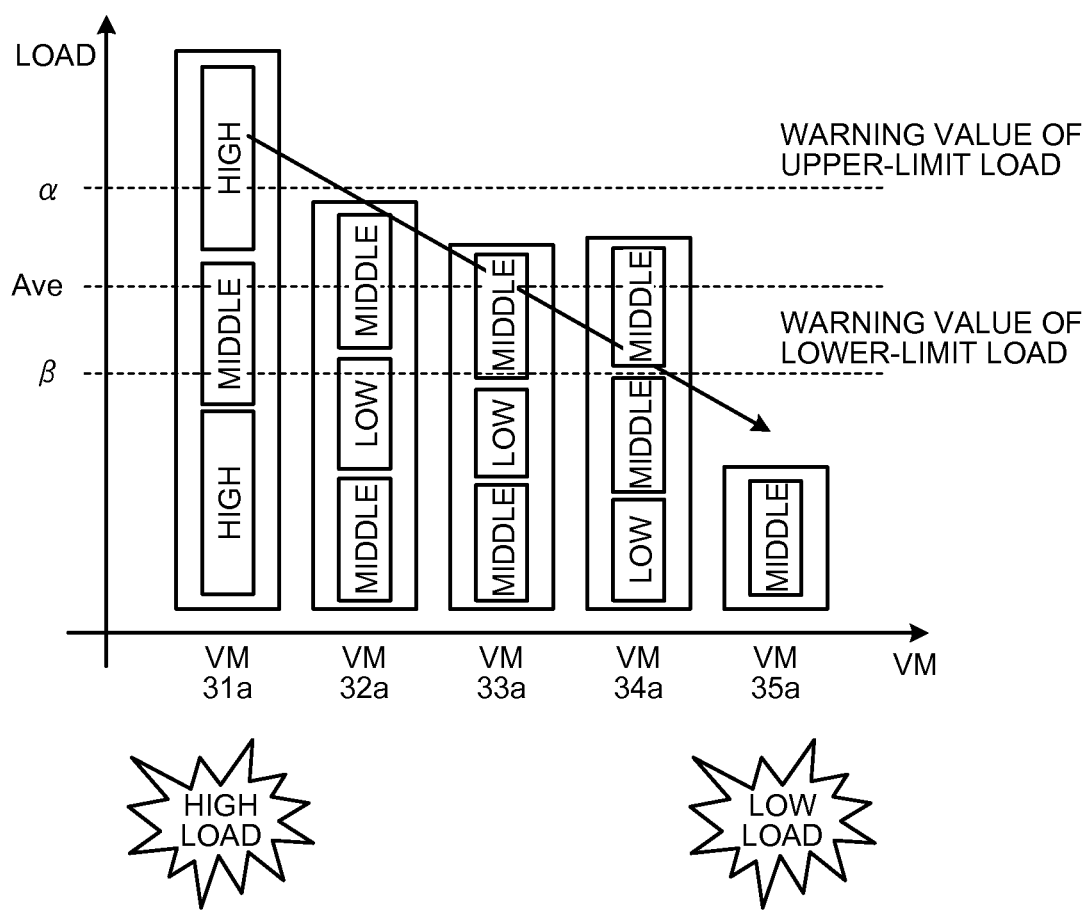
FIG. 14 is a diagram that illustrates an example of the process performed by a management server according to the third embodiment.

FIG. 14 is a diagram that illustrates an example of the process performed by the management server according to the third embodiment. The example illustrated in FIG. 14 illustrates the loads of five VMs 31a to 35a. The horizontal axis represents the VM, and the vertical axis represents the load of the VM. "High" represented within the VM represents a high-load processing element of which the load exceeds a first threshold value. In addition, "Middle" represented within the VM represents a middle-load processing element of which the load is the first threshold value or less and exceeds a second threshold value that is less than the first threshold value. Furthermore, "Low" represented within the VM represents a low-load processing element of which the load is the second threshold value or less. In the example illustrated in FIG. 14, the threshold value α is an upper-limit load warning value. In addition, in the example illustrated in FIG. 14, a threshold value β is less than the threshold value α and is a lower-limit load warning value. In the example illustrated in FIG. 14, since the load of the VM 31a exceeds the threshold value α, the specifying unit 45c determines that there is a VM having a load that is the threshold value α or more.

In a case where there are VMs of which the loads are the threshold value α or more, the specifying unit 45c sets all the VMs of which the loads are the threshold value α or more as candidates for a movement source VM. For example, in the example illustrated in FIG. 14, the specifying unit 45c sets the VM 31a of which the load is the threshold value α or more as a candidate for the movement source VM.

Then, the specifying unit 45c sets all the VMs of which the loads are less than the average value Ave as candidates for a movement destination VM. For example, in the example illustrated in FIG. 14, the VM 35a of which the load is less than the average value Ave is set as a candidate for the movement destination VM.

Then, the specifying unit 45c determines whether it is verified that a specified set of queries can be arranged in the same VM for a combination of all the VMs that are the movement sources and all the VMs that are the movement destinations by the process described below. In a case where the arrangement is not verified, the specifying unit 45c determines whether or not the movement of one query out of the specified set of queries to the VM in which the other query is arranged has been registered in the movement instruction list 46 by the process described below.

In a case where the movement has not been registered, the specifying unit 45c determines whether or not there is a VM that has not been selected out of the candidates for the movement source VM. In a case where there is no VM that has not been selected, the specifying unit 45c sets all the VMs of the candidates for the movement destination VM to be unselected. Then, the specifying unit 45c performs the following process after that. On the other hand, in a case where there is a VM that has not been selected, the specifying unit 45c selects one VM that has not been selected from among the candidates for the movement source VM.

Then, the specifying unit 45c determines whether or not there is a VM that has not been selected from among the candidates for the movement destination VM by the process described below. In a case where there is no VM that has not been selected, the specifying unit 45c sets all the VMs of the candidates for the movement destination VM not to have been selected. Then, the specifying unit 45c determines whether it is verified that the above-described specified set of queries can be arranged in the same VM for a combination of all the movement source VMs and all the movement destination VMs again. Then, the specifying unit 45c performs the following process after that. On the other hand, in a case where there is a VM that has not been selected, the specifying unit 45c selects one VM that has not been selected from among the candidates for the movement destination VM.

Subsequently, the specifying unit 45c determines whether or not a set of queries is specified by the process described below. In a case where the set of queries has not been specified, the specifying unit 45c specifies a set of queries between which the number of times of communications is a maximum by using the communication count information 37 that is acquired by the acquisition unit 45b. For example, in a case where the communication count information 37 represented in the example illustrated in FIG. 7D is used, the specifying unit 45c selects a set of the query Q1 and the query Q3 between which the number of times of communication is ten.

Then, the specifying unit 45c determines whether or not there are a plurality of specified sets. In a case where there are the plurality of specified sets, a distance between the queries is calculated for each specified set by referring to the query graph that is provided to the management server 40 in advance. For example, a case will be described in which the specifying unit 45c specifies two sets including a set of the query Q1 and the query Q2 and a set of the query Q1 and the query Q3 in the query graph 70 illustrated in the example of FIG. 5. In such a case, the specifying unit 45c calculates a distance between the query Q1 and the query Q2 and a distance between the query Q1 and the query Q3, on the query graph 70. In addition, in the example illustrated in FIG. 5, the distance between the query Q1 and the query Q2 is shorter than the distance between the query Q1 and the query Q3 on the query graph 70. In other words, a distance between the query Q1 and the query Q2 is smaller than a distance between the query Q1 and the query Q3.

Subsequently, the specifying unit 45c determines whether or not there are a plurality of sets of queries between which a calculated distance is the shortest. In the example illustrated in FIG. 5, since the number of set of the query Q1 and the query Q2 between which the calculated distance is the shortest is one, the specifying unit 45c determines that there are not a plurality of sets of queries between which the calculated distance is the shortest.

In a case where there are a plurality of sets of queries between which the calculated distance is the shortest, the specifying unit 45c specifies a set of queries of which a sum of loads of the processing elements including the queries is the smallest out of the plurality of sets of queries between which the calculated distance is the shortest. On the other hand, in a case where there is no plurality of sets of queries between which the calculated distance is the shortest, the specifying unit 45c specifies a set of queries between which the distance is the shortest out of the plurality of sets that are specified.

The determination unit 45d determines various kinds of information. For example, the determination unit 45d determines that the set of queries that have been specified by the specifying unit 45c is to be arranged in the same VM.

A specific example will now be described. First, for the set of queries specified by the specifying unit 45c, the determination unit 45d determines whether one query is a query that is arranged in a VM of a newly-selected movement source, and the other query is a query that is arranged in a VM of a newly-selected movement destination. In a case where one query is not a query that is arranged in the VM of the newly-selected movement source, or the other query is not a query that is arranged in the VM of the newly-selected movement destination, it is determined whether there is a VM that has not been selected from among the above-described candidates for the movement destination VM. Then, the following process after that is performed.

On the other hand, in a case where one query is a query that is arranged in a VM of a newly-selected movement source, and the other query is a query that is arranged in a VM of a newly-selected movement destination, the determination unit 45d calculates a load Y in a case where a processing element including the query arranged in the VM of the newly-selected movement source out of the specified set of queries is moved to the VM of the newly-selected movement destination. In other words, the determination unit 45d calculates a value that is acquired by adding the load of the processing element including the query arranged in the VM of the newly-selected movement source out of the specified set of queries to the load of the VM of the movement destination as the load Y.

Then, the determination unit 45d determines whether the value of the calculated load Y is less than the average Ave and the value of the load Y is more than the threshold value $\beta$. In a case where the value of the calculated load Y is the average value Ave or more, or the value of the load Y is the threshold value $\beta$ or less, it is determined whether there is a VM that has not been selected out of the above-described candidates for the movement destination VM. Then, the following process after that is performed. On the other hand, in a case where the value of the load Y is less than the average value Ave and the value of the load Y is more than the threshold value $\beta$, the determination unit 45d performs the following process. The determination unit 45d determines that the processing element including the query arranged in the VM of the newly-selected movement source out of the specified set of queries is moved from the VM of the movement source to the VM of the newly-selected movement destination VM.

As above, the management server 40 according to the embodiment determines that two processing elements including two queries of the specified set are arranged in the same VM. Accordingly, in a case where two processing elements are arranged in the same VM based on the determination, the communication for the processing result that is performed between two VMs before the two processing elements are arranged in the same VM is not performed. Therefore, according to the management server 40 of the embodiment, an increase in the number of times of communication can be suppressed.

In addition, the management server 40 according to the embodiment acquires information that represents the number of times of communication performed between transaction requesting sentences executed by a plurality of devices in which one or more transaction requesting sentences for performing an event in connection with transaction requesting sentences called a plurality of queries are arranged. Then, the management server 40 specifies a set of transaction request sentences based on the number of times of communication. Subsequently, the management server 40 determines a device that is used for arranging a specified set of transaction requesting sentences in the same device. Accordingly, in a case where two transaction requesting sentences are arranged in the same VM based on the determination, the communication for the processing result that is performed between two VMs before the two transaction requesting sentences are arranged in the same VM is not performed. Therefore, according to the management server 40 of the embodiment, an increase in the number of times of communication can be suppressed.

In addition, according to the management server 40 of the embodiment, it can be determined that a processing element for which the number of times of communication is many is arranged in one VM with high priority.

Furthermore, according to the management server 40 of the embodiment, the arrangement of processing elements can be determined such that the value of the load of the VM of the movement destination is less than the average value Ave and is more than the threshold value $\beta$ in a case where the processing elements are moved.

Then, the determination unit 45d updates the movement instruction list 46 by registering the identifier of the processing element that is determined to be moved, the IP address of the VM of the movement source, and the IP address of the VM of the movement destination in the movement instruction list 46 in association with one another. Subsequently, the determination unit 45d excludes the VM of the movement source of the processing element that is determined to be moved from the candidate for the movement source VM and excludes the VM of the movement destination from the candidate for the movement destination VM.

Subsequently, the determination unit 45d sets all the VMs of the candidates for the movement destination VM and the candidates for the movement source VM to be unselected. Thereafter, the determination unit 45d determines again whether the movement of one query of the above-described specified set of queries to the VM in which the other query is arranged has been registered in the movement instruction list 46 again and performs the following process after that.

In addition, in a case where the specifying unit 45c determines that it is verified whether a specified set of queries can be arranged in the same VM for a combination of all the VMs of the movement source and the all the VMs of the movement destination, the determination unit 45d sets all the VMs of the candidates for the movement source VM to be unselected. Then, the determination unit 45d determines whether or not there is a VM, which has not been selected, out of the candidates for the movement source VM. In a case where there is a VM that has not been selected, one VM that has not been selected is selected from among the candidates for the movement source VM.

Thereafter, the determination unit 45d sets "1" to the variable N. Then, the determination unit 45d selects a processing element that has an n-th high load out of the processing elements of the VM of the newly-selected movement source. In the case of N=1, in the example illustrated in FIG. 14, the determination unit 45d selects a processing element of "High", which has the highest load, located on the uppermost side out of the processing elements of the VM 31a.

Subsequently, the determination unit 45d determines whether or not there is a VM, which has not been selected, out of the candidates for the movement destination VM by the process described below. In a case where there is no VM that has not been selected, the determination unit 45d determines whether or not there is a VM, which has not been selected, out of candidates of the movement source VM again and performs the following process. On the other hand, in a case where there is a VM that has not been selected, the determination unit 45d selects one VM that has not been selected out of the candidates of the movement destination VM.

Thereafter, the determination unit 45d calculates a load Y' of a case where the processing element having the N-th high load, which is newly selected, is moved to the VM of the newly-selected movement destination. In other words, the determination unit 45d calculates a value acquired by adding the load of the selected processing element having the N-th high load to the load of the VM of the movement destination as the load Y'. For example, in the case of N=1, in the example illustrated in FIG. 14, the determination unit 45d calculates a value that is acquired by adding the load of the processing element of "High" that is located on the uppermost side out of the processing elements of the VM 31a to the load of the VM 35a as the load Y'.

Then, the determination unit 45d determines whether the calculated value of the load Y' is less than the average value Ave, and the value of the load Y' is more than the threshold value $\beta$. In a case where the calculated value of the load Y' is the average value Ave or more or the value of the load Y' is the threshold value $\beta$ or less, the determination unit 45d increments the value of the variable N by one. Thereafter, the determination unit 45d determines whether or not the value of the variable N exceeds the number K of processing elements of the VM of the newly-selected movement source. In a case where the value of the variable N does not exceed the number K of processing elements, the determination unit 45d specifies a processing element having an N-th high load out of the processing elements of the VM of the newly-selected movement source. In the case of N=2, in the example illustrated in FIG. 14, the determination unit 45d selects a processing element of "High" having a second highest load, which is located on the lowermost side, out of the processing elements of the VM 31a. Then, the determination unit 45d performs the above-described process of calculating the load Y of a case where the newly-selected processing element having the N-th highest load is moved to the VM of the newly-selected movement destination again and continues the following process.

On the other hand, in a case where the value of the variable N exceeds the number K of processing elements, the determination unit 45d determines whether or not there is a VM, which has not been selected, out of the candidates for the movement destination VM again and continues the following process.

In addition, in a case where the calculated value of the load Y' is less than the average value Ave, and the value of the load Y' is more than the threshold value $\beta$, the determination unit 45$d$ performs the following determination. The determination unit 45$d$ determines that the newly-selected processing element having the N-th high load is moved from the VM of the newly-selected movement source to the VM of the newly-selected movement destination.

As above, according to the management server 40 of the embodiment, the arrangement of the processing elements can be determined such that the value of the load of the VM of the movement destination is less than the average value Ave and is more than the threshold value $\beta$ in a case where the processing elements are moved.

Then, the determination unit 45$d$ updates the movement instruction list 46 by registering the identifier of the processing element that is determined to be moved, the IP address of the VM of the movement source, and the IP address of the VM of the movement destination in the movement instruction list 46 in association with one another. Subsequently, the determination unit 45$d$ excludes the VM of the movement source of the processing element that is determined to be moved from the candidate for the movement source VM and excludes the VM of the movement destination from the candidate for the movement destination VM.

Subsequently, the determination unit 45$d$ sets all the VMs of the candidates for the movement destination VM and the candidates for the movement source VM to be unselected. Thereafter, the determination unit 45$d$ determines whether or not there is a VM, which has not been selected, out of candidates for the movement source VM again and continues the following process.

The arrangement control unit 45$e$ controls the arrangement of processing elements. For example, the arrangement control unit 45$e$ performs control such that the set of queries, which has been specified by the specifying unit 45$c$, is arranged in the same VM based on the determination result of the arrangement of the processing elements that is performed by the determination unit 45$d$.

A specific example will now be described. The arrangement control unit 45$e$ first acquires the movement instruction list 46 from the storage unit 44. Then, the arrangement control unit 45$e$ determines whether or not there is a newly added content in the movement instruction list 46 by comparing the content of the acquired movement instruction list 46 with the content acquired in the previous time. In a case where there is a newly added content, the arrangement control unit 45$e$ performs the following process using an IP address that is registered in the item of "movement source" of the newly-added record. The arrangement control unit 45$e$ transmits an instruction (movement instruction) for moving the processing element represented by the identifier registered in the item of "processing element" of the record to the movement destination represented by the IP address that is registered in the item of "movement destination" of the record to the movement source. Accordingly, the VM of the movement source transmits the processing elements as the movement target to the VM of the movement destination, whereby the processing elements are moved. For example, in a case where the IP address of the VM in which a specified set of queries is arranged is registered in the items of "movement source" and "movement destination" in a newly added record, the arrangement control unit 45$e$ can perform control such that the set of queries is arranged in one VM. Subsequently, the arrangement control unit 45$e$ transmits a routing table updating instruction that includes an identifier of the V-Node as the movement target and the IP address of the VM of the movement destination to the VM, the server 20, and the management server 40.

The control unit 45 is an integrated circuit such as an ASIC (application specific integrated circuit) or an FPGA (field programmable gate array) or an electronic circuit such as a CPU (central processing unit) or an MPU (micro processing unit).

Figure 15:
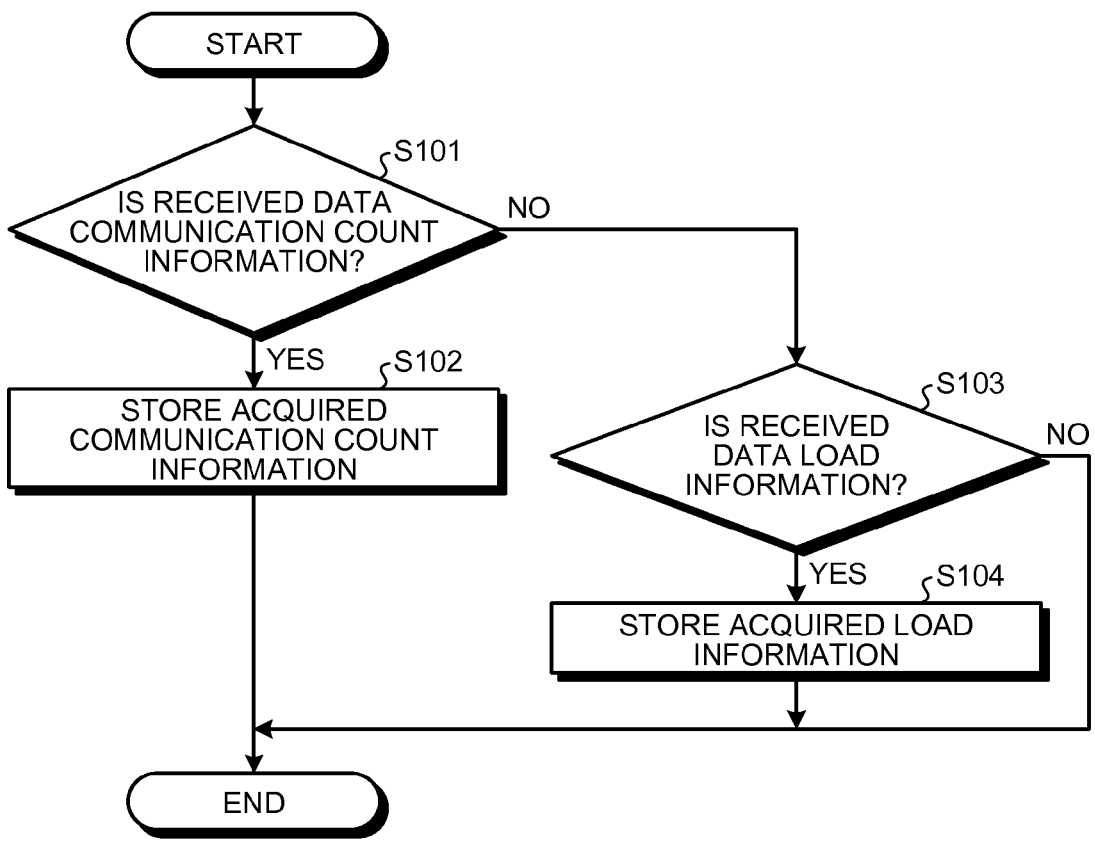
FIG. 15 is a flowchart that illustrates the sequence of an acquisition process.
Figure 16A:
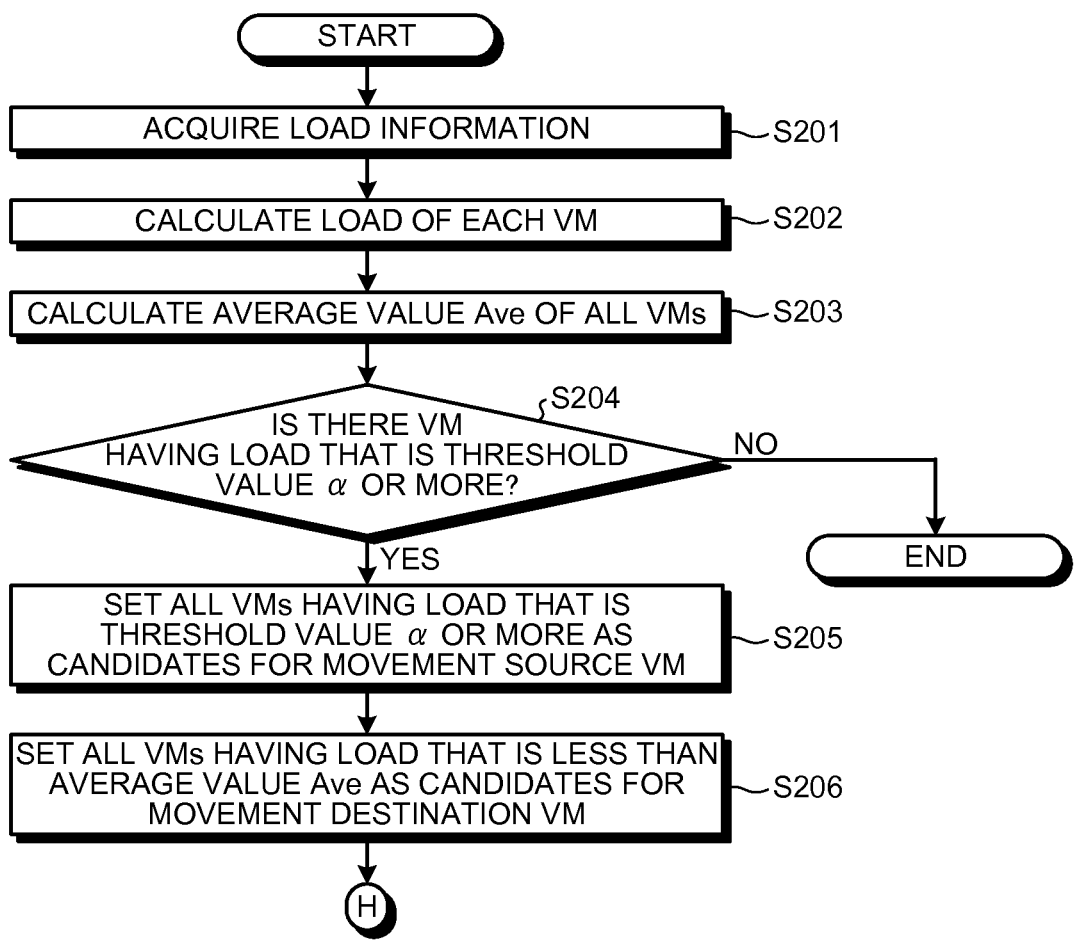
FIGS. 16A and 16B are flowcharts that illustrate the sequence of a determination process.
Figure 16B:
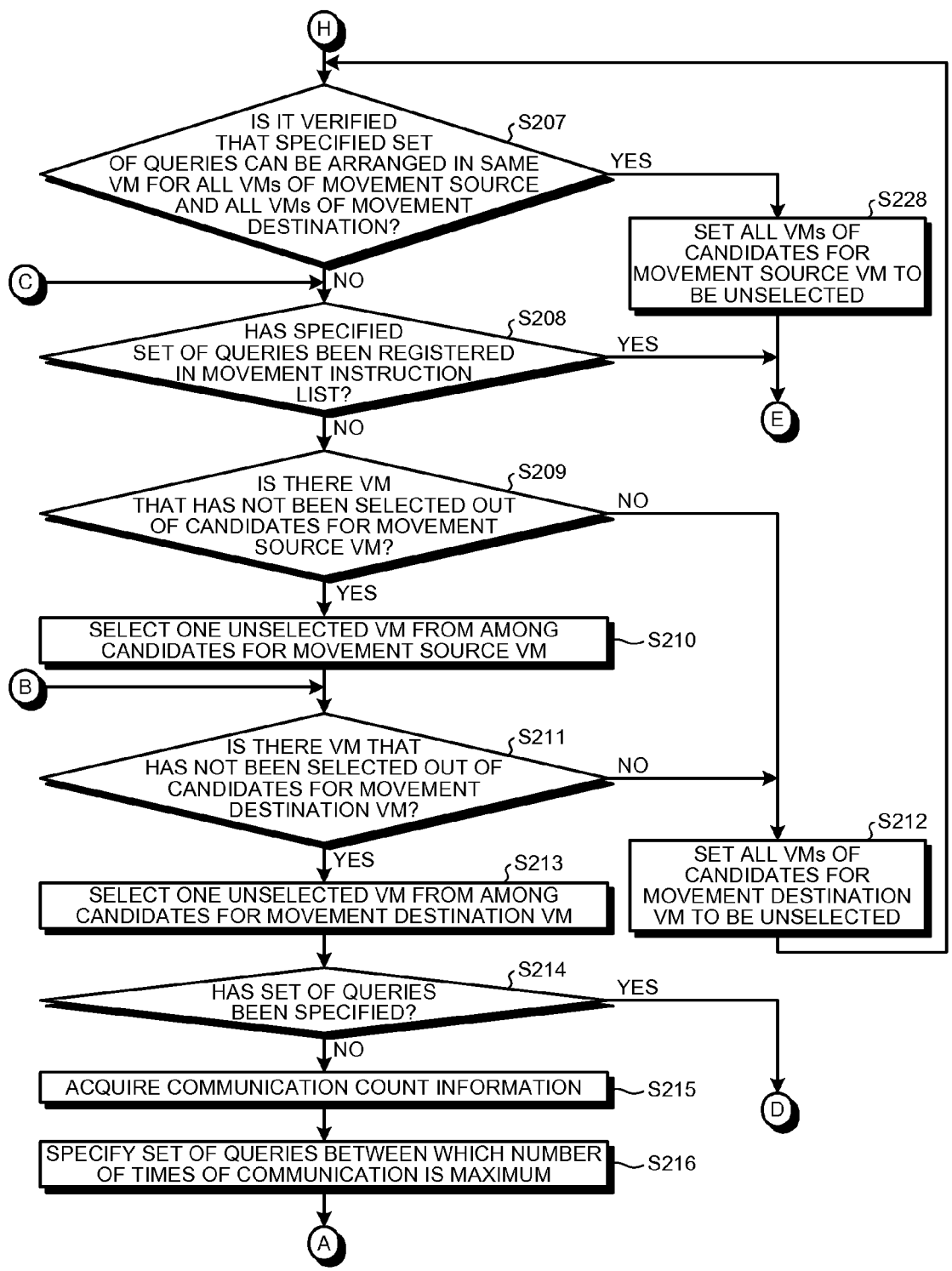
Figure 18:
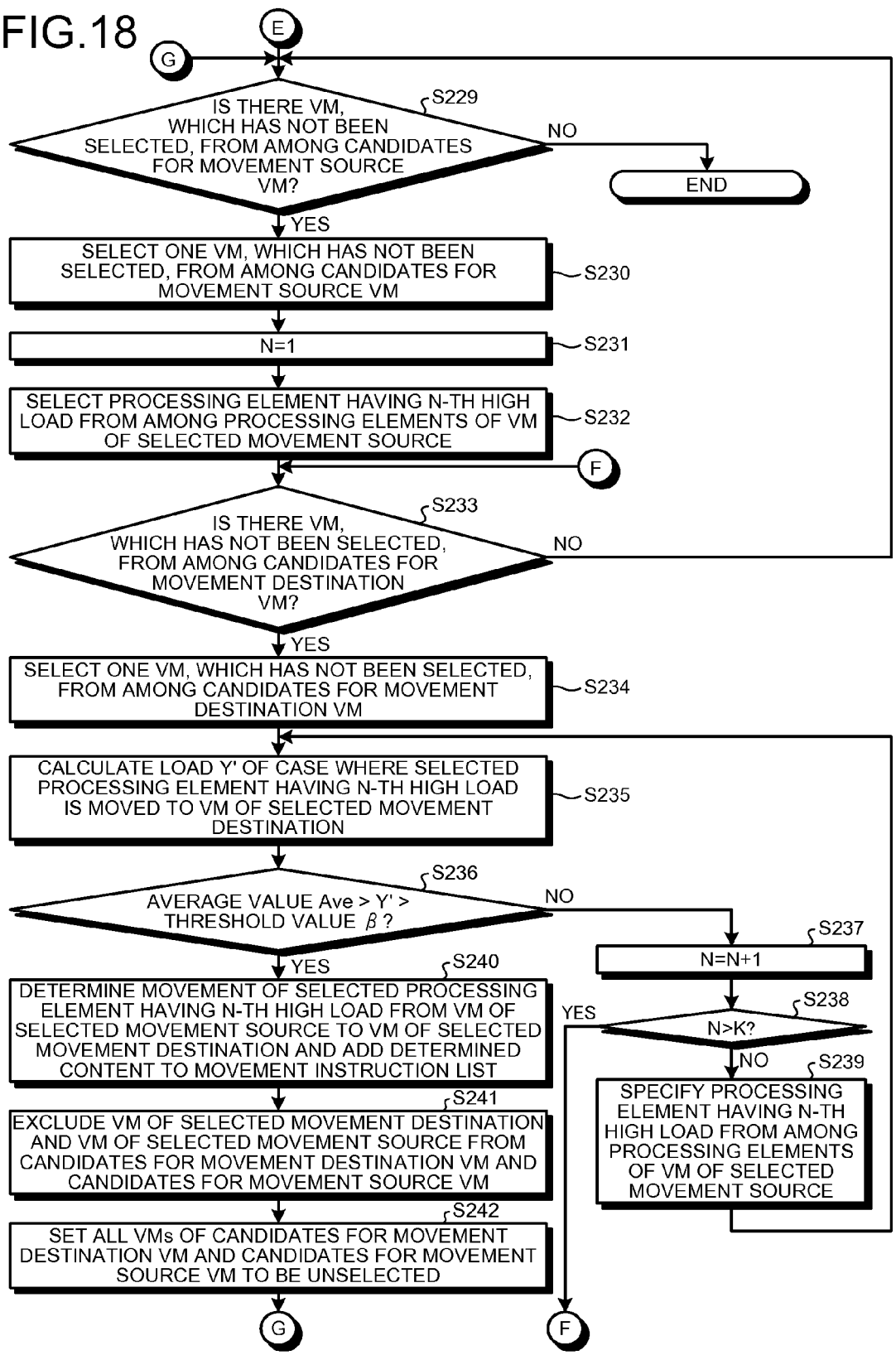
FIG. 18 is a flowchart that illustrates the sequence of a determination process.

Next, the flow of each process performed by the management server 40 according to the embodiment will be described. FIG. 15 is a flowchart that illustrates the sequence of an acquisition process. The acquisition process, for example, is performed at timing when data is received from a VM.

As illustrated in FIG. 15, the acquisition unit 45$b$ determines whether or not the received data is the communication count information 37 in S101. In a case where the received data is the communication count information 37 (Yes in S101), the acquisition unit 45$b$ acquires the received communication count information 37, stores the acquired communication count information 37 in the storage unit 44 in S102, and ends the process. On the other hand, in a case where the received data is not the communication count information 37 (No in S101), the acquisition unit 45$b$ determines whether or not the received data is the load information 38 in S103. In a case where the received data is the load information 38 (Yes in S103), the acquisition unit 45$b$ acquires the received load information 38, stores the acquired load information 38 in the storage unit 44 in S104, and ends the process. On the other hand, in a case where the received data is not the load information 38 (No in S103), the process ends.

FIGS. 16A to 18 are flowcharts that illustrate the sequence of a determination process. The determination process is performed at every predetermined interval.

As illustrated in FIGS. 16A to 18, the acquisition unit 45$b$ acquires the load information 38 from the storage unit 44 in S201. The specifying unit 45$c$ calculates the load of each VM by calculating a sum of loads of the processing elements for each VM using the load information 38 that is acquired by the acquisition unit 45$b$ in S202. Subsequently, the specifying unit 45$c$ calculates an average value Ave of loads of all the VMs using the calculated load of each VM in S203. Thereafter, the specifying unit 45$c$ determines whether or not there is a VM having a load that is the threshold value $\alpha$ or more in S204.

In a case where there is no VM having a load that is the threshold value $\alpha$ or more (No in S204), the process ends. On the other hand, in a case where there is a VM having a load that is the threshold value $\alpha$ or more (Yes in S204), the specifying unit 45$c$ sets all the VMs each having a load that is the threshold value $\alpha$ or more as candidates for the movement source VM in S205.

Then, the specifying unit 45$c$ sets all the VMs each having a load that is less than the average value Ave as candidates for the movement destination VM in S206. Subsequently, the specifying unit 45$c$ determines whether it is verified that a specified set of queries can be arranged in the same VM for a combination of all the VMs of the movement sources and all the VMs of the movement destinations by the process described below in S207. In a case where verification is not made (No in S207), the specifying unit 45$c$ determines whether or not the movement of one query of a specified set of queries to the VM in which the other query is arranged has been registered in the movement instruction list 46 by the process of S225 described below in S208.

In a case the movement has been registered (Yes in S208), the process proceeds to S229. On the other hand, in a case where the movement has not been registered (No in S208), the specifying unit 45$c$ determines whether there is a VM, which has not been selected, among the candidates for the movement source VM in the process of S210 described below in S209. In a case where there is no VM that has not been selected (No in S209), the process proceeds to S212. On the other hand, in a case where there is a VM which has not been selected (Yes in S209), the specifying unit 45c selects one VM, which has not been selected, from among the candidates for the movement source VM in S210.

Then, the specifying unit 45c, in the process of S212 described below, determines whether or not there is a VM, which has not been selected, among the candidates for the movement destination VM in S211. In a case where there is no VM that has not been selected (No in S211), the specifying unit 45c sets all the VMs of the candidates for the movement destination VM to be unselected in S212. Then, the process is returned to S207. On the other hand, in a case where there is a VM that has not been selected (Yes in S211), the specifying unit 45c selects one VM, which has not been selected, from among the candidates for the movement source VM in S213.

Subsequently, the specifying unit 45c determines whether or not a set of queries is specified in one of S216, S220, and S221 described below in S214. In a case where a set of queries is specified (Yes in S214), the process proceeds to S222. On the other hand, in a case where a set of queries is not specified (No in S214), the acquisition unit 45b acquires the communication count information 37 from the storage unit 44 in S215. Then, the specifying unit 45c specifies a set of queries between which the number of times of communication is a maximum using the communication count information 37 acquired by the acquisition unit 45b in S216.

Subsequently, the specifying unit 45c determines whether there are a plurality of specified sets in S217. In a case where there is no plurality of specified sets (No in S217), the process proceeds to S222. On the other hand, in a case where there is a plurality of specified sets (Yes in S217), the specifying unit 45c calculates a distance between queries for each specified set by referring to the query graph that is given to the management server 40 in advance in S218.

Subsequently, the specifying unit 45c determines whether or not there are a plurality of sets of queries between which a calculated distance is the shortest in S219.

In a case where there are a plurality of sets of queries between which the calculated distance is the shortest (Yes in S219), the specifying unit 45c specifies a set of queries of which a sum of loads of the processing elements including the queries is the smallest out of the plurality of sets of queries between which the calculated distance is the shortest in S221 and proceeds to S222. On the other hand, in a case where there is no plurality of sets of queries between which the calculated distance is the shortest (No in S219), the specifying unit 45c specifies a set of queries between which the distance is the shortest out of the plurality of sets that are specified in S220 and proceeds to S222.

For the set of queries specified by the specifying unit 45c, the determination unit 45d determines whether one query is a query that is arranged in a VM of a newly-selected movement source, and the other query is a query that is arranged in a VM of a newly-selected movement destination in S222. In a case where one query is not a query that is arranged in the VM of the newly-selected movement source, or the other query is not a query that is arranged in the VM of the newly-selected movement destination (No in S222), the process is returned to S211.

On the other hand, in a case where one query is a query that is arranged in a VM of a newly-selected movement source, and the other query is a query that is arranged in a VM of a newly-selected movement destination (Yes in S222), the determination unit 45d performs the following process. The determination unit 45d calculates a load Y of a case where a processing element including the query arranged in the VM of the newly-selected movement source out of the specified set of queries is moved to the VM of the VM of the newly-selected movement destination in S223.

Then, the determination unit 45d determines whether the calculated value of the load Y is less than the average Ave and the value of the load Y is more than the threshold value $\beta$ in S224. In a case where the calculated value of the load Y is the average value Ave or more, or the value of the load Y is the threshold value $\beta$ or less (No in S224), the process is returned to S211. On the other hand, in a case where the value of the load Y is less than the average value Ave and the value of the load Y is more than the threshold value $\beta$ (Yes in S224), the determination unit 45d performs the following process. The determination unit 45d determines that the processing element including the query arranged in the VM of the newly-selected movement source out of the specified set of queries is moved from the VM of the movement source to the VM of the newly-selected movement destination VM and updates the movement instruction list 46 in S225. Subsequently, the determination unit 45d excludes the VM of the movement source of the processing element that is determined to be moved from the candidate for the movement source VM and excludes the VM of the movement destination from the candidate for the movement destination VM in S226.

Subsequently, the determination unit 45d sets all the VMs of the candidates for the movement destination VM and the candidates for the movement source VM to be unselected in S227, and the process is returned to S208.

In addition, in a case where the specifying unit 45c determines that it is verified whether a specified set of queries can be arranged in the same VM for a combination of all the VMs of the movement source and the all the VMs of the movement destination (Yes in S207), the determination unit 45d performs the following process. The determination unit 45d sets all the VMs of the candidates for the movement source VM to be unselected in S228. Then, the determination unit 45d determines whether or not there is a VM, which has not been selected, out of the candidates for the movement source VM in S229. In a case where there is no VM that has not been selected (No in S229), the process ends. On the other hand, in a case where there is a VM that has not been selected (Yes in S229), one VM that has not been selected is selected from among the candidates for the movement source VM in S230.

Thereafter, the determination unit 45d sets "1" to the variable N in S231. Then, the determination unit 45d selects a processing element that has an n-th high load out of the processing elements of the VM of the newly-selected movement source in S232.

Subsequently, the determination unit 45d determines whether or not there is a VM, which has not been selected, out of the candidates for the movement destination VM by the process of S234 described below in S233. In a case where there is no VM that has not been selected (No in S233), the process is returned to S229. On the other hand, in a case where there is a VM that has not been selected (Yes in S233), the determination unit 45d selects one VM that has not been selected out of the candidates of the movement destination VM (S234).

Thereafter, the determination unit 45d calculates a load Y' of a case where the processing element having the N-th high load, which is newly selected, is moved to the VM of the newly-selected movement destination in S235.

Then, the determination unit 45d determines whether the calculated value of the load Y' is less than the average value Ave, and the value of the load Y' is more than the threshold value β in S236. In a case where the calculated value of the load Y' is the average value Ave or more or the value of the load Y' is the threshold value β or less (No in S236), the determination unit 45d increments the value of the variable N by one in S237. Thereafter, the determination unit 45d determines whether or not the value of the variable N exceeds the number K of processing elements of the VM of the newly-selected movement source in S238. In a case where the value of the variable N does not exceed the number K of processing elements (No in S238), the determination unit 45d specifies a processing element having an N-th high load out of the processing elements of the VM of the newly-selected movement source in S239, and the process is returned to S235.

On the other hand, in a case where the value of the variable N exceeds the number K of processing elements (Yes in S238), the process is returned to S233.

In addition, in a case where the calculated value of the load Y' is less than the average value Ave, and the value of the load Y' is more than the threshold value β (Yes in S236), the determination unit 45d performs the following determination. The determination unit 45d determines that the newly-selected processing element having the N-th high load is moved from the VM of the newly-selected movement source to the VM of the newly-selected movement destination and updates the movement instruction list 46 in S240. Subsequently, the determination unit 45d excludes the VM of the movement source of the processing element that is determined to be moved from the candidate for the movement source VM and excludes the VM of the movement destination from the candidate for the movement destination VM in S241.

Subsequently, the determination unit 45d sets all the VMs of the candidates for the movement destination VM and the candidates for the movement source VM to be unselected in S242, and the process is returned to S229.

Figure 19:
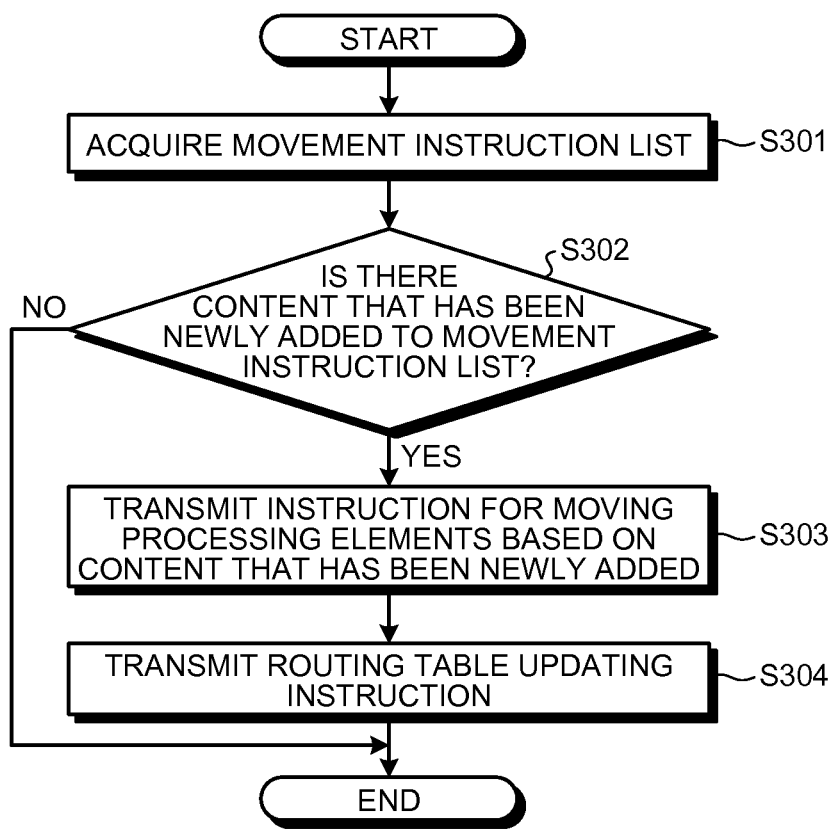
FIG. 19 is a flowchart that illustrates the sequence of an arrangement control process.

FIG. 19 is a flowchart that illustrates the sequence of an arrangement control process. The arrangement control process is performed at every predetermined interval.

As illustrated in FIG. 19, the arrangement control unit 45e acquires the movement instruction list 46 from the storage unit 44 in S301. Then, the arrangement control unit 45e determines whether or not there is a newly added content in the movement instruction list 46 by comparing the content of the acquired movement instruction list 46 with the content acquired in the previous time in S302. In a case where there is a newly added content (Yes in S302), the arrangement control unit 45e performs the following process using an IP address that is registered in the item of "movement source" of the newly-added record. The arrangement control unit 45e transmits an instruction (movement instruction) for moving the processing element represented by the identifier registered in the item of "processing element" of the record to the movement destination represented by the IP address that is registered in the item of "movement destination" of the record to the movement destination in S303. Subsequently, the arrangement control unit 45e transmits a routing table updating instruction that includes an identifier of the V-Node as the movement target and the IP address of the VM of the movement destination to the VM, the server 20, and the management server 40 in S304 and ends the process. On the other hand, in a case where there is no content that is newly added (No in S302), the process ends.

As described above, the management server 40 according to the embodiment determines that two processing elements including two queries of a specific set are arranged in the same VM. Accordingly, in a case where the two processing elements are arranged in the same VM based on the determination, the communication for a processing result between two VMs before the two processing elements are arranged in the same VM is not performed. Therefore, according to the management server 40 of the embodiment, an increase in the number of times of communication can be suppressed.

In addition, according to the management server 40 of the embodiment, processing elements between which the number of times of communication is large can be determined to be arranged in one VM with high priority.

Furthermore, according to the management server 40 of the embodiment, the arrangement of the processing elements can be determined such that the value of the load of the VM of the movement destination is less than the average value Ave and is more than the threshold value β in a case where the processing elements are moved.

[d] Fourth Embodiment

A fourth embodiment will now be described. In the fourth embodiment, a case will be described in which the number of VMs in which the queries are arranged is increased in a case where the average value of the loads of the processing elements of all the VMs exceeds a threshold value α.

Figure 20:
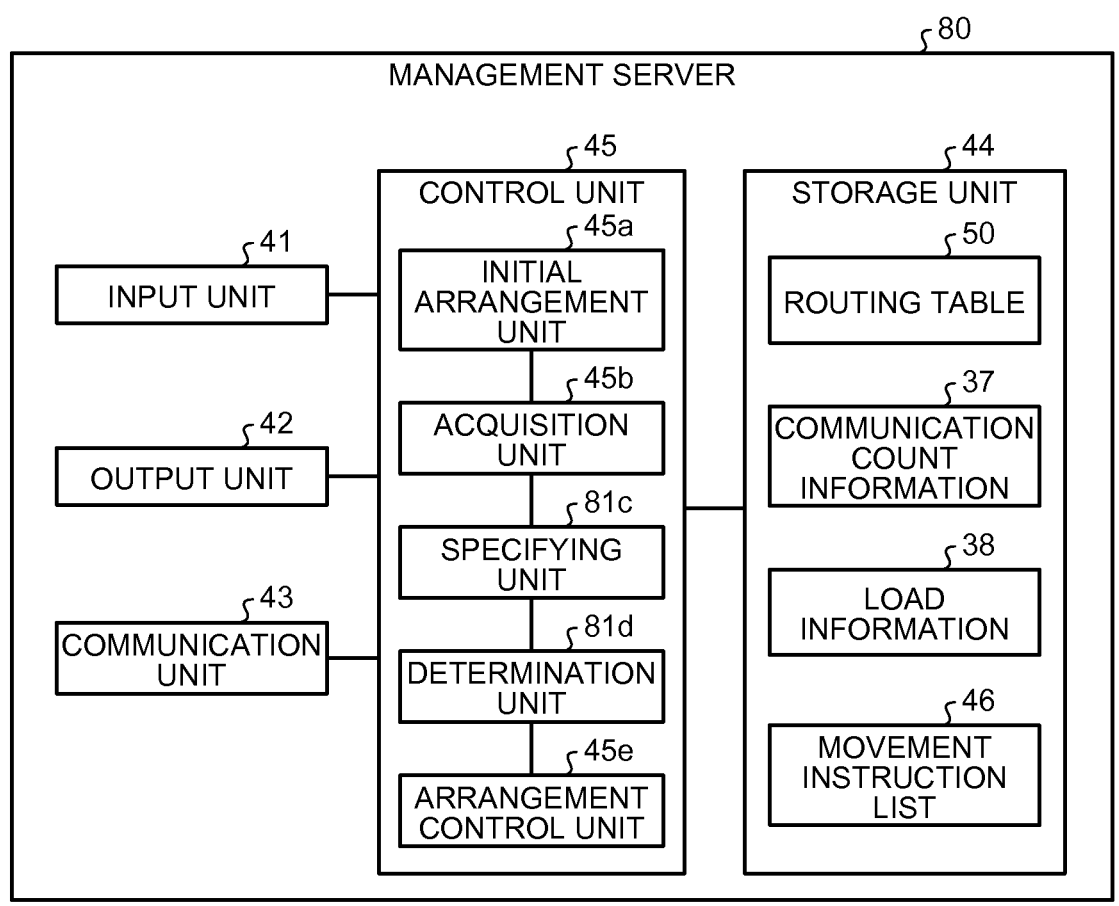
FIG. 20 is a block diagram that illustrates the configuration of a management server according to a fourth embodiment.

FIG. 20 is a block diagram that illustrates the configuration of a management server according to the fourth embodiment. As illustrated in FIG. 20, a control unit 45 of a management server 80 is different from the control unit 45 according to the third embodiment illustrated in FIG. 12 in that a specifying unit 81c and a determination unit 81d are included instead of the specifying unit 45c and the determination unit 45d. Hereinafter, the same reference numeral as that illustrated in FIG. 12 or the like is assigned to each part that achieves the same function as that of the third embodiment or the like described above, and the description thereof will not be presented.

Figure 21:
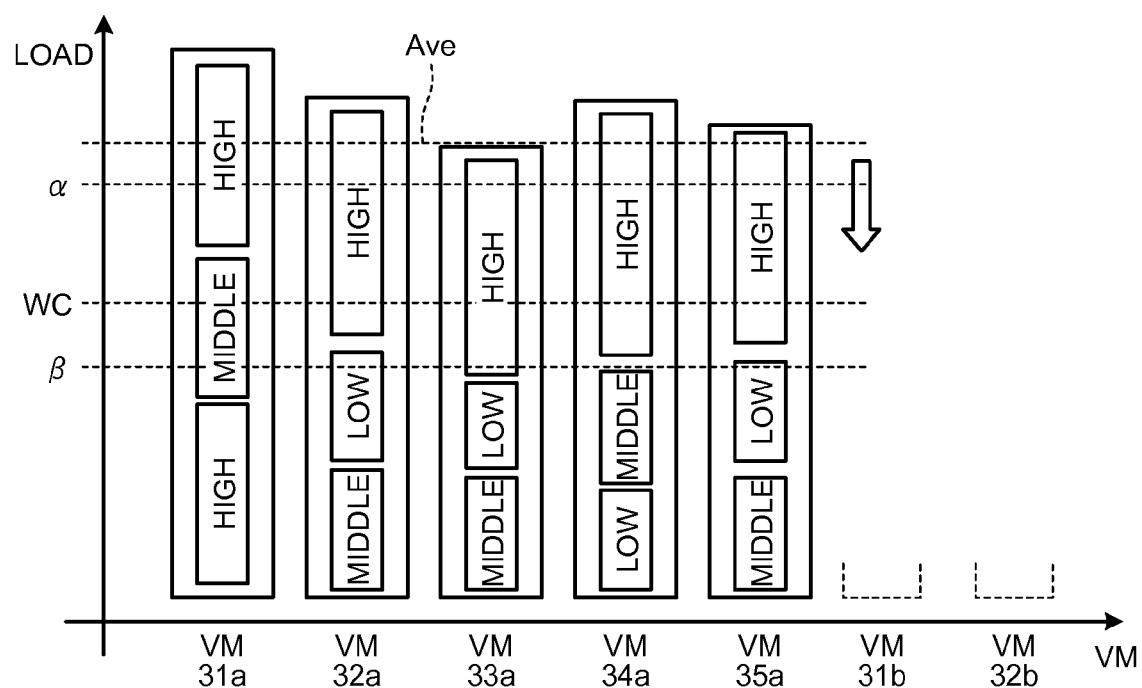
FIG. 21 is a diagram that illustrates an example of the process performed by a management server according to the fourth embodiment.
Figure 22A:
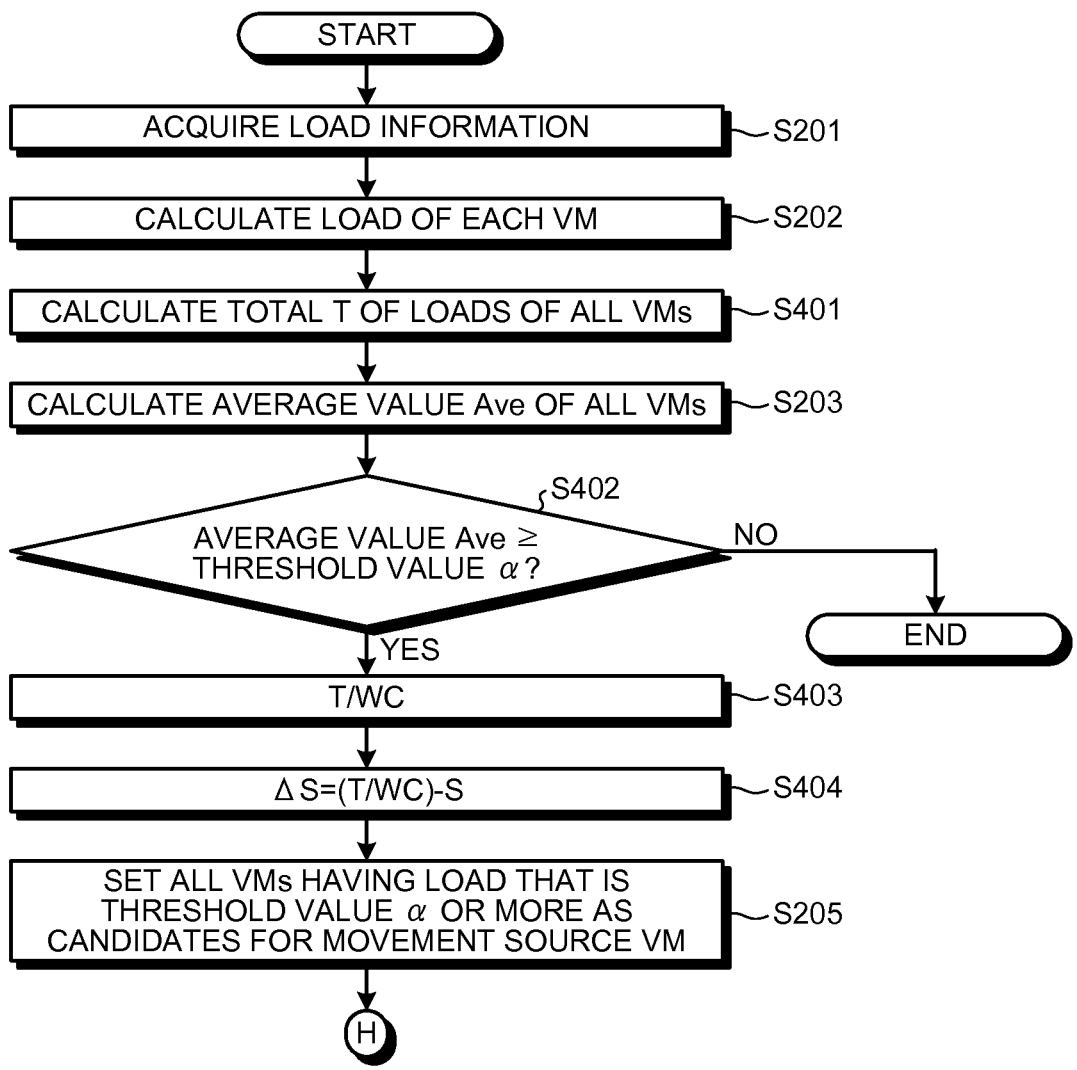

FIG. 21 is a diagram that illustrates an example of the process performed by the management server according to the fourth embodiment. In the example illustrated in FIG. 21, the loads of five VMs 31a to 35a are illustrated. The horizontal axis represents the VM, and the vertical axis represents the load of the VM. "High" represented within the VM represents a high-load processing element of which the load exceeds a first threshold value. In addition, "Middle" represented within the VM represents a middle-load processing element of which the load is the first threshold value or less and exceeds a second threshold value that is less than the first threshold value. Furthermore, "Low" represented within the VM represents a low-load processing element of which the load is the second threshold value or less. In the example illustrated in FIG. 21, a threshold value α is an upper-limit load warning value. In addition, in the example illustrated in FIG. 21, a threshold value β is less than the threshold value α and is a lower-limit load warning value. In the example illustrated in FIG. 21, the average value Ave of the loads of five VMs exceeds the threshold value α. Accordingly, in the example of FIG. 21, the management server 80 performs control such that the number of VMs is increased by two (VM 31b and VM 32b), the processing elements are moved to the added two VMs 31b and 32b, and the average value Ave of the loads of a total of seven VMs is a predetermined value WC.

The specifying unit 81c is different from the specifying unit 45c according to the third embodiment in the points described below. First, the specifying unit 81c calculates a total T of the loads of all the VMs. While the specifying unit 45c determines whether or not there is a VM having a load that is the threshold value α or more, instead of the determination, the specifying unit 81c determines whether or not the average value Ave is the threshold value α or more. For example, in the example illustrated in FIG. 21, since the average value Ave of the loads of five VMs exceeds the threshold value α, and accordingly, the specifying unit 81c determines that the average value Ave is the threshold value α or more in this case.

In addition, in a case where the average value Ave is the threshold value α or more, the specifying unit 81c calculates a value (T/WC) that is acquired by dividing the calculated total T of the loads of all the VMs by a predetermined value WC. Here, the value (T/WC) represents the number of VMs in a case where the average load of the VMs is WC. Then, the specifying unit 81c calculates a value ΔS (=(T/WC)−S) acquired by subtracting the current number S of VMs from the number (T/WC) of the VMs in a case where the load is WC, thereby calculating the number of VMs to be increased.

In addition, in the specifying unit 45c, while all the VMs each having a load that is less than the average value Ave are candidates for the movement destination VM, the specifying unit 81c, instead of electing candidates for the movement destination VM, sets all new VMs corresponding to the number ΔS as candidates for the movement destination VM. For example, in the example illustrated in FIG. 21, the specifying unit 81c sets all new VMs 31b and 32b corresponding to the number ΔS=2(7−5) as candidates for the movement destination VM.

The determination unit 81d is different from the determination unit 45d according to the third embodiment in points described below. While the determination unit 45d determines whether the calculated value of the load Y is less than the average value Ave, and the value of the load Y is more than the threshold value β, the determination unit 81d, instead of the determination, performs the following process. The determination unit 81d determines whether the calculated value of the load Y is less than WC and the value of the load Y is more than the threshold value β. In addition, while the determination unit 45d determines whether the calculated value of the load Y' is less than the average value Ave, and the value of the load Y' is more than the threshold value β, the determination unit 81d, instead of the determination, performs the following process. The determination unit 81d determines whether the calculated value of the load Y' is less than WC, and the value of the load Y' is more than the threshold value β. Accordingly, in the VM of the movement destination, the load in a case where the processing element is moved can be configured to be less than WC and be more than the threshold value β. In addition, the number of VMs for which the average load of VMs is WC can be determined.

In addition, the management server 80 according to the embodiment determines that two processing elements including two queries of a specific set are arranged in the same VM. Accordingly, in a case where the two processing elements are arranged in the same VM based on the determination, the communication for a processing result that is performed between two VMs before the two processing elements are arranged in the same VM is not performed. Therefore, according to the management server 80 of the embodiment, an increase in the number of times of communication can be suppressed.

Furthermore, according to the management server 80 of the embodiment, it can be determined that processing elements between which the number of times of communication is large are arranged in one VM with high priority.

In addition, according to the management server 80 of the embodiment, the arrangement of processing elements can be determined such that the value of the load of the VM of the movement destination is less than the average value Ave and is more than the threshold value β in a case where the processing elements are moved.

Next, the flow of each process performed by the management server 80 according to the embodiment will be described. Since the acquisition process and the arrangement control process are similar to those of the third embodiment, the description thereof will not be presented here, and a determination process according to the fourth embodiment will be described. FIGS. 22A to 24 represent a flowchart that illustrates the sequence of a determination process according to the fourth embodiment. The determination process is performed at a predetermined interval. In addition, the same reference numeral is assigned to the same process as that of the third embodiment for description.

As illustrated in FIGS. 22A to 24, after S202, the specifying unit 81c calculates a total T of the loads of all the VMs in S401. In addition, after S203, the specifying unit 81c determines whether or not the average value Ave is the threshold value α or more instead of S204 in S402.

In a case where the average value Ave is threshold value α or more (No in S402), the process ends. On the other hand, in a case where the average value Ave is the threshold value α or more (Yes in S402), the specifying unit 81c calculates a value (T/WC) that is acquired by dividing the calculated total T of the loads of all the VMs by a predetermined value WC in S403. Then, the specifying unit 81c calculates a value ΔS (=(T/WC)−S) acquired by subtracting the current number S of VMs from the number (T/WC) of the VMs in a case where the load is WC, thereby calculating the number of VMs to be increased in S404.

In addition, instead of S206 after S205, the specifying unit 81c sets all new VMs corresponding to the number ΔS as candidates for the movement destination VM in S405.

In addition, instead of S224, the determination unit 81d determines whether the calculated value of the load Y is less than WC, and the value of the load Y is more than the threshold value β in S406. Accordingly, instead of S236, the determination unit 81d determines whether the calculated value of the load Y' is less than WC, and the value of the load Y' is more than the threshold value β in S407.

As described above, the management server 80 according to the embodiment determines that two processing elements including two queries of a specific set are arranged in the same VM. Accordingly, in a case where the two processing elements are arranged in the same VM based on the determination, the communication for a processing result that is performed between two VMs before the two processing elements are arranged in the same VM is not performed. Therefore, according to the management server 80 of the embodiment, an increase in the number of times of communication can be suppressed.

Furthermore, according to the management server 80 of the embodiment, it can be determined that processing elements between which the number of times of communication is large are arranged in one VM with high priority.

In addition, according to the management server 80 of the embodiment, the arrangement of processing elements can be determined such that the value of the load of the VM of the movement destination is less than the average value Ave and is more than the threshold value β in a case where the processing elements are moved.

In addition, according to the management server 80 of the embodiment, in the VM of the movement destination, the load in a case where the processing element is moved can be configured to be less than WC and be more than the threshold value β.

In addition, according to the management server 80 of the embodiment, the number of VMs for which the average load of VMs is WC can be determined.

[e] Fifth Embodiment

A fifth embodiment will now be described. In the fifth embodiment, a case will be described in which the number of VMs in which queries are arranged is decreased in a case where the average value of the loads of the processing elements of all the VMs is less than a threshold value $\beta$.

Figure 25:
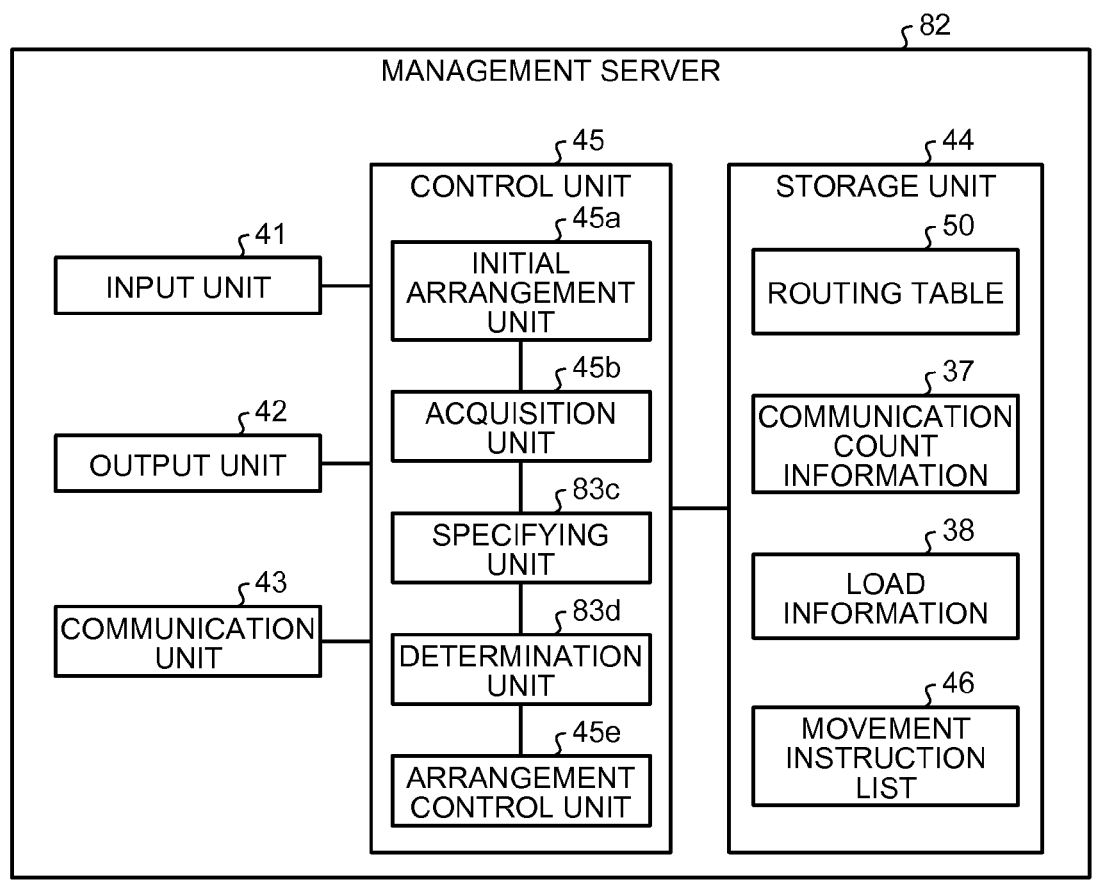
FIG. 25 is a block diagram that illustrates the configuration of a management server according to a fifth embodiment.

FIG. 25 is a block diagram that illustrates the configuration of a management server according to the fifth embodiment. As illustrated in FIG. 25, a control unit 45 of a management server 82 is different from the control unit 45 according to the fourth embodiment illustrated in FIG. 20 in that a specifying unit 83c and a determination unit 83d are included instead of the specifying unit 81c and the determination unit 81d. Hereinafter, the same reference numeral is assigned to each part that achieves the same function as that of each embodiment described above, and the description thereof will not be presented.

Figure 26:
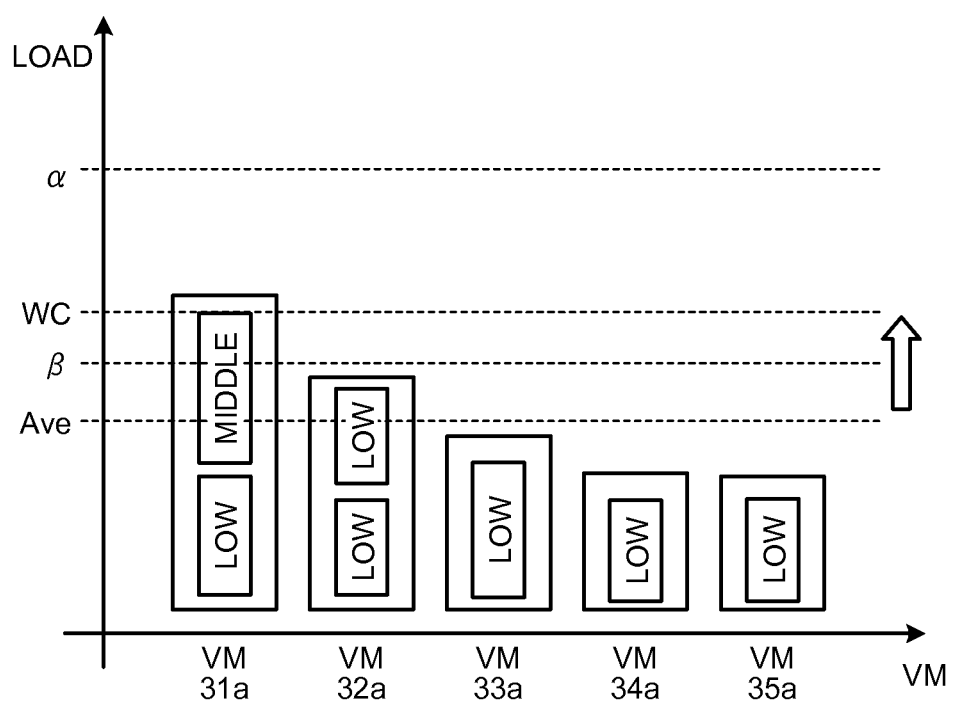
FIG. 26 is a diagram that illustrates an example of the process performed by a management server according to the fifth embodiment.
Figure 27A:
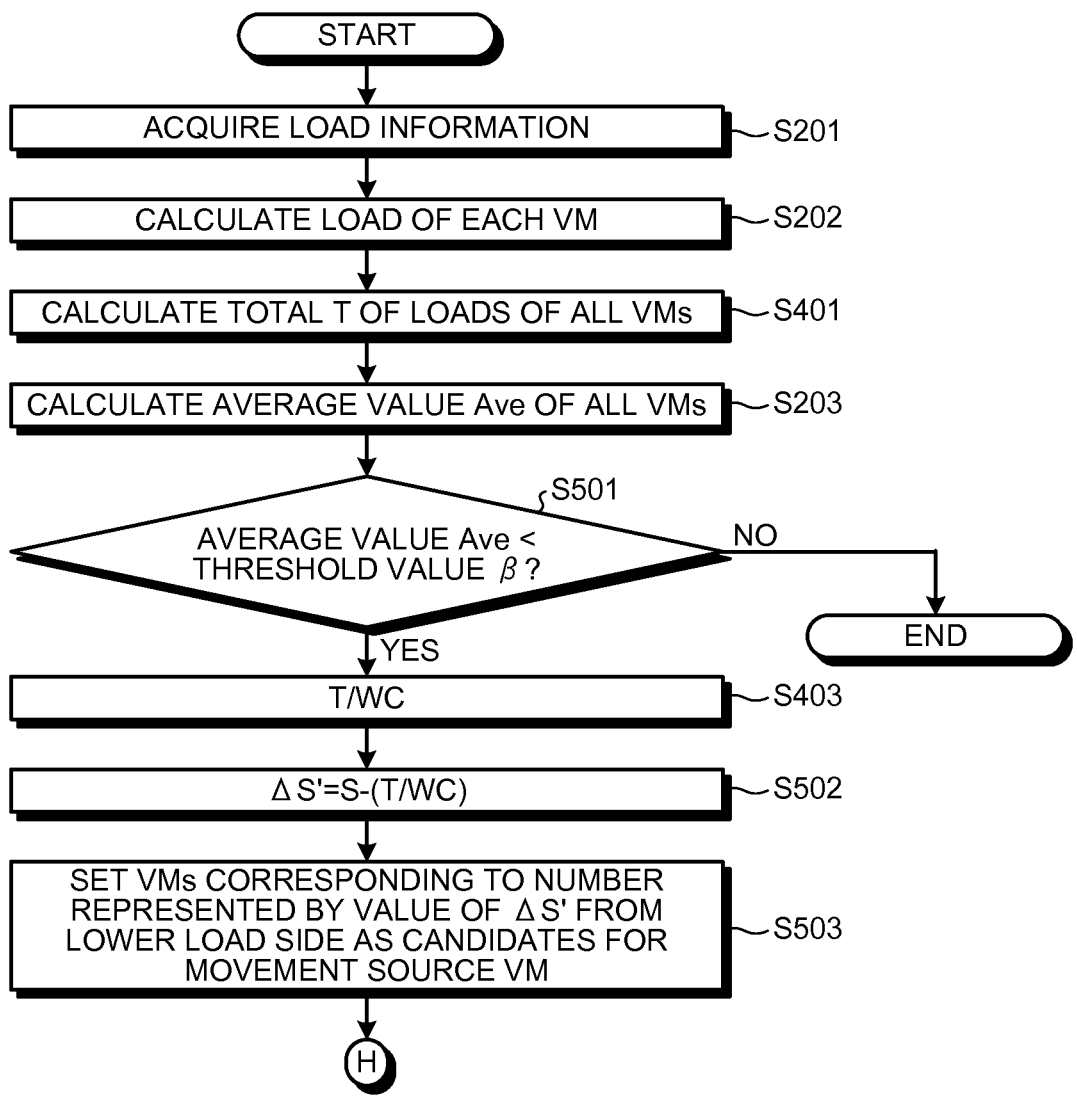
Figure 28:
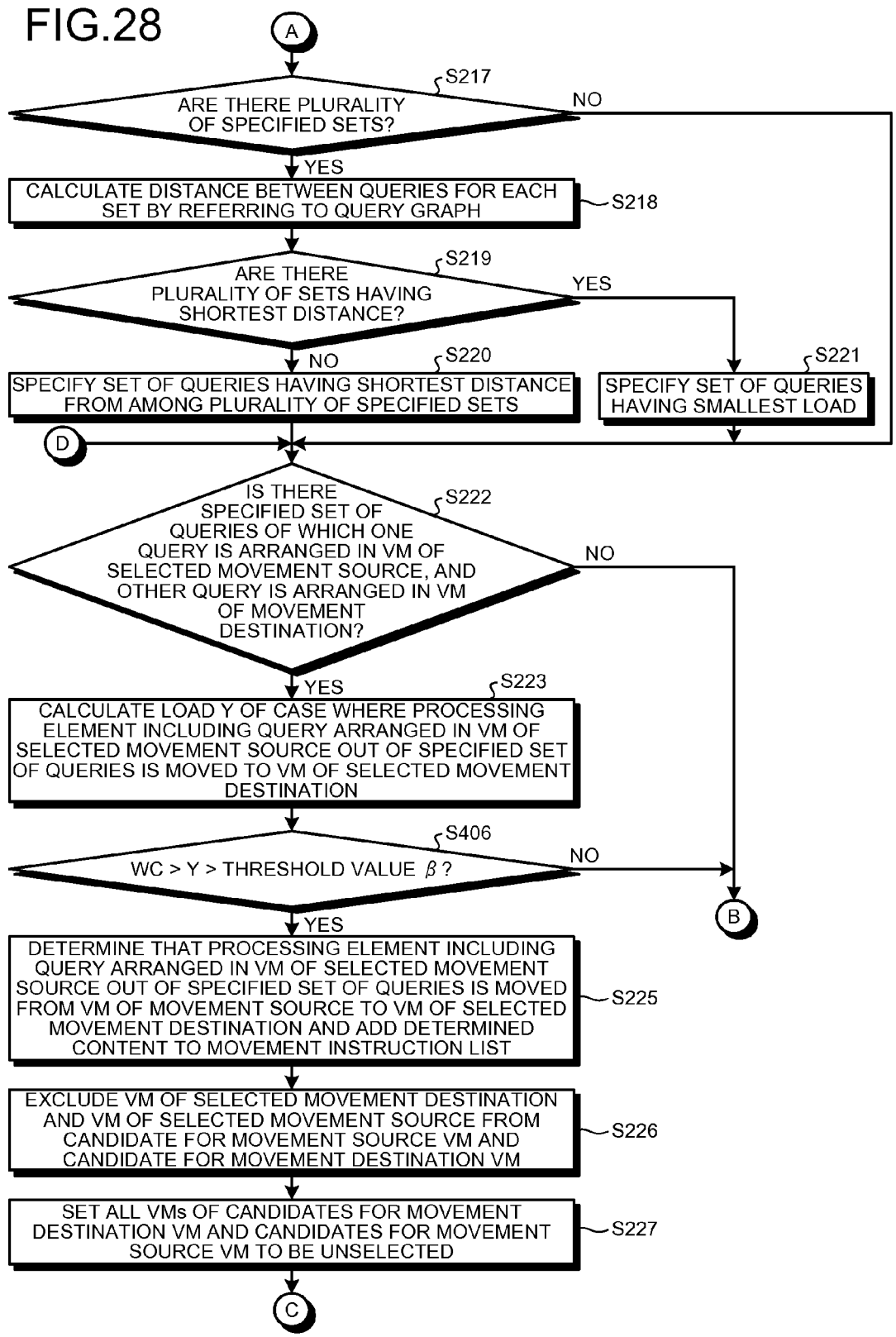
FIG. 28 is a flowchart that illustrates the sequence of a determination process according to the fifth embodiment.
Figure 29:
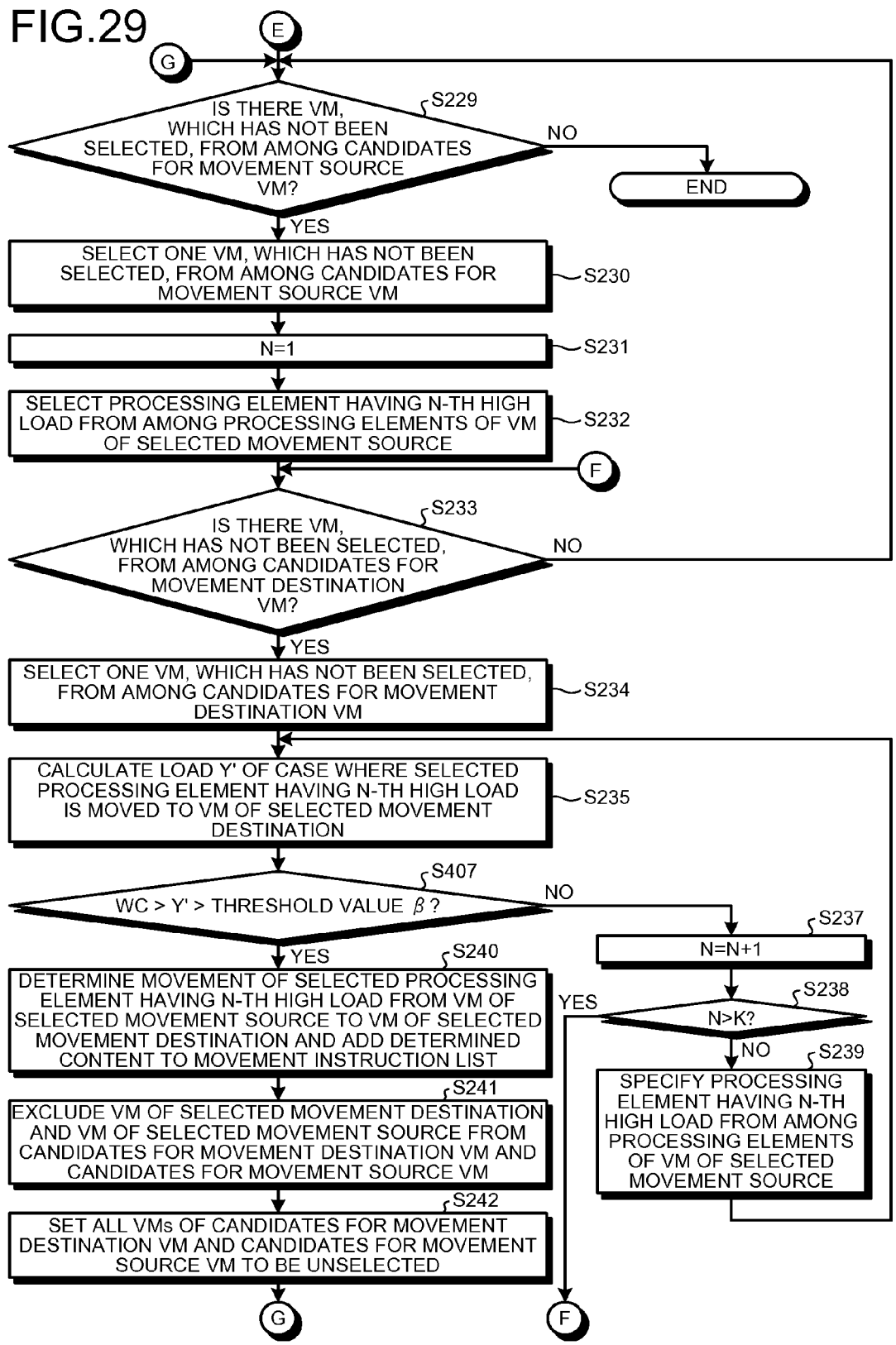
FIG. 29 is a flowchart that illustrates the sequence of a determination process according to the fifth embodiment.

FIG. 26 is a diagram that illustrates an example of the process performed by the management server according to the fifth embodiment. In the example illustrated in FIG. 26, the loads of five VMs 31a to 35a are illustrated. The horizontal axis represents the VM, and the vertical axis represents the load of the VM. "High" represented within the VM represents a high-load processing element of which the load exceeds a first threshold value. In addition, "Middle" represented within the VM represents a middle-load processing element of which the load is the first threshold value or less and exceeds a second threshold value that is less than the first threshold value. Furthermore, "Low" represented within the VM represents a low-load processing element of which the load is the second threshold value or less. In the example illustrated in FIG. 26, a threshold value $\alpha$ is an upper-limit load warning value. In addition, in the example illustrated in FIG. 26, a threshold value $\beta$ is less than the threshold value $\alpha$ and is a lower-limit load warning value. In the example illustrated in FIG. 26, the average value Ave of the loads of five VMs is less than the threshold value $\beta$. Accordingly, in the example of FIG. 26, first, the number of VMs in which queries are arranged is decreased by two (VM 34a, VM 35a). Then, the management server 82 performs control such that the processing elements of two VMs 34a and 35b that are removed are moved to all VMs (VM 32a, VM 33a) each having a load that is less than WC out of the remaining VMs, and the average value Ave of the loads of a total of three VMs is a predetermined value WC.

The specifying unit 83c is different from the specifying unit 81c according to the fourth embodiment in the points described below. First, while the specifying unit 81c determines whether or not the average value Ave is the threshold value $\alpha$ or more, the specifying unit 83c determines whether or not the average value Ave is less than the threshold value $\beta$. For example, in the example illustrated in FIG. 26, since the average value Ave of the loads of five VMs is less than the threshold value $\beta$, the specifying unit 83c determines that the average value Ave is less than the threshold value $\beta$ in this case.

In addition, while the specifying unit 81c calculates $\Delta S$ (=(T/WC)−S) so as to calculate the number of VMs to be increased, the specifying unit 83c calculates the number $\Delta S'$ (=S−(T/WC)) of VMs to be decreased instead of calculating $\Delta S$.

Furthermore, while a specifying unit 81 sets all the VMs each having a load that is the threshold value $\alpha$ or more as candidates for the movement source VM, the specifying unit 83c sets VMs corresponding to the number represented by the value of $\Delta S'$ from the lower load side out of all the VMs as candidates for the movement source VM. For example, in the example illustrated in FIG. 26, the specifying unit 83c sets VMs 34a and 35a having lower loads corresponding to $\Delta S'$=2 (5−3) as candidates for the movement source VM.

In addition, while the specifying unit 81c sets all the new VMs corresponding to the number represented by the value of $\Delta S$ as the candidates for the movement destination, the specifying unit 83c sets VMs that are not the targets to be removed, in other words, all VMs each having a load that is less than WC among the remaining VMs as the candidates for the movement destination VM. For example, in the example illustrated in FIG. 26, the specifying unit 83c sets all the VMs 32a and 33a each having a load that is less than WC out of the remaining VMs 31a to 33a as candidates for the movement source VM. Accordingly, the number of VMs for which the average load of VMs is WC can be determined. In addition, in the VM of the movement destination, the load of a case where the processing element is moved can be configured to be less than WC and be more than the threshold value $\beta$.

In addition, the management server 82 according to the embodiment determines that two processing elements including two queries of a specific set are arranged in the same VM. Accordingly, in a case where the two processing elements are arranged in the same VM based on the determination, the communication for a processing result that is performed between two VMs before the two processing elements are arranged in the same VM is not performed. Therefore, according to the management server 82 of the embodiment, an increase in the number of times of communication can be suppressed.

Furthermore, according to the management server 82 of the embodiment, it can be determined that processing elements between which the number of times of communication is large are arranged in one VM with high priority.

In addition, according to the management server 82 of the embodiment, the arrangement of processing elements can be determined such that the value of the load of the VM of the movement destination is less than the average value Ave and is more than the threshold value $\beta$ in a case where the processing elements are moved.

Next, the flow of each process performed by the management server 82 according to the embodiment will be described. Since the acquisition process and the arrangement control process are similar to those of the fourth embodiment, the description thereof will not be presented here, and a determination process according to the fifth embodiment will be described. FIGS. 27A to 29 represent a flowchart that illustrates the sequence of the determination process according to the fifth embodiment. The determination process is performed at a predetermined interval. In addition, the same reference numeral is assigned to the same process as that of Third or the fourth embodiment for description.

As illustrated in FIGS. 27A to 29, instead of S402 after S203, the specifying unit 83c determines whether the average value Ave is less than the threshold value $\beta$ in S501.

In addition, the specifying unit 83c, instead of S404 after S403, calculates a value $\Delta S'$ (=S−(T/WC)) that is acquired by subtracting the number (T/WC) of VMs in a case where the load is WC from the current number S of VMs, thereby calculating the number of VMs to be increased in S502. Then, the specifying unit 83c, instead of S205, sets VMs corresponding to the number represented by the value of $\Delta S'$ from the lower load side as the candidates for the movement source VM in S503. Subsequently, the specifying unit 83c, instead of S405, sets all the VMs each having a load less than WC out of the remaining VMs as candidates for the movement destination VM in S504.

As described above, the management server 82 according to the embodiment determines that two processing elements including two queries of a specific set are arranged in the same VM. Accordingly, in a case where the two processing elements are arranged in the same VM based on the determination, the communication for a processing result between two VMs before the two processing elements are arranged in the same VM is not performed. Therefore, according to the management server 82 of the embodiment, an increase in the number of times of communication can be suppressed.

In addition, according to the management server 82 of the embodiment, it can be determined that processing elements between which the number of times of communication is large are determined to be arranged in one VM with high priority.

Furthermore, according to the management server 82 of the embodiment, the arrangement of processing elements can be determined such that the value of the load of the VM of the movement destination is less than the average value Ave and is more than the threshold value β in a case where the processing elements are moved.

In addition, according to the management server 82 of the embodiment, in the VM of the movement destination, the load in a case where the processing element is moved can be configured to be less than WC and be more than the threshold value β.

In addition, according to the management server 82 of the embodiment, the number of VMs for which the average load of VMs is WC can be determined.

While the embodiments of the disclosed device have been described until now, the present invention may be performed in various forms other than the above-described embodiments. Thus, hereinafter, other embodiments belonging to the present invention will be described.

First, a modified example of each embodiment described above will be described. For example, inside a CEP system, there is a query that can be executed by only a specific device among a plurality of devices in which a query can be arranged. Thus, in such a case, a modified example will be described in which the management server performs control such that a processing element including the query is not arranged in any other device. The management server according to the modified example of each embodiment described above stores first prohibition information that represents that the movement of the query that is arranged in the specific device is prohibited in the storage unit. Then, a specifying unit, the determination unit, or the like according to the modified example determines whether the first prohibition information is stored in the storage unit before candidates for the movement source device are elected and refers to the first prohibition information in a case where the first prohibition information is stored. Subsequently, in a case where the specific device corresponding to the first prohibition information is elected as a candidate for a movement source device, the specific unit, the determination unit, or the like according to the modified example excludes the specific device from the candidate for the movement source device. In addition, the specifying unit or the determination unit according to the modified example may refer to the first prohibition information before candidates for the movement source device are elected and prevent the specific device represented by the first prohibition information from being elected as a candidate for the movement source device.

Figure 30:
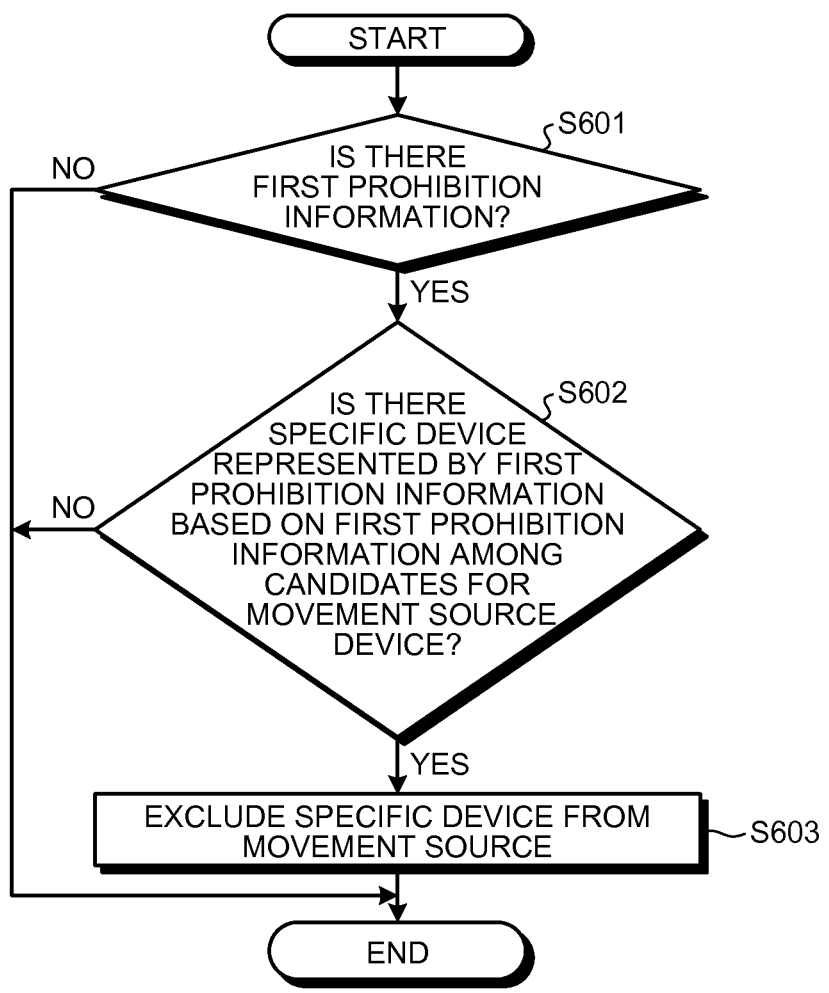
FIG. 30 is a flowchart that illustrates the sequence of a first exclusion process according to a modified example.

FIG. 30 is a flowchart that illustrates the sequence of a first exclusion process according to the modified example. The first exclusion process, for example, is performed as a part of the determination process after a candidate for a movement source VM is elected. As illustrated in FIG. 30, the specifying unit, the determination unit, or the like according to the modified example searches the storage unit and determines whether the first prohibition information is stored in the storage unit in S601. In a case where the first prohibition information is not present (No in S601), the determination process advances. On the other hand, in a case where the first prohibition information is present (Yes in S601), the specifying unit, the determination unit, or the like according to the modified example acquires the first prohibition information from the storage unit and determines whether the specific device represented by the first prohibition information is included in the candidates for the movement source device based on the acquired first prohibition information in S602.

In a case where the specific device represented by the first prohibition information is included in the candidates for the movement source device (Yes in S602), the specifying unit, the determination unit, or the like according to the modified example excludes the specific device from the candidate for the movement source device in S603, and the determination process advances. On the other hand, in a case where the specific device represented by the first prohibition information is not included in the candidates for the movement source device (No in S602), the determination process advances.

As described above, in the modified example, for a query that can be executed only by a specific device among a plurality of devices in which a query can be arranged inside a CEP system, a device in which the query is arranged is excluded from the candidate for the movement source device. Thus, according to the modified example, the number of candidates for the movement source device is decreased, and accordingly, the processing cost for moving a processing element is suppressed. In addition, according to the modified example, the occurrence of an event can be suppressed in which the query that can be executed only by a specific device is moved to any other device.

In addition, inside the CEP system, there is a device that can execute only a specific query out of a plurality of queries. Thus, in such a case, a modified example will be described in which the management server performs control such that processing elements of the other device are not moved to the device. The management server according to the modified example of each embodiment described above stores second prohibition information that represents that the movement of the query from the other devices to the device that can execute the specific query only is prohibited in the storage unit. Then, a specifying unit, the determination unit, or the like according to the modified example determines whether or not the second prohibition information is stored in the storage unit after candidates for the movement destination device are elected and refers to the second prohibition information in a case where the second prohibition information is stored. Subsequently, in a case where the device corresponding to the second prohibition information is elected as a candidate for a movement destination device, the specific unit, the determination unit, or the like according to the modified example excludes the device from the candidate for the movement destination device. In addition, the specifying unit or the determination unit according to the modified example may refer to the second prohibition information before candidates for the movement destination device are elected and prevent the device represented by the second prohibition information from being elected as a candidate for the movement destination device.

Figure 31:
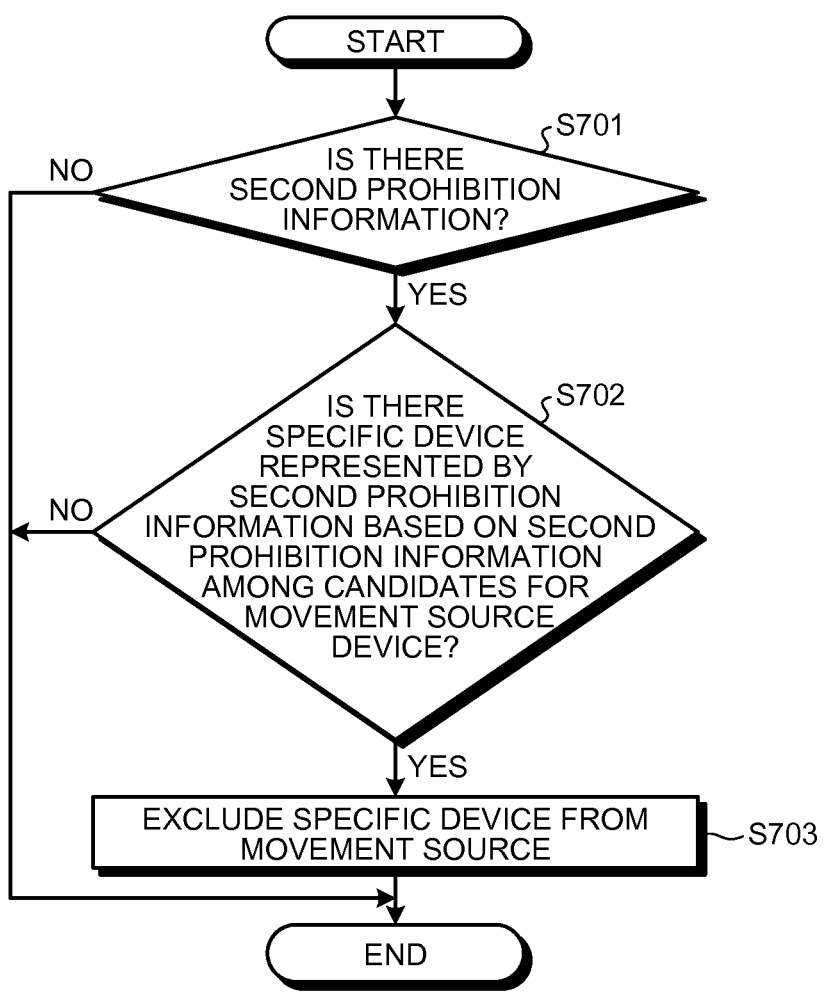
FIG. 31 is a flowchart that illustrates the sequence of a second exclusion process according to a modified example.

FIG. 31 is a flowchart that illustrates the sequence of a second exclusion process according to the modified example. The second exclusion process, for example, is performed as a part of the determination process after a candidate for a movement destination VM is elected. As illustrated in FIG. 31, the specifying unit, the determination unit, or the like according to the modified example searches the storage unit and determines whether or not the second prohibition information is stored in the storage unit in S701. In a case where the second prohibition information is not present (No in S701), the determination process advances. On the other hand, in a case where the second prohibition information is present (Yes in S701), the specifying unit, the determination unit, or the like according to the modified example acquires the second prohibition information from the storage unit and determines whether or not the device represented by the second prohibition information is included in the candidates for the movement destination device based on the acquired second prohibition information in S702.

In a case where the device represented by the second prohibition information is included in the candidates for the movement destination device (Yes in S702), the specifying unit, the determination unit, or the like according to the modified example excludes the device from the candidate for the movement destination device in S703, and the determination process advances. On the other hand, in a case where the device represented by the second prohibition information is not included in the candidates for the movement destination device (No in S702), the determination process advances.

As described above, according to the modified example, within the CEP system, a device that can execute only a specific query among a plurality of queries is excluded from the candidate for the movement destination device. Thus, according to the modified example, the number of candidates for the movement destination device is decreased, and accordingly, the processing cost for moving a processing element is suppressed. In addition, according to the modified example, the occurrence of an event can be suppressed in which, to a device that can execute only a specific query, the other queries are moved from the other devices.

In addition, in each embodiment described above, a case has been described as an example in which the VM calculates the number of times of communication between queries, and the communication count information 37 including the calculated number of times of communication is transmitted to the management server. However, the disclosed device is not limited thereto. Thus, a modified example will be described in which the VM transmits sequence information that represents the execution sequence of queries to the management server, the management server that receives the sequence information calculates the number of times of communication between queries, and a set of queries is specified based on the calculated number of times of communication.

Figure 32:
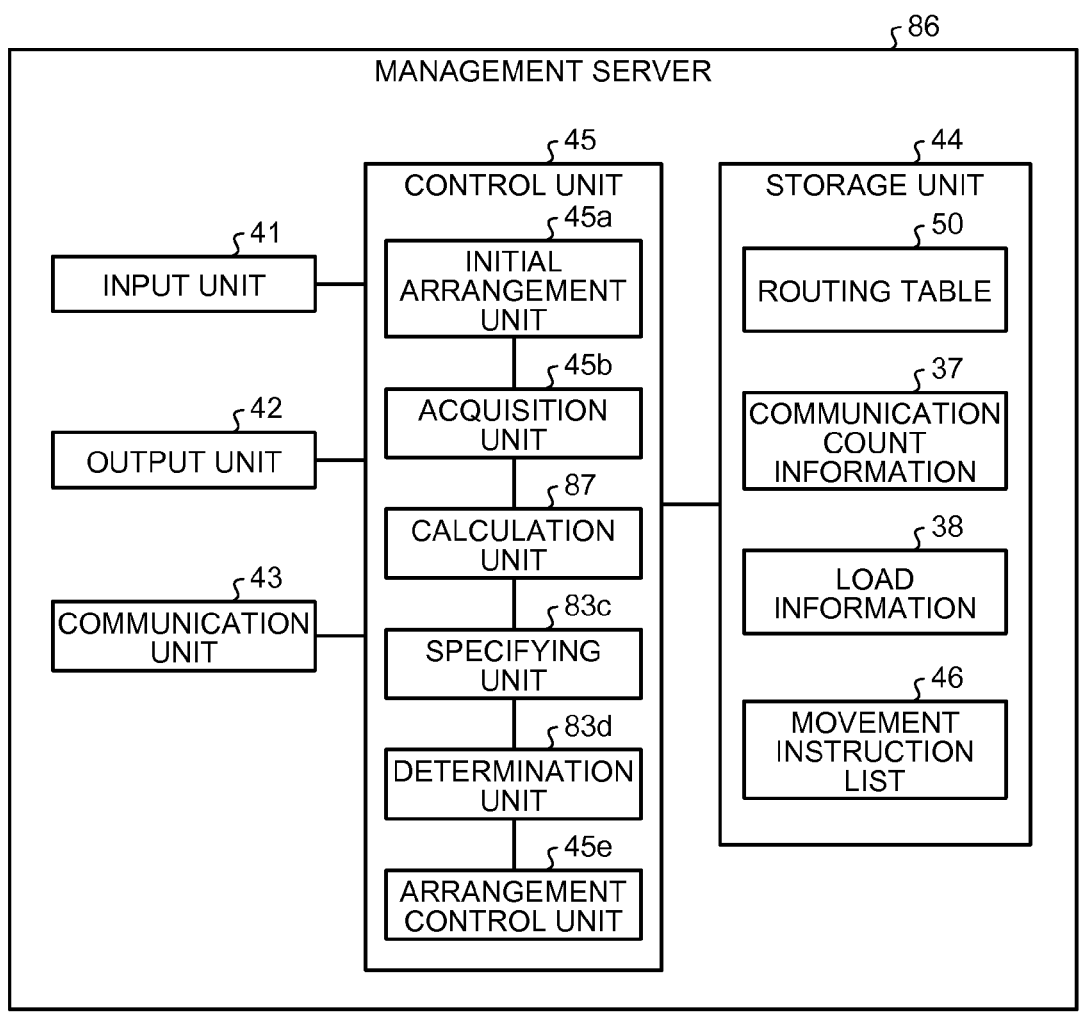
FIG. 32 is a diagram that illustrates an example of the configuration of a management server according to a modified example.

FIG. 32 is a diagram that illustrates an example of the configuration of the management server according to the modified example. The example depicted in FIG. 32 illustrates a modified example of the fifth embodiment. As illustrated in FIG. 32, the control unit 45 of a management server 86 includes a calculation unit 87. In the modified example, the sequence information transmitted from the VM is acquired by an acquisition unit 45b, and the acquired sequence information is stored in the storage unit 44. Then, the calculation unit 87 acquires the sequence information from the storage unit 44 at predetermined timing, for example, before the communication count information 37 stored in the storage unit 44 is acquired by the acquisition unit 45b in the determination process. Subsequently, the calculation unit 87 calculates the number of times of communication of the query based on the execution sequence of queries that is represented by the acquired sequence information. Thereafter, the calculation unit 87 stores the communication count information 37 in which the calculated number of times of communication of the query is registered in a corresponding item in the storage unit 44.

Figure 33:
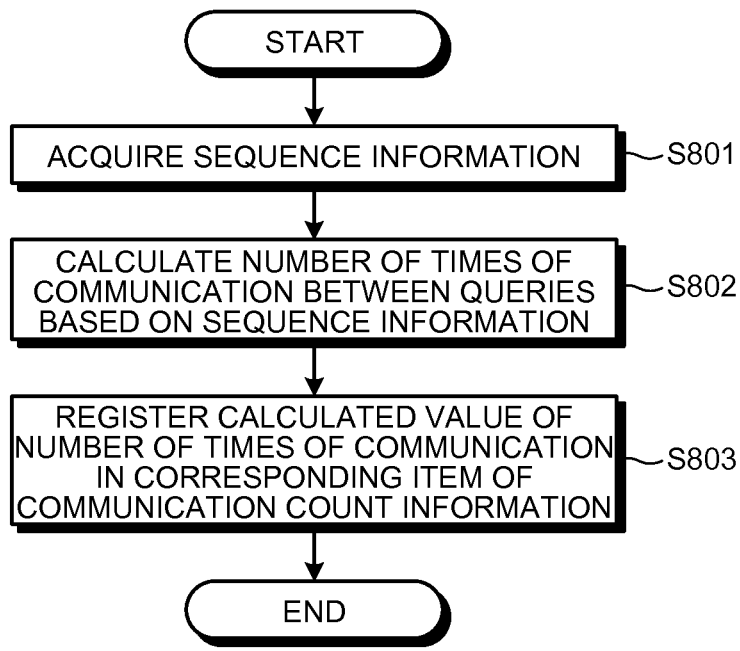
FIG. 33 is a flowchart that illustrates the sequence of a calculation process according to a modified example.

FIG. 33 is a flowchart that illustrates the sequence of a calculation process according to the modified example. The calculation process, for example, is performed before the communication count information 37 is acquired by the acquisition unit as a part of the determination process. As illustrated in FIG. 33, the calculation unit 87 acquires the sequence information from the storage unit 44 in S801. Subsequently, the calculation unit 87 calculates the number of times of communication of the query based on the execution sequence of the query that is represented by the acquired sequence information in S802. Thereafter, the calculation unit 87 stores the communication count information 37 in which the calculated number of times of communication of the query is registered in the corresponding item in the storage unit 44 in S803.

As described above, in the modified example, the VM transmits the execution sequence of queries to the management server without calculating the number of times of communication of the query. Then, in the modified example, the number of times of communication of the query is calculated based on the execution sequence of the queries, and a set of queries is specified by using the calculated number of times of communication. Thus, according to the modified example, the processing cost of the VM can be suppressed. In addition, although the modified example of the fifth embodiment has been described in the description presented above, the technique according to the modified example of the fifth embodiment can be used in Third or the fourth embodiments, for example.

In addition, in each embodiment described above, although a case has been described in which queries are arranged in the VM, the disclosed device may perform the same process by arranging queries in a physical server.

Furthermore, the whole or a part of the process that has been described to be automatically performed in the embodiments may be manually performed. In addition, the whole or a part of the process that has been described to be manually performed in the embodiments may be automatically performed by using a known method.

In addition, the process performed in each step of each process described in each embodiment may be finely divided in an arbitrary manner or combined as a whole in accordance with various loads, usage circumstances, or the like. Furthermore, some step can be omitted.

Furthermore, the sequence of the process in each step of each process described in each embodiment may be changed in accordance with various loads, the usage circumstances, or the like.

In addition, each constituent element of each device illustrated in the diagrams is represented in a functional and conceptual sense, and it is unnecessary to physically configure the constituent element as illustrated in the diagrams. In other words, a specific form of division or integration of the devices is not limited to that illustrated in the diagrams, and the whole or a part thereof may be configured to be functionally or physically divided or integrated in an arbitrary unit in accordance with various loads, the usage circumstances, or the like.

[Arrangement Program]

Figure 34:
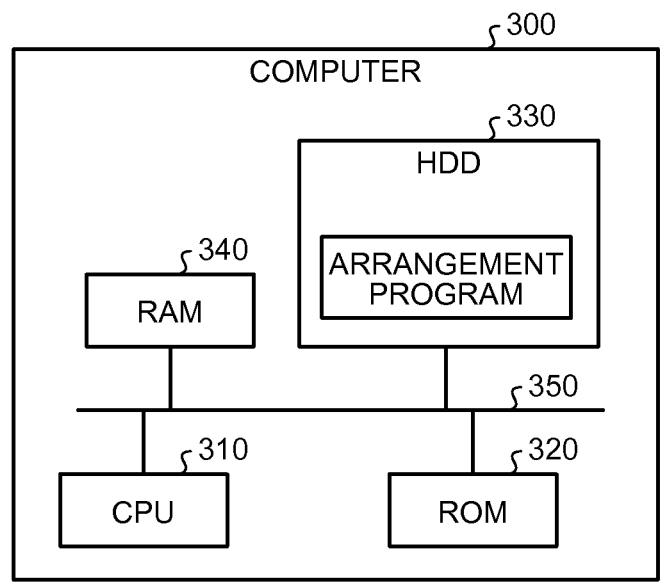
FIG. 34 is a diagram that illustrates a computer executing an arrangement program.
Figure 35A:
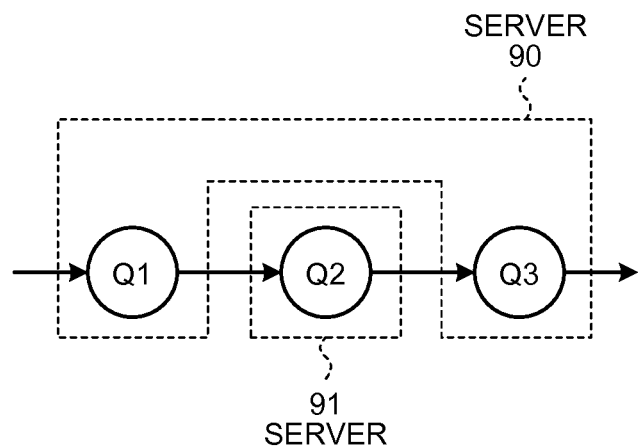
FIG. 35A is a diagram that illustrates an example of a processing distribution technique.
Figure 35B:
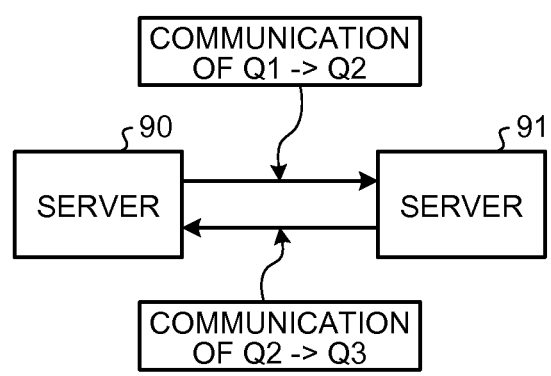
FIG. 35B is a diagram that illustrates an example of a processing distribution technique.
Figure 36A:
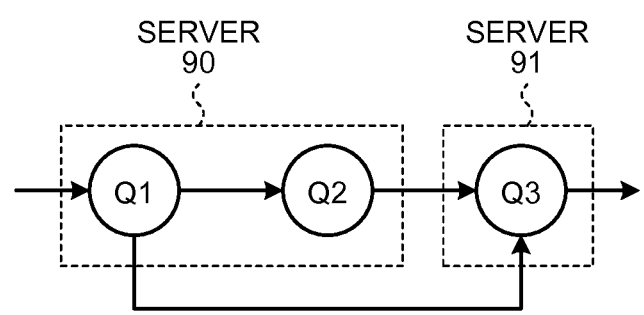
FIG. 36A is a diagram that illustrates an example of a technique for arranging queries adjacent to each other in the same device.
Figure 36B:
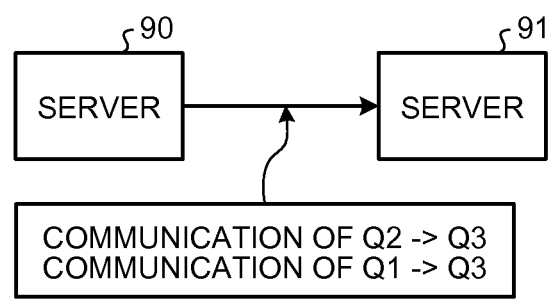
FIG. 36B is a diagram that illustrates an example of a technique for arranging queries adjacent to each other in the same device.

In addition, the arrangement devices and various processes of the management server described in each embodiment described above may be realized by executing a program prepared in advance by using a computer system such as a personal computer or a workstation. Thus, hereinafter, an example of the computer that executes an arrangement program having the same functions as the arrangement device and the management server of each embodiment described above will be described with reference to FIG. 34. FIG. 34 is a diagram that illustrates a computer that executes the arrangement program.

As illustrated in FIG. 34, a computer 300 includes a CPU (central processing unit) 310, a ROM (read only memory) 320, a HDD (hard disk drive) 330, and a RAM (random access memory) 340. The devices represented by reference numerals 310 to 340 are interconnected through a bus 350.

In the ROM 320, a basic program such as an OS (operating system) or the like is stored. In addition, in the HDD 330, an arrangement program that exhibits the same functions as those of the initial arrangement unit, the acquisition unit, the calculation unit, the specifying unit, the determination unit, and the arrangement control unit illustrated in each embodiment described above is stored in advance. Furthermore, the arrangement program may be appropriately divided. In addition, in the HDD 330, a routing table, communication count information, load information, and a movement instruction list are placed. The routing table, the communication count information, the load information, the movement instruction list, and the sequence information correspond to the routing table 50, the communication count information 37, the load information 38, the movement instruction list 46, and the sequence information.

The CPU 310 reads out the arrangement program from the HDD 330 and executes the arrangement program.

The CPU 310 reads out the routing table, the communication count information, the load information, and the movement instruction list and store them in the RAM 340. In addition, the CPU 310 executes the arrangement program by using the routing table, the communication count information, the load information, and the movement instruction list stored in the RAM 340. The entirety of each data entry stored in the RAM 340 would not be constantly stored in the RAM 340. The data that is used for the process may be stored in the RAM 340.

In addition, the above-described arrangement program would not be initially stored in the HDD 330.

For example, the program may be stored in a "portable physical medium" such as a flexible disk (FD), a CD-ROM, a DVD disc, a magneto-optical disk, or an IC card that is inserted into the computer 300. In such a case, the computer 300 may read out the program from any of them and execute the program.

In addition, the program may be stored in "another computer (or a server)" that is connected to the computer 300 through a public line, the Internet, a LAN, a WAN, or the like. In such a case, the computer 300 may be configured to read out the program from any one of them and execute the program.

According to an embodiment of the present invention, an increase in communication between devices can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A query arrangement apparatus comprising:
an acquisition unit that acquires transaction information from a plurality of processing devices, the transaction information including number of query processing result transactions among a plurality of queries, each of the plurality of queries being arranged in and being processed in one of the plurality of processing devices;
a specifying unit that specifies a set of queries which are arranged in different processing devices, both processing devices being included in the plurality of processing devices, based on the transaction information; and
a determination unit that determines to rearrange the set of queries in a same processing device.

2. The query arrangement apparatus device according to claim 1, wherein the specifying unit specifies a set of queries between which the number of query processing result transactions is the largest.

3. The query arrangement apparatus according to claim 2, wherein, when there are a plurality of sets of queries between which the number of query processing result transactions is the same, the determination unit specifies a set of queries having a smallest load or a set of queries having a shortest distance between the queries on a query graph out of the sets of queries between which the number of query processing result transactions is the same, the query graph representing connective relation between the plurality of queries.

4. The query arrangement apparatus according to claim 1, further comprising an arrangement control unit that performs control such that the set of queries specified by the specifying unit is rearranged in the same processing device based on a determination result of determination unit.

5. The query arrangement apparatus according to claim 4, wherein the arrangement control unit performs control such that the set of queries specified by the specifying unit is rearranged from a processing device of which the load exceeds a first threshold value to a processing device of which the load is less than a second threshold value.

6. The query arrangement apparatus according claim 4, wherein, when the load of the plurality of processing devices exceeds a first threshold value, the arrangement control unit performs control such that the set of queries specified by the specifying unit is rearranged in a processing device other than the plurality of processing devices.

7. The query arrangement apparatus according claim 4, wherein, when the load of the plurality of processing devices is less than a second threshold value, the arrangement control unit performs control such that the set of queries specified by the specifying unit and a query that is arranged in a processing device of which the load exceeds a third threshold value out of the plurality of processing devices are rearranged in first processing devices out of the plurality of processing devices, the number of the first processing devices being smaller than the total number of the plurality of processing devices.

8. The query arrangement apparatus according claim 4, wherein, when a processing device in which any query represented by the set of queries specified by the specifying unit is rearranged is a processing device that executes only the query, the arrangement control unit performs control such that the processing device is not set as a processing device of an arrangement destination of a query other than the query.

9. The query arrangement apparatus according to claim 4, wherein, when any query represented by the set of queries specified by the specifying unit can be executed by only the processing device in which the query is arranged out of the plurality of processing devices, the arrangement control unit performs control such that the query is not rearranged in a processing device other than the processing device.

10. The query arrangement apparatus according to claim 1, wherein the acquisition unit acquires the information that is recorded or added up in accordance with the execution of a query by the processing device.

11. A query arrangement apparatus comprising:
an acquisition unit that acquires transaction information from a plurality of processing devices, the transaction information including an execution order of queries executed in the plurality of processing devices in which the plurality of queries are arranged, each of the plurality of queries being arranged in and being processed in one of the plurality of processing devices;
a calculation unit that calculates the number of query processing result transactions among the plurality of queries based on the transaction information acquired by the acquisition unit;
a specifying unit that specifies a set of queries which are arranged in different processing devices, both processing devices being included in the plurality of processing devices, based on the number of query processing result transactions that is calculated by the calculation unit; and
a determination unit that determines to rearrange the set of queries in a same processing device.

12. The query arrangement apparatus according to claim 11, wherein the specifying unit specifies a set of queries between which the number of query processing result transactions is the largest.

13. The query arrangement apparatus according to claim 12, wherein, when there are a plurality of sets of queries between which the number of query processing result transactions is the same, the determination unit specifies a set of queries having a smallest load or a set of queries having a shortest distance between the queries on a query graph out of the sets of queries between which the number of query processing result transactions is the same, the query graph representing connective relation between the plurality of queries.

14. The query arrangement apparatus according to claim 11, further comprising an arrangement control unit that performs control such that the set of queries specified by the specifying unit is rearranged in the same processing device based on a determination result of determination unit.

15. The query arrangement apparatus according to claim 14, wherein the arrangement control unit performs control such that the set of queries specified by the specifying unit is rearranged from a processing device of which the load exceeds a first threshold value to a processing device of which the load is less than a second threshold value.

16. The query arrangement apparatus according to claim 14, wherein, when the load of the plurality of processing devices exceeds a first threshold value, the arrangement control unit performs control such that the set of queries specified by the specifying unit is rearranged arranged in a processing device other than the plurality of processing devices.

17. The query arrangement apparatus according to claim 14, wherein, when the load of the plurality of processing devices is less than a second threshold value, the arrangement control unit performs control such that the set of queries specified by the specifying unit and a query that is arranged in a processing device of which the load exceeds a third threshold value out of the plurality of processing devices are rearranged in first processing devices out of the plurality of processing devices, the number of the first processing devices being smaller than the total number of the plurality of processing devices.

18. The query arrangement apparatus device according to claim 14, wherein, when a processing device in which any query represented by the set of queries specified by the specifying unit is rearranged is a processing device that executes only the query, the arrangement control unit performs control such that the processing device is not set as a processing device of an arrangement destination of a query other than the query.

19. The query arrangement apparatus according to claim 14, wherein, when any query represented by the set of queries specified by the specifying unit can be executed by only the processing device in which the query is arranged out of the plurality of processing devices, the arrangement control unit performs control such that the query is not rearranged in a processing device other than the processing device.

20. The query arrangement apparatus according to claim 11, wherein the acquisition unit acquires the information that is recorded or added up in accordance with the execution of a query by the processing device.

21. A non-transitory computer-readable storage medium having stored therein a query arrangement program that causes a computer to execute a process comprising:
acquiring transaction information from a plurality of processing devices, the transaction information including number of query processing result transactions among a plurality of queries, each of the plurality of queries being arranged in and being processed in one of the plurality of processing devices;
specifying a set of queries which are arranged in different processing devices, both processing devices being included in the plurality of processing devices, based on the transaction information; and
determining to rearrange the specified set of queries in a same processing device.

22. A non-transitory computer-readable storage medium having stored therein a query arrangement program that causes a computer to execute a process comprising:
acquiring transaction information from a plurality of processing devices, the transaction information including an execution order of queries executed in the plurality of processing devices in which the plurality of queries are arranged, each of the plurality of queries being arranged in and being processed in one of the plurality of processing devices;
calculating the number of query processing result transactions among a plurality of queries based on the transaction information;
specifying a set of queries which are arranged in different processing devices, both processing devices being included in the plurality of processing devices, based on the calculated number of query processing result transactions; and
determining to rearrange the specified set of queries in a same processing device.

23. A query arrangement method executed by a computer, the query arrangement method comprising:
acquiring transaction information from a plurality of processing devices, the transaction information including number of query processing result transactions among a plurality of queries, each of the plurality of queries being arranged in and being processed in one of the plurality of processing devices;
specifying a set of queries which are arranged in different processing devices, both processing devices being included in the plurality of processing devices, based on the transaction information; and determining to rearrange the specified set of queries in a same processing device.

24. A query arrangement method executed by a computer, the query arrangement method comprising:

acquiring transaction information from a plurality of processing devices, the transaction information including an execution order of queries executed in the plurality of processing devices in which the plurality of queries are arranged, each of the plurality of queries being arranged in and being processed in one of the plurality of processing devices;

calculating the number of query processing result transactions among the plurality of queries based on the acquired transaction information;

specifying a set of queries which are arranged in different processing devices, both processing devices being included in the plurality of processing devices, based on the calculated number of query processing result transactions; and determining to rearrange the specified set of queries in a same processing device.

25. A query arrangement apparatus comprising:

an acquisition unit that acquires transaction information from a plurality of processing devices, the transaction information including number of processing result transactions among a plurality of transaction requesting sentences, each of the plurality of transaction requesting sentences being arranged in and being processed in one of the plurality of processing devices, the processing devices performing an event by linking the plurality of transaction requesting sentences;

a specifying unit that specifies a set of transaction requesting sentences which are arranged in different processing devices, both processing devices being included in the plurality of processing devices, based on the transaction information; and a determination unit that determines a processing device for rearranging the set of transaction requesting sentences in a same processing device.

* * * * *

UNITED STATES PATENT AND TRADEMARK OFFICE
CERTIFICATE OF CORRECTION

| | | |
|---|---|---|
| PATENT NO. | : 9,141,677 B2 | Page 1 of 2 |
| APPLICATION NO. | : 13/644978 | |
| DATED | : September 22, 2015 | |
| INVENTOR(S) | : Hidekazu Takahashi et al. | |

It is certified that error appears in the above-identified patent and that said Letters Patent is hereby corrected as shown below:

In the Claims

Claim 2, Column 38, Line 18
After "apparatus" delete "device".

Claim 6, Column 38, Line 42
After "according" insert --to--.

Claim 7, Column 38, Line 48
After "according" insert --to--.

Claim 8, Column 38, Line 58
After "according" insert --to--.

Claim 8, Column 38, Line 61
Delete "rearranged is a" insert --rearranged in a--.

Claim 16, Column 39, Line 58
After "rearranged" delete "arranged".

Claim 16, Column 39, Line 58
After "rearranged" delete "arranged".

Signed and Sealed this
Ninth Day of February, 2016

Michelle K. Lee
*Director of the United States Patent and Trademark Office*

CERTIFICATE OF CORRECTION (continued)
U.S. Pat. No. 9,141,677 B2

Claim 18, Column 40, Line 4
After "apparatus" delete "device".

Claim 18, Column 40, Line 4
Delete "rearranged is a" insert --rearranged in a--.

Claim 21, Column 40, Line 36
After "the" delete "specified".